United States Patent
Stewart et al.

(10) Patent No.: US 12,377,812 B2
(45) Date of Patent: Aug. 5, 2025

(54) WHEEL THEFT DETECTION AND NOTIFICATION USING A TIRE PRESSURE MONITORING SYSTEM

(71) Applicant: SENSATA TECHNOLOGIES, INC., Attleboro, MA (US)

(72) Inventors: William D. Stewart, Antrim (GB); Jonathan E. Barr, Magherafelt (GB); A. Tugay Arslan, Antrim (GB); Ravindra P. Singh, Antrim (GB); Samuel K. Strahan, Ballymena (GB); Andrew Burgess, Ballynahinch (GB); Ian S. Elliott, Ballybogey (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 170 days.

(21) Appl. No.: 17/989,765

(22) Filed: Nov. 18, 2022

(65) Prior Publication Data
US 2023/0406262 A1  Dec. 21, 2023

Related U.S. Application Data

(60) Provisional application No. 63/352,405, filed on Jun. 15, 2022.

(51) Int. Cl.
*B60R 25/10* (2013.01)
*B60C 23/04* (2006.01)
(Continued)

(52) U.S. Cl.
CPC ...... *B60R 25/1001* (2013.01); *B60C 23/0401* (2013.01); *B60R 25/102* (2013.01);
(Continued)

(58) Field of Classification Search
CPC ... B60R 25/1001; B60R 25/102; B60R 25/24; B60R 25/30; G01S 5/0269; B60C 23/0401; G01L 17/00
See application file for complete search history.

(56) References Cited

U.S. PATENT DOCUMENTS 5,942,971 A * 8/1999 Fauci .................. B60C 23/0423
340/447
8,978,460 B2  3/2015 Kretschmann
(Continued)

FOREIGN PATENT DOCUMENTS

EP  3722162 A1  10/2020
FR  3075550 A1  6/2019
(Continued)

OTHER PUBLICATIONS

International Search Report and Written Opinion, PCT/US2023/021266, Sep. 11, 2023, 14 pages.

*Primary Examiner* — Chico A Foxx
(74) *Attorney, Agent, or Firm* — Mark. H. Williams

(57) ABSTRACT

Methods, apparatuses, systems, and computer program products for wheel theft detection and notification using a tire pressure monitoring system (TPMS) are disclosed. In a particular embodiment, wheel theft detection and notification using a TPMS includes monitoring, by an electronic control unit (ECU) of a vehicle, one or more parameters associated with a tire monitoring sensor (TMS) coupled to a wheel assembly of the vehicle. In this embodiment, the ECU determines, based on the monitored one or more parameters, that the wheel assembly is in a compromised state associated with the wheel assembly being dislocated from the vehicle or in danger of being dislocated from the vehicle. In response to determining that the wheel assembly is in the compromised state, the ECU triggers an alarm of a vehicle security system.

14 Claims, 39 Drawing Sheets

(51) Int. Cl.
*B60R 25/102* (2013.01)
*B60R 25/24* (2013.01)
*B60R 25/30* (2013.01)
*G01L 17/00* (2006.01)
*G01S 5/02* (2010.01)

(52) U.S. Cl.
CPC .............. *B60R 25/24* (2013.01); *B60R 25/30* (2013.01); *G01L 17/00* (2013.01); *G01S 5/0269* (2020.05)

(56) References Cited

U.S. PATENT DOCUMENTS

| | | | |
|---|---|---|---|
| 11,926,180 B2 * | 3/2024 | Deleplanque | B60C 23/045 |
| 2004/0049329 A1 * | 3/2004 | Yamamoto | B60C 23/0479 |
| | | | 340/442 |
| 2007/0096884 A1 * | 5/2007 | Takashima | B60R 25/1004 |
| | | | 340/429 |
| 2008/0048847 A1 * | 2/2008 | Shimomura | B60C 23/0408 |
| | | | 340/426.33 |
| 2010/0207753 A1 * | 8/2010 | Sugiura | B60C 23/0433 |
| | | | 340/447 |
| 2011/0118942 A1 * | 5/2011 | Alguera | B62D 53/085 |
| | | | 701/45 |
| 2011/0153120 A1 * | 6/2011 | Katou | B60C 23/0442 |
| | | | 701/2 |
| 2012/0126967 A1 * | 5/2012 | McCormick | B60C 23/0408 |
| | | | 340/445 |
| 2015/0145658 A1 * | 5/2015 | Ovenshire | B60R 25/10 |
| | | | 340/425.5 |
| 2015/0321640 A1 * | 11/2015 | Hisada | B60R 25/1004 |
| | | | 340/426.2 |
| 2017/0057461 A1 | 3/2017 | Gaskin | |
| 2017/0334253 A1 * | 11/2017 | Chuang | G01L 19/0092 |
| 2017/0353829 A1 * | 12/2017 | Kumar | H04W 4/40 |
| 2018/0086306 A1 * | 3/2018 | Schmotzer | B60R 25/102 |
| 2019/0092104 A1 * | 3/2019 | Ahmed | G06F 1/3287 |
| 2020/0339065 A1 * | 10/2020 | Watanabe | B60C 23/0479 |
| 2021/0179016 A1 * | 6/2021 | Watanabe | B60C 23/0479 |
| 2024/0116507 A1 * | 4/2024 | Engels | B60W 10/26 |

FOREIGN PATENT DOCUMENTS

| | | | | |
|---|---|---|---|---|
| GB | 2382205 A | * | 5/2003 | ........ B60C 23/0408 |
| GB | 2484464 A | * | 4/2012 | ........ B60R 25/1004 |
| JP | 2010228486 A | * | 10/2010 | |
| JP | 2022137870 A | | 9/2022 | |
| KR | 2015025141 A | * | 3/2015 | |
| WO | WO-2018114577 A1 | * | 6/2018 | ......... B60C 23/0408 |

* cited by examiner

```
┌─────────────────────────────────────────────────────────────────────────┐
│ Electronic Control Unit (ECU) 1301                                      │
│                                                                         │
│     ┌─────────────────────────────────────────────────────────────┐     │
│     │ Monitor One Or More Parameters Associated With A Tire       │     │
│     │ Monitoring Sensor (TMS) Coupled To A Wheel Assembly Of      │     │
│     │ The Vehicle 1302                                            │     │
│     └─────────────────────────────────────────────────────────────┘     │
│                                    │                                    │
│                                    ▼                                    │
│     ┌─────────────────────────────────────────────────────────────┐     │
│     │ Based On The Monitored One Or More Parameters, Determine    │     │
│     │ That The Wheel Assembly Is In A Compromised State           │     │
│     │ Associated With The Wheel Assembly Being Dislocated From    │     │
│     │ The Vehicle Or In Danger Of Being Dislocated From The       │     │
│     │ Vehicle 1304                                                │     │
│     │   ┌─────────────────────────────────────────────────────┐   │     │
│     │   │ Determine That A Distance From The ECU To The TMS   │   │     │
│     │   │ Is Increasing 1402                                  │   │     │
│     │   └─────────────────────────────────────────────────────┘   │     │
│     └─────────────────────────────────────────────────────────────┘     │
│                                    │                                    │
│                                    ▼                                    │
│     ┌─────────────────────────────────────────────────────────────┐     │
│     │ In Response To Determining That The Wheel Assembly Is In    │     │
│     │ The Compromised State, Trigger An Alarm Of A Vehicle        │     │
│     │ Security System 1306                                        │     │
│     └─────────────────────────────────────────────────────────────┘     │
└─────────────────────────────────────────────────────────────────────────┘
```

FIG. 14

Tire Monitoring Sensor (TMS) 2101

Receive From An Electronic Control Unit (ECU) Of A Vehicle, An Indication That A Vehicle Security System Is Activated 2102

After Receiving The Indication That The Vehicle Security System Is Activated, Perform A Wheel Theft Detection Operation 2104

Measure One Or More Parameter Values Associated With A Wheel Assembly 2106

Determine Whether The One Or More Measured Parameter Values Deviate From One Or More Reference Parameter Values By One Or More Predetermined Amounts 2108

After Determining That The One Or More Measured Parameter Values Deviate From The One Or More Reference Parameter Values By The One Or More Predetermined Amounts, Transmit An Indication That The One Or More Parameter Values Have Changed 2110

In Response To Determining That The One Or More Measured Parameter Values Deviate From The One Or More Reference Parameter Values By The One Or More Predetermined Amounts, Switch To A Rapid Transmission State In Which The TMS Increases A Frequency Of Transmission To The ECU 2202

FIG. 22

Tire Monitoring Sensor (TMS) 2901

Determine That A Wheel Assembly Associated With The TMS Is In A Compromised State Associated With The Wheel Assembly Being Dislocated From The Vehicle Or In Danger Of Being Dislocated From The Vehicle 2902

During A Wheel Theft Detection Operation, Detect A Dislocation Event That Includes At Least One Of A Change In Orientation Of The TMS, A Loss Of Contact Of The TMS With A Linked Electronic Control Unit (ECU) For A Predetermined Amount Of Time, And An Installation Of The TMS Into An Alien Vehicle 3102

Responsive To Detecting The Dislocation Event:

Determine That The Wheel Assembly Is In The Compromised State 3104

Update Within The TMS, A Designation Of A Current State Of The Wheel Assembly To The Compromised State 3106

Responsive To Determining That The Wheel Assembly Is Designated As Being In The Compromised State, Broadcast A Message Indicating That The Wheel Assembly Is In The Compromised State 2904

FIG. 31

Tire Monitoring Sensor (TMS) 2901

Determine That A Wheel Assembly Associated With The TMS Is In A Compromised State Associated With The Wheel Assembly Being Dislocated From The Vehicle Or In Danger Of Being Dislocated From The Vehicle 2902

During A Wheel Theft Detection Operation, Detect A Dislocation Event That Includes At Least One Of A Change In Orientation Of The TMS, A Loss Of Contact Of The TMS With A Linked Electronic Control Unit (ECU) For A Predetermined Amount Of Time, And An Installation Of The TMS Into An Alien Vehicle 3102

Responsive To Detecting The Dislocation Event:

Determine That The Wheel Assembly Is In The Compromised State 3104

Update Within The TMS, A Designation Of A Current State Of The Wheel Assembly To The Compromised State 3106

Responsive To Determining That The Wheel Assembly Is In The Compromised State, Transmit To The Linked ECU, An Indication That The Wheel Assembly Is The Compromised State 3202

Responsive To Determining That The Wheel Assembly Is Designated As Being In The Compromised State, Broadcast A Message Indicating That The Wheel Assembly Is In The Compromised State 2904

FIG. 32

Tire Monitoring Sensor (TMS) 2901

Determine That A Wheel Assembly Associated With The TMS Is In A Compromised State Associated With The Wheel Assembly Being Dislocated From The Vehicle Or In Danger Of Being Dislocated From The Vehicle 2902

Receive From A Device, A Remote Tagging Message Indicating That The Wheel Assembly Is In The Compromised State 3302

Responsive To Determining That The Wheel Assembly Is Designated As Being In The Compromised State, Broadcast A Message Indicating That The Wheel Assembly Is In The Compromised State 2904

FIG. 33

Second Device 3701

Receive From A First Device, An Indication That A Wheel Assembly Is In A Compromised State Associated With The Wheel Assembly Being Dislocated From The Vehicle Or In Danger Of Being Dislocated From The Vehicle, The Indication Including An Identification Associated With The Wheel Assembly 3702

↓

Receive From A Tire Monitoring Sensor (TMS), A Message That Includes The Identification Associated With The Wheel Assembly 3704

↓

Transmit To The TMS, A Message To Update A Current Status Of The Wheel Assembly To The Compromised State 3706

FIG. 37

WHEEL THEFT DETECTION AND NOTIFICATION USING A TIRE PRESSURE MONITORING SYSTEM

CROSS-REFERENCE TO RELATED APPLICATION

This application is a non-provisional application for patent entitled to a filing date and claiming the benefit of earlier-filed U.S. Provisional Patent Application Ser. No. 63/352,405, filed Jun. 15, 2020.

BACKGROUND

Wheels are one of the most common components stolen from a vehicle. If a thief is trying to remove a wheel, activating the vehicle's alarm is one of the best ways of discouraging the thief from completing the theft. Therefore, methods and systems to improve early wheel theft detection and notification are advantageous to vehicle manufacturers, insurance companies, and vehicle owners.

SUMMARY

A tire pressure monitoring system (TPMS) may have some combination of components that include but are not limited to tire monitoring sensors (TMS), one or more electronic control units (ECU), sensors, and monitoring devices, such as mobile phones. According to embodiments of the present disclosure, components within a TPMS may be configured to share and utilize data regarding wheel assemblies to provide wheel theft detection. As will be further explained further below, this data may also be useful for optimizing an autolocation mechanism for the tire monitoring sensors at vehicle startup.

Methods, apparatuses, systems, and computer program products for wheel theft detection and notification using a TPMS are disclosed. In a particular embodiment, wheel theft detection and notification using a TPMS includes an ECU monitoring one or more parameters associated with a TMS coupled to a wheel assembly of the vehicle. In this embodiment, the ECU determines, based on the monitored one or more parameters, that the wheel assembly is in a compromised state associated with the wheel assembly being dislocated from the vehicle or in danger of being dislocated from the vehicle. In response to determining that the wheel assembly is in the compromised state, the ECU triggers an alarm of a vehicle security system.

In another embodiment, wheel theft detection and notification using a TPMS includes a TMS receiving from an ECU of a vehicle, an indication that a vehicle security system is activated. In this embodiment, after receiving the indication that the vehicle security system is activated, the TMS performs a wheel theft detection operation that includes measuring one or more parameter values associated with a wheel assembly and determining whether the one or more measured parameter values deviate from one or more reference parameter values by one or more predetermined amounts. After determining that the one or more measured parameter values deviate from the one or more reference parameter values by the one or more predetermined amounts, the TMS transmits an indication that the one or more parameter values have changed.

In another embodiment, wheel theft detection and notification using a TPMS includes an ECU determining that a wheel assembly is in a compromised state associated with the wheel assembly being dislocated from the vehicle or in danger of being dislocated from the vehicle. In this embodiment, responsive to determining that the wheel assembly is in the compromised state, the ECU transmits to a first device, a message indicating that the wheel assembly is in the compromised state.

In another embodiment, wheel theft detection and notification using a TPMS includes a TMS determining that a wheel assembly associated with the TMS is in a compromised state associated with the wheel assembly being dislocated from the vehicle or in danger of being dislocated from the vehicle. Responsive to determining that the wheel assembly is designated as being in the compromised state, the TMS broadcasts a message indicating that the wheel assembly is in the compromised state.

In another embodiment, wheel theft detection and notification using a TPMS includes a first device receiving from TMS, a first message indicating a wheel assembly associated with the TMS is in a compromised state associated with the wheel assembly being dislocated from the vehicle or in danger of being dislocated from the vehicle. In this embodiment, the first device determines a location of the wheel assembly and transmits to a second device the determined location of the wheel assembly.

In another embodiment, wheel theft detection and notification using a TPMS includes receiving from a first device, by a second device, an indication that a wheel assembly is in a compromised state associated with the wheel assembly being dislocated from the vehicle or in danger of being dislocated from the vehicle, the indication including an identification associated with the wheel assembly. In this embodiment, the second device receives from a tire monitoring sensor (TMS), a message that includes the identification associated with the wheel assembly and transmits to the TMS, a message to update a current status of the wheel assembly to the compromised state.

In another embodiment, optimizing an autolocation mechanism in a tire pressure monitoring system (TPMS) includes an ECU detecting a change from ON to OFF in a status of a vehicle ignition of the vehicle. In this embodiment, responsive to detecting the change from ON to OFF in the status of the vehicle ignition, the ECU transmits to a plurality of tire monitoring sensors (TMSs) of the vehicle, a message indicating the vehicle ignition is OFF. The ECU also detects a change from OFF to ON in the status of the vehicle ignition and responsive to detecting the change from OFF to ON in the status of the vehicle ignition, transmits to the plurality of TMSs, a message indicating the ignition is ON. For each TMS in the plurality of TMSs, the ECU receives an indication of whether the TMS detected a change in orientation of the TMS and based on the indications received from the plurality of TMSs, determines whether to initiate an autolocation mechanism on the plurality of TMS.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 14 sets forth a flow chart illustrating another method for wheel theft detection and notification using a TPMS according to at least one embodiment of the present disclosure.

FIG. 22 sets forth a flow chart illustrating another method for wheel theft detection and notification using a TPMS according to at least one embodiment of the present disclosure.

FIG. 31 sets forth a flow chart illustrating another method for wheel theft detection and notification using a TPMS according to at least one embodiment of the present disclosure.

FIG. 32 sets forth a flow chart illustrating another method for wheel theft detection and notification using a TPMS according to at least one embodiment of the present disclosure.

FIG. 33 sets forth a flow chart illustrating another method for wheel theft detection and notification using a TPMS according to at least one embodiment of the present disclosure.

FIG. 37 sets forth a flow chart illustrating another method for wheel theft detection and notification using a TPMS according to at least one embodiment of the present disclosure.

DETAILED DESCRIPTION

Figure 1A:
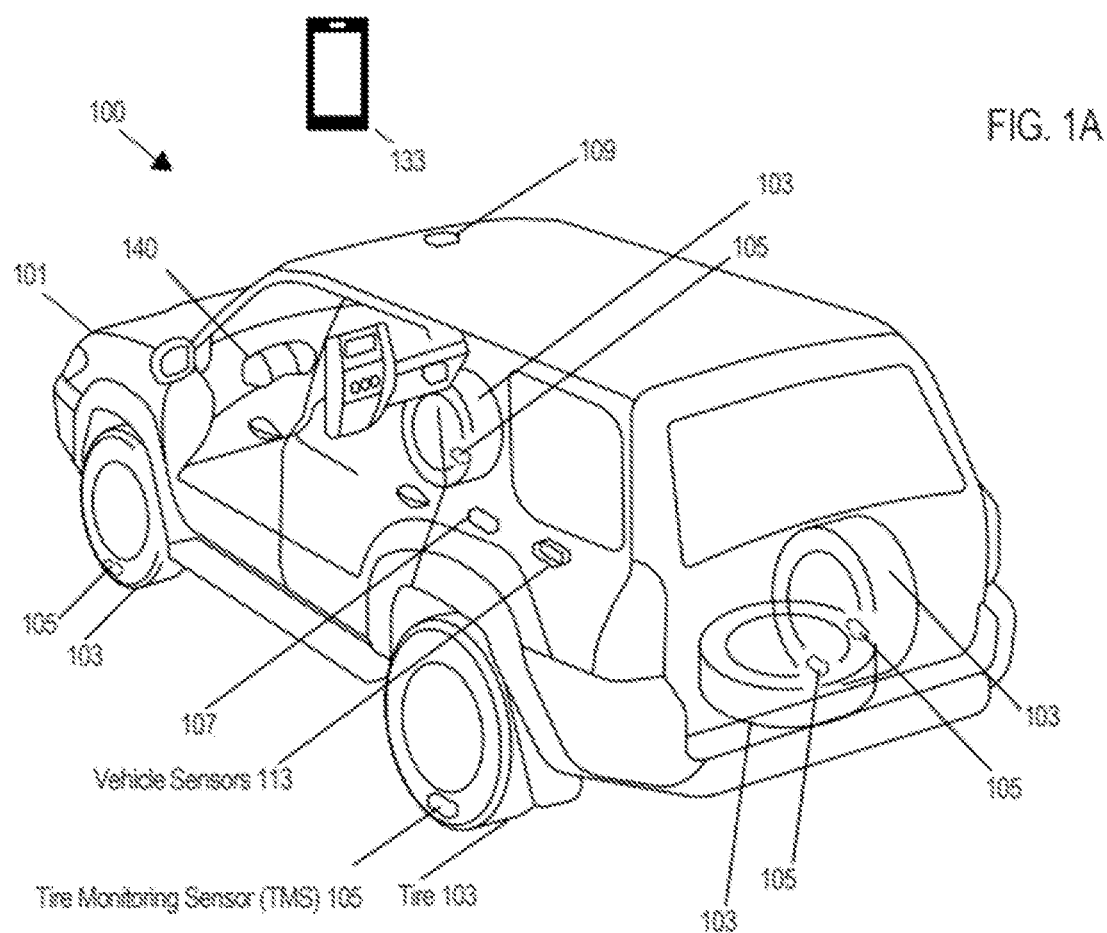
FIG. 1A sets forth an isometric diagram of a system for wheel theft detection and notification using a tire pressure monitoring system (TPMS) in accordance with the present disclosure.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

To address the problem of wheel theft detection, the present disclosure details a method utilizing a vehicle's tire pressure monitoring system (TPMS) to identify when a wheel theft is occurring and to notify the vehicle systems. In some embodiments, this method is directed to systems with two-way communication between the vehicle electronic control unit (ECU) and wheel units (tire monitoring sensors coupled to a tire or wheel), but in other embodiments, a system with only one-way communication may be used.

Exemplary methods, apparatuses, and computer program products for wheel theft detection and notification using a tire pressure monitoring system (TPMS) in accordance with the present disclosure are described with reference to the accompanying drawings, beginning with FIG. 1A. For further explanation, FIG. 1A sets forth an isometric diagram of a system (100) for wheel theft detection and notification using a tire pressure monitoring system (TPMS) in accordance with the present disclosure. FIG. 1B sets forth a top view of the system of FIG. 1A. The system of FIGS. 1A and 1B include a vehicle (101) equipped with tires (103) that include tire monitoring sensor (TMS) (105). A TMS is a sensor that is configured to monitor and transmit parameters of a tire. According to embodiments of the present disclosure, a TMS may be coupled to some portion of the tire (e.g., mounted to an inner portion of the tire). In at least one embodiment, the TMS may be coupled to a valve stem of the tire. A TMS may also be coupled to a wheel rim. As will be explained in greater detail below, a TMS may transmit data, such as tire parameters, to a receiver of a tire pressure monitoring system (TPMS).

Figure 1B:
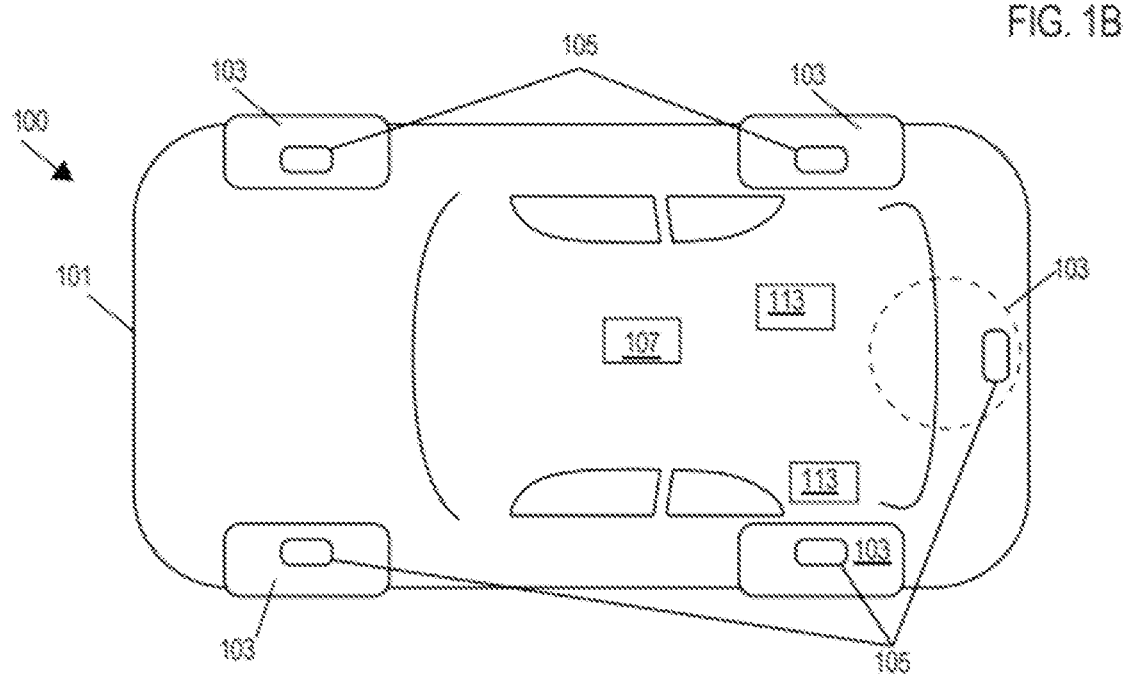
FIG. 1B sets forth a top view of the system of FIG. 1A.

The vehicle of FIGS. 1A and 1B further includes an electronic control unit (ECU) (107) that controls various components, subsystems, and systems within a vehicle. Commonly referred to as the vehicle's "computers", an ECU may be a central control unit or may refer collectively to one or more vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In the example of FIGS. 1A and 1B, the vehicle (101) includes a dashboard display screen (140) for displaying messages from the ECU (107). For example, the ECU (107) may send a 'low tire pressure' message to a component connected to the dashboard display screen (140). In this example, in response to receiving the 'low tire pressure' message, the component may turn on a 'low tire pressure' indicator that is displayed on the dashboard display screen (140).

Each TMS (105) may be equipped with a wireless transceiver for bidirectional wireless communication with the ECU (107), as will be described in more detail below. The ECU is similarly equipped with a wireless transceiver for bidirectional wireless communication with each of the TMSs (105), as will be described in more detail below. The bidirectional wireless communication may be realized by low power communication technology such as Bluetooth Low Energy or other low power bidirectional communication technology that is intended to conserve the amount of energy consumed. Alternatively, each TMS (105) may include a unidirectional transmitter configured to transmit signals to the ECU (107). In some embodiments, each TMS (105) and the ECU (107) may communicate directly with a monitoring device (133), such as a smart phone, tablet, or diagnostic tool, as will be described in more detail below.

Each vehicle system may include sensors (113) used to measure and communicate vehicle operating conditions. For example, an ABS may include wheel speed sensors on the wheelbase used to measure wheel speed. An ESP subsystem may include yaw rate sensors configured to measure the yaw-induced acceleration of the vehicle when the vehicle is maneuvering a curve. Readings from such sensors (113) may be provided to the ECU (107), which may provide parameters based on these readings to the TMS (105).

The vehicle (101) may further include a transceiver (109) communicatively coupled to the ECU (107) for cellular terrestrial communication, satellite communication, or both.

In a particular embodiment, the ECU (107) is configured to perform the operations of: monitoring one or more parameters associated with a TMS (105) coupled to a wheel assembly of the vehicle; based on the monitored one or more parameters, determining that the wheel assembly is in a compromised state associated with the wheel assembly being dislocated from the vehicle or in danger of being dislocated from the vehicle; and in response to determining that the wheel assembly is in the compromised state, triggering an alarm of a vehicle security system. The ECU (107) may also be configured to perform the operations of determining that a wheel assembly is in a compromised state associated with the wheel assembly being dislocated from the vehicle or in danger of being dislocated from the vehicle; and responsive to determining that the wheel assembly is in the compromised state, transmitting to a first device, a message indicating that the wheel assembly is in the compromised state. In another embodiment, the ECU (107) is configured to perform the operations of: detecting a change from ON to OFF in a status of a vehicle ignition of the vehicle; responsive to detecting the change from ON to OFF in the status of the vehicle ignition, transmitting to a plurality of TMSs of the vehicle, a message indicating the vehicle ignition is OFF; detecting a change from OFF to ON in the status of the vehicle ignition; responsive to detecting the change from OFF to ON in the status of the vehicle ignition, transmitting to the plurality of TMSs, by the ECU, a message indicating the ignition is ON; for each TMS in the plurality of TMSs, receiving an indication of whether the TMS detected a change in orientation of the TMS; and based on the indications received from the plurality of TMSs, determining whether to initiate an autolocation mechanism on the plurality of TMS.

In a particular embodiment, the TMS (105) is configured to perform the operations of: receiving from the ECU (107) an indication that a vehicle security system is activated; after receiving the indication that the vehicle security system is activated, performing a wheel theft detection operation that includes: measuring one or more parameter values associated with a wheel assembly; and determining whether the one or more measured parameter values deviate from one or more reference parameter values by one or more predetermined amounts; and after determining that the one or more measured parameter values deviate from the one or more reference parameter values by the one or more predetermined amounts, transmitting an indication that the one or more parameter values have changed. The TMS (105) may also be configured to perform the operations of determining that a wheel assembly associated with the TMS is in a compromised state associated with the wheel assembly being dislocated from the vehicle or in danger of being dislocated from the vehicle; and responsive to determining that the wheel assembly is designated as being in the compromised state, broadcasting, by the TMS, a message indicating that the wheel assembly is in the compromised state.

In a particular embodiment, the monitoring device (133) is configured to perform the operations of: receiving from the TMS (105), a first message indicating a wheel assembly associated with the TMS is in a compromised state associated with the wheel assembly being dislocated from the vehicle or in danger of being dislocated from the vehicle; determining a location of the wheel assembly; and transmitting to a second device, by the first device, the determined location of the wheel assembly. In another embodiment, the monitoring device (133) is configured to perform the operations of: receiving from a first device, an indication that a wheel assembly is in a compromised state associated with the wheel assembly being dislocated from the vehicle or in danger of being dislocated from the vehicle, the indication including an identification associated with the wheel assembly; receiving from a TMS a message that includes the identification associated with the wheel assembly; and transmitting to the TMS, a message to update a current status of the wheel assembly to the compromised state.

The arrangement of devices making up the exemplary system illustrated in FIGS. 1A and 1B are for explanation, not for limitation. Data processing systems useful according to various embodiments of the present disclosure may include additional servers, routers, other devices, and peer-to-peer architectures, not shown in FIGS. 1A and 1B, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, Local Interconnect Network (LIN) protocol, FlexRay protocol, and others as will occur to those of skill in the art. Various embodiments of the present disclosure may be implemented on a variety of hardware platforms in addition to those illustrated in FIGS. 1A and 1B.

Figure 2:
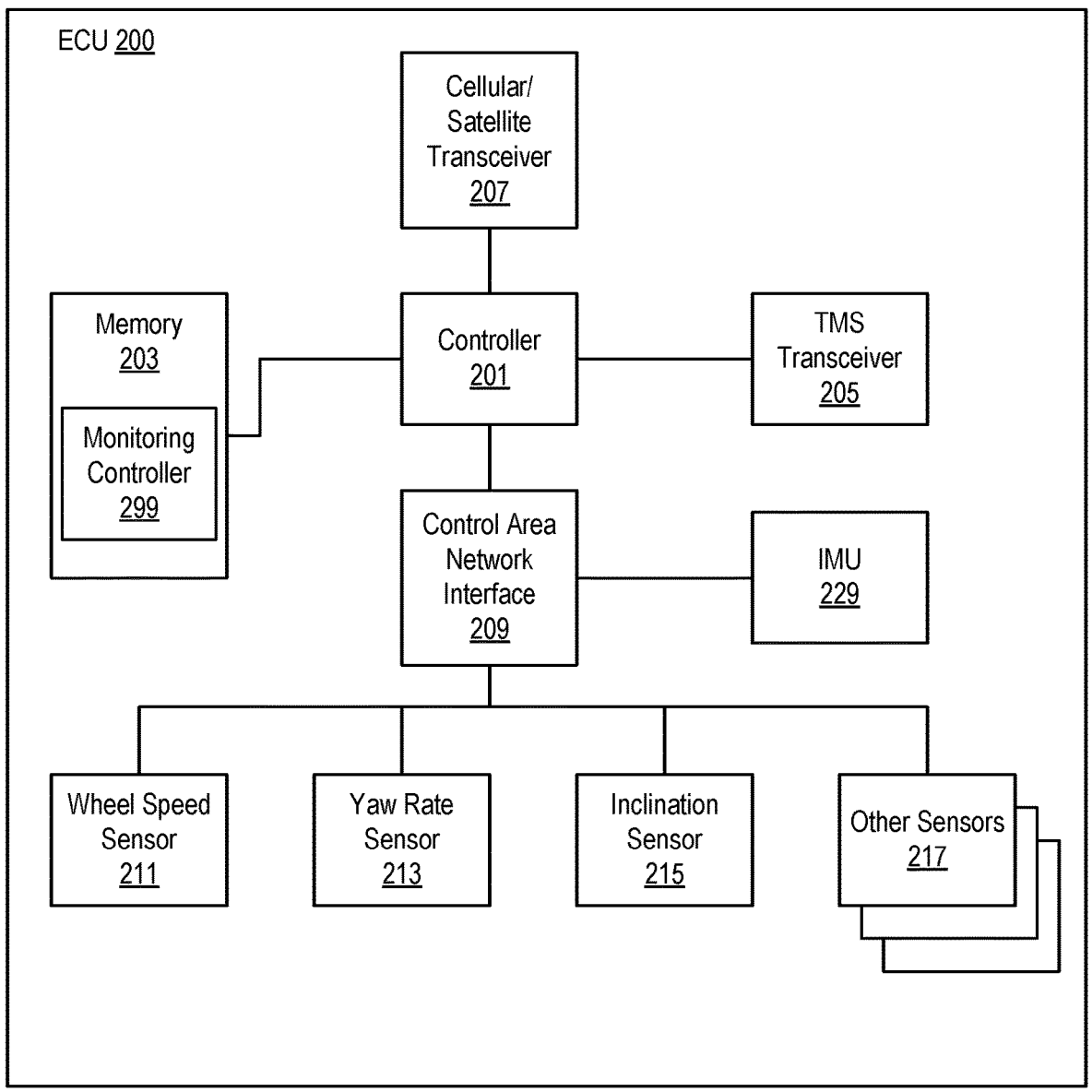
FIG. 2 sets forth a diagram of an exemplary electronic control unit (ECU) configured for wheel theft detection and notification using a TPMS according to at least one embodiment of the present disclosure.

For further explanation, FIG. 2 sets forth a diagram of an exemplary electronic control unit (ECU) (200) for wheel theft detection and notification using a tire pressure monitoring system (TPMS) according to embodiments of the present disclosure. The ECU (200) includes a controller (201) coupled to a memory (203). The controller (201) is configured to obtain sensor readings related to vehicle operating conditions, as well as data from sources external to the vehicle, and provide configuration parameters to a TMS, such as TMS (300) (see FIG. 3). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (203). The memory (203) may be a non-volatile memory such as flash memory. For example, the ECU (200) may obtain vehicle operating condition data, such as sensor readings from sensors on-board the vehicle.

For bidirectional wireless communication with a TMS, the ECU (200) of FIG. 2 includes a TMS transceiver (205) coupled to the controller (201). In one embodiment, the TMS transceiver (205) is a Bluetooth Low Energy transmitter-receiver. In other embodiments, the TMS transceiver (205) may be other types of low power radio frequency communication technology that is intended to conserve energy consumed in the TMS. The ECU (200) may further include a transceiver (207) for cellular terrestrial communication, satellite communication, or both. In some examples, the ECU (200) communicates with a cloud-based server to transmit sensor readings and tire feature data, and to receive an analytical result.

The ECU (200) may further comprise a controller area network (CAN) interface (209) for communicatively coupling vehicle sensors and devices to the controller (201). In the example of FIG. 2, the CAN interface (209) couples a wheel speed sensor (211), a yaw rate sensor (213), an inclination sensor (215), and other sensors (217), to the controller (201). The wheel speed sensor (211) measures the rotational angular speed of the wheel, e.g., in radians per second. The yaw rate sensor (213) may be used to measure the yaw-induced acceleration of the vehicle, for example, when the vehicle is maneuvering a curve, which will influence the magnitude of loading on each tire. The yaw rate sensor (213) may also provide information on the shear forces on the tire where it contacts the road. The inclination sensor (215) may detect longitudinal and/or transverse inclination of the vehicle. The wheel speed sensor (211), the yaw rate sensor (213), and the inclination sensor (215) transmit respective readings to the controller (201). In some examples, an inertial measurement unit (IMU) (229) is configured to measures a vehicle's specific force, angular rate, and/or orientation using a combination of accelerometers, gyroscopes, and/or magnetometers.

In a particular embodiment, the memory (203) includes a monitoring controller (299) that includes computer program instructions that when executed by the controller (201) cause the controller (201) to perform the operations of: monitoring one or more parameters associated with a TMS coupled to a wheel assembly of the vehicle; based on the monitored one or more parameters, determining that the wheel assembly is in a compromised state associated with the wheel assembly being dislocated from the vehicle or in danger of being dislocated from the vehicle; and in response to determining that the wheel assembly is in the compromised state, triggering an alarm of a vehicle security system. The monitoring controller (299) also includes computer program instructions that when executed by the controller (201) cause the controller (201) to perform the operations of: determining that a wheel assembly is in a compromised state associated with the wheel assembly being dislocated from the vehicle or in danger of being dislocated from the vehicle; and responsive to determining that the wheel assembly is in the compromised state, transmitting to a first device, a message indicating that the wheel assembly is in the compromised state.

In another embodiment, the monitoring controller (299) also includes computer program instructions that when executed by the controller (201) cause the controller (201) to perform the operations of: detecting a change from ON to OFF in a status of a vehicle ignition of the vehicle; responsive to detecting the change from ON to OFF in the status of the vehicle ignition, transmitting to a plurality of TMSs of the vehicle, a message indicating the vehicle ignition is OFF; detecting a change from OFF to ON in the status of the vehicle ignition; responsive to detecting the change from OFF to ON in the status of the vehicle ignition, transmitting to the plurality of TMSs, by the ECU, a message indicating the ignition is ON; for each TMS in the plurality of TMSs, receiving an indication of whether the TMS detected a change in orientation of the TMS; and based on the indications received from the plurality of TMSs, determining whether to initiate an autolocation mechanism on the plurality of TMS.

Figure 3:
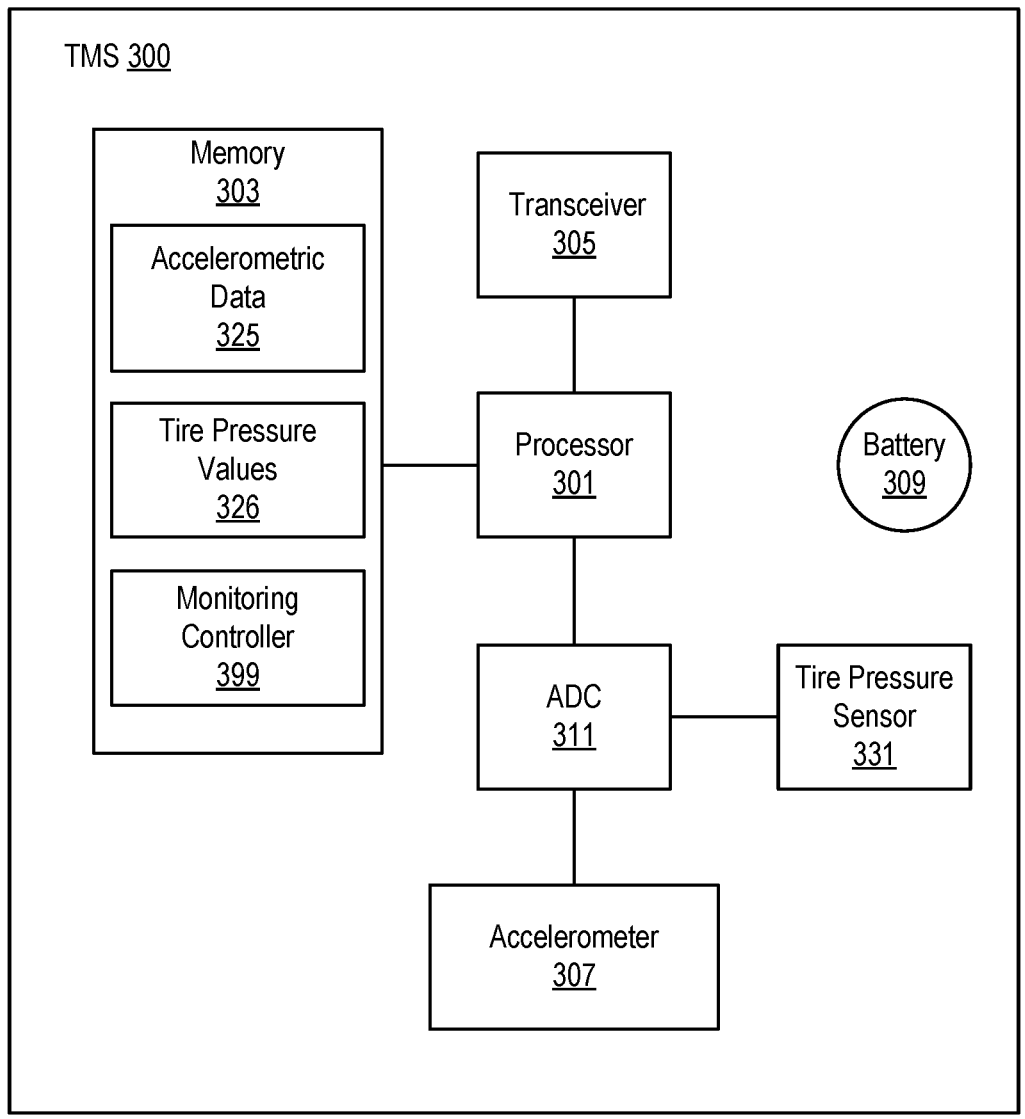
FIG. 3 sets forth a diagram of an exemplary tire monitoring sensor (TMS) configured for wheel theft detection and notification using a TPMS according to at least one embodiment of the present disclosure.

For further explanation, FIG. 3 sets forth a diagram of an exemplary tire monitoring sensor (TMS) (300) for wheel theft detection and notification using a tire pressure monitoring system (TPMS) according to embodiments of the present disclosure. The TMS (300) includes a processor (301). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (300) of FIG. 3 also includes a memory (303) coupled to the processor (301). The memory (303) may also store accelerometric data (325), including a raw digital signal sampled from an accelerometer (307) by the ADC (311) and a processed accelerometric waveform processed by the processor (301). The memory (303) may also store tire pressure values (326) captured by a tire pressure sensor (331) via an analog to digital converter (ADC) (311).

For bidirectional wireless communication with the ECU (200), the TMS (300) of FIG. 3 includes a transceiver (305) coupled to the processor (301). In one embodiment, the transceiver (305) is a Bluetooth Low Energy transmitter-receiver. In other embodiments, the transceiver (305) may be other types of low energy bidirectional communication technology that is intended to conserve energy consumed in the TMS (300). The TMS (300) may transmit accelerometric data and tire pressure values to the ECU (200) via the transceiver (305). In an alternative embodiment, the TMS (300) includes a unidirectional transmitter configured to transmit data to the ECU (200).

The accelerometer (307) of FIG. 3 may also be an acceleration sensor, an accelerometric device, a shock sensor, a force sensor, a microelectromechanical systems (MEMs) sensor, or other device that is similarly responsive to acceleration magnitude and/or to changes in acceleration, such that a tire revolution may be determined from the time between detected ground strike events. For example, an accelerometer senses acceleration in the radial plane (z-plane), lateral plane (y-plane), tangential plane (x-plane), or any combination of the three planes, and outputs an electric pulse signal responsive to sensed acceleration, including but not limited to signals indicative of ground strikes. In an embodiment, the accelerometer (307) is configurable with an accelerometer range, a wheel speed parameter, or other vehicle parameter provided by the ECU (200). For example, g-offset can be determined via wheel speed sensor or another vehicle parameter and used to capture and process signals faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

In the example of FIG. 3, the ADC (311) is configured to receive the electric pulse signals from the accelerometer (307) and the tire pressure sensor (331), and sample the signals according to a sampling rate. The ADC (311) converts the raw analog signals received from the accelerometer (307) and the tire pressure sensor (331) into raw digital signals that are suitable for digital signal processing.

The TMS (300) of FIG. 3 also includes a battery (309) connected to a power bus (not shown) to power the transceiver (305), the processor (301), the ADC (311), the accelerometer (307), and the memory (303). The TMS (300) may be powered by other sources alternative to or in addition to the battery (309), such as an energy harvester or other power source.

In a particular embodiment, the memory (303) includes a monitoring controller (399) that includes computer program instructions that when executed by the processor (301) cause the processor (301) to perform the operations of: receiving from the ECU an indication that a vehicle security system is activated; after receiving the indication that the vehicle security system is activated, performing a wheel theft detection operation that includes: measuring one or more parameter values associated with a wheel assembly; and determining whether the one or more measured parameter values deviate from one or more reference parameter values by one or more predetermined amounts; and after determining that the one or more measured parameter values deviate from the one or more reference parameter values by the one or more predetermined amounts, transmitting an indication that the one or more parameter values have changed. The monitoring controller (399) that includes computer program instructions that when executed by the processor (301) cause the processor (301) to perform the operations of: determining that a wheel assembly associated with the TMS is in a compromised state associated with the wheel assembly being dislocated from the vehicle or in danger of being dislocated from the vehicle; and responsive to determining that the wheel assembly is designated as being in the compromised state, broadcasting, by the TMS, a message indicating that the wheel assembly is in the compromised state.

Figure 4:
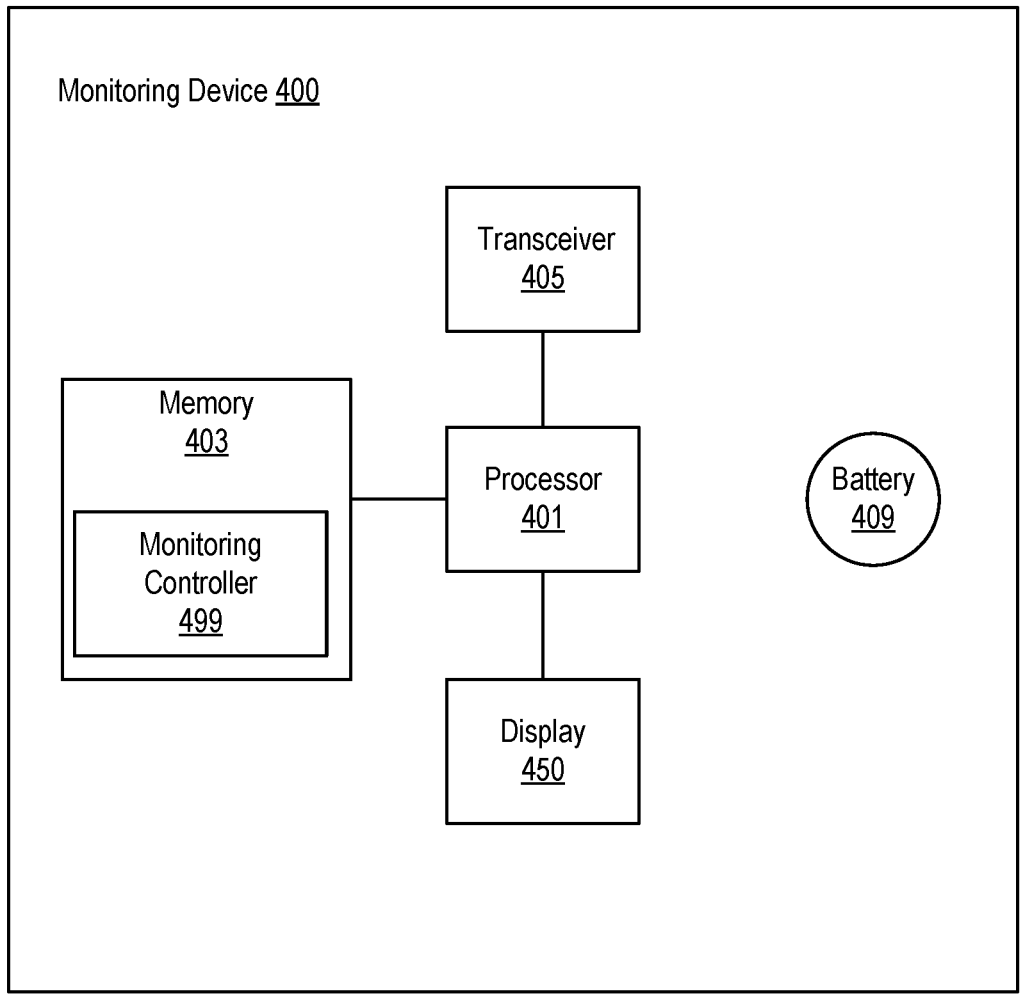
FIG. 4 sets forth a diagram of an exemplary computing device configured for wheel theft detection and notification using a TPMS according to at least one embodiment of the present disclosure.

For further explanation, FIG. 4 sets forth a diagram of an exemplary monitoring device (400) for wheel theft detection and notification using a tire pressure monitoring system (TPMS) according to embodiments of the present disclosure. Examples of monitoring devices include but are not limited to handheld devices, mobile devices, cell phones, or any other computing devices that may be configured to perform wheel theft detection and notification according to one or more embodiments of the present disclosure. The monitoring device (400) includes a processor (401) coupled to a memory (403). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The memory (403) may be a non-volatile memory such as flash memory.

In the example of FIG. 4, the monitoring device (400) also includes a display device (450) for displaying information related to wheel detection and notification. For example, the monitoring device may display on the display device a map that indicates a location of a wheel assembly. As another example, the monitoring device may display on the display device an interface for an application that allows the user to indicate that a wheel assembly is in a compromised state.

For bidirectional wireless communication with another computing device, such as a TMS, an ECU, the monitoring device (400) of FIG. 4 includes a transceiver (405) coupled to the processor (401). In one embodiment, the transceiver (405) is a Bluetooth Low Energy transmitter-receiver. In other embodiments, the transceiver (405) may be other types of low power radio frequency communication technology that is intended to conserve energy consumed in the TMS. The monitoring device (400) may further include a transceiver (405) for cellular terrestrial communication, satellite communication, or both. In some examples, the monitoring device (400) communicates with a cloud-based server to transmit sensor readings and tire feature data, and to receive an analytical result.

In a particular embodiment, the memory (403) includes a monitoring controller (499) that includes computer program instructions that when executed by a processor (401) cause the monitoring device (400) to perform the operations of: receiving from the TMS, a first message indicating a wheel assembly associated with the TMS is in a compromised state associated with the wheel assembly being dislocated from the vehicle or in danger of being dislocated from the vehicle; determining a location of the wheel assembly; and transmitting to a second device, by the first device, the determined location of the wheel assembly. In another embodiment, the monitoring controller (499) includes computer program instructions that when executed by the processor (401) cause the monitoring device (400) to perform the operations of: out the operations of: receiving from a first device, an indication that a wheel assembly is in a compromised state associated with the wheel assembly being dislocated from the vehicle or in danger of being dislocated from the vehicle, the indication including an identification associated with the wheel assembly; receiving from a TMS a message that includes the identification associated with the wheel assembly; and transmitting to the TMS, a message to update a current status of the wheel assembly to the compromised state.

Figure 5:
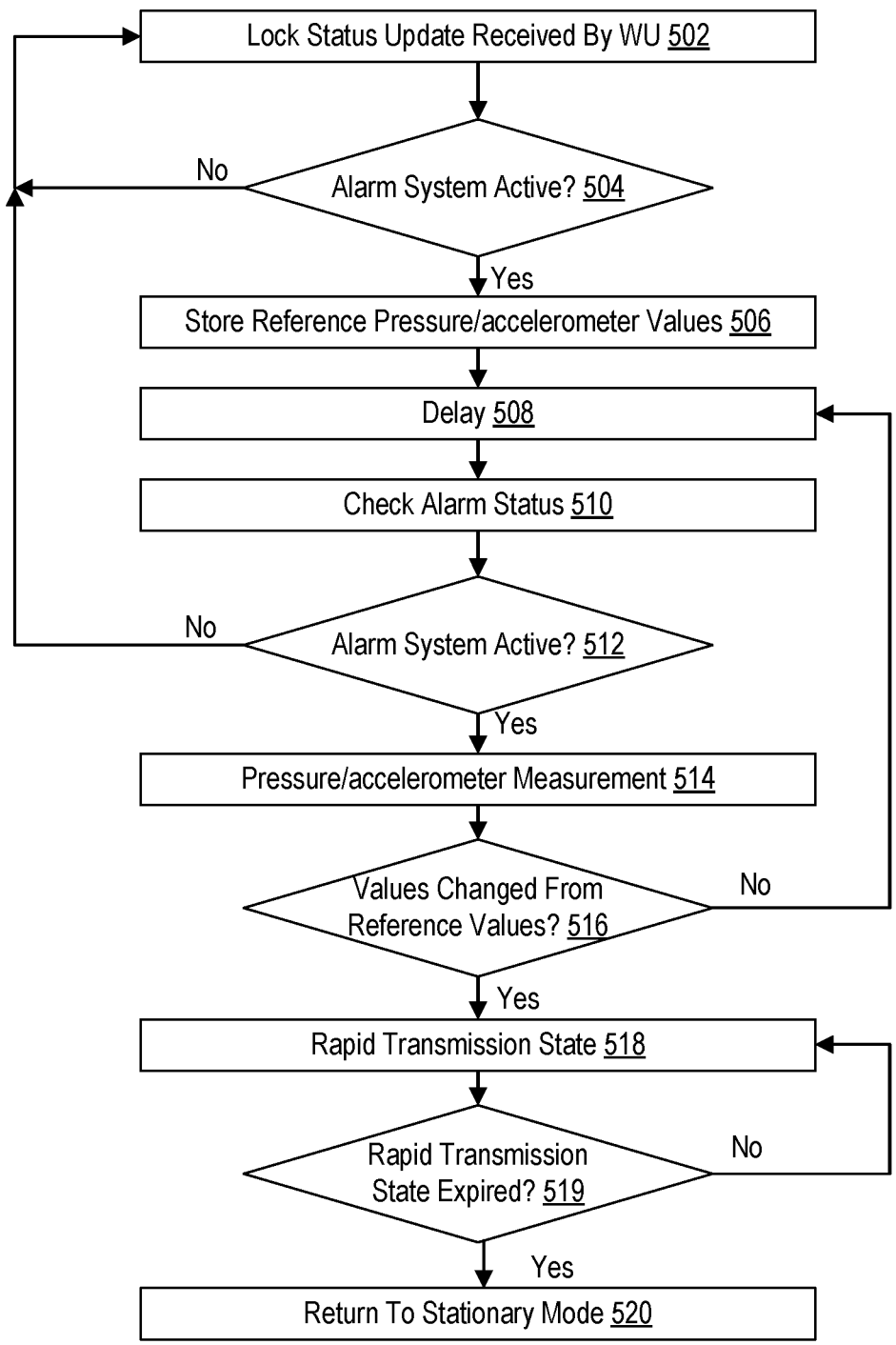
FIG. 5 sets forth a flow chart illustrating a method for wheel theft detection and notification using a TPMS according to at least one embodiment of the present disclosure.

For further explanation, FIG. 5 sets forth a flow chart illustrating a method of wheel theft detection and notification. For the purposes of explaining the wheel theft detection process, the flow chart excludes any processes undertaken by the wheel unit that may be happening in parallel to wheel theft detection. In the method of FIG. 5, the wheel unit (e.g., a TMS (300) of FIG. 3) receives (502) an indication from the vehicle ECU (e.g., as part of the ECU (200) of FIG. 2) of the vehicle alarm system status. This could occur at regular intervals or only on a status change. This step is intended to prevent additional monitoring or transmissions from the sensor when not required to perform wheel theft monitoring and to prevent false alarm triggers during routine wheel removal. The overall system could also be implemented without this step, for example in a system without two-way communication, by the vehicle ECU checking the status of the vehicle alarm before sending a wheel theft warning but would potentially result in higher current consumption within the wheel unit as the sampling and transmission steps would be active each time the vehicle was stationary. The method of FIG. 5 also includes the wheel unit checking (504) the status reported from the vehicle ECU and if the alarm system has been activated, moves into an initialization phase for wheel theft monitoring. If the alarm is inactive the sensor continues in its normal operating mode.

The method of FIG. 5 includes the sensor taking and storing (506) reference pressure and/or accelerometer measurements. In a particular embodiment of the method, a MEMS accelerometer can provide a stationary offset value indicative of wheel unit orientation and may be a single or multiple axis device. In combination with the stationary offset or as an alternative during the reference measurement a noise measurement may also be taken to be used in detecting vibrations during the wheel removal. The method of FIG. 5 also includes providing (508) a delay between samples and would follow the typical sampling intervals for pressure/LF/motion used in TPMS wheel units (e.g., $10s$). The method of FIG. 5 continues with the alarm status being checked (512) in case an update has been sent by the vehicle ECU during the sampling delay and based on the result either proceeds to sampling the pressure and accelerometer inputs or reverts to a normal operating mode.

During step (514) and step (516) the pressure and accelerometer inputs are measured and if the results have changed by more than a pre-determined value, a notification stage is entered. Otherwise, the sensor moves back to the method step (508). In step (518) and step (519) the wheel unit enters a fast transmission state to enable the vehicle ECU to monitor the signal strength and/or time of flight of the sensor transmissions in order to infer if the distance between the wheel unit and vehicle ECU is increasing. These transmissions may contain an indicator in the frame contents to identify the transmissions as associated with the wheel theft feature. The wheel unit will continue in this mode until either pre-defined exit criteria are met, such as number of transmissions or time, or if two-way communication is available this could be achieved by sending a stop message from the vehicle ECU. If the system is based on Bluetooth an alternative implementation would be to send connectable advertisements in step (518) allowing the vehicle ECU to control the transmission rate and duration. Once the fast transmission rate has expired the sensor may revert to a normal operating mode as shown in FIG. 5 or move back to an earlier step in the detection process to continue monitoring.

Figure 6:
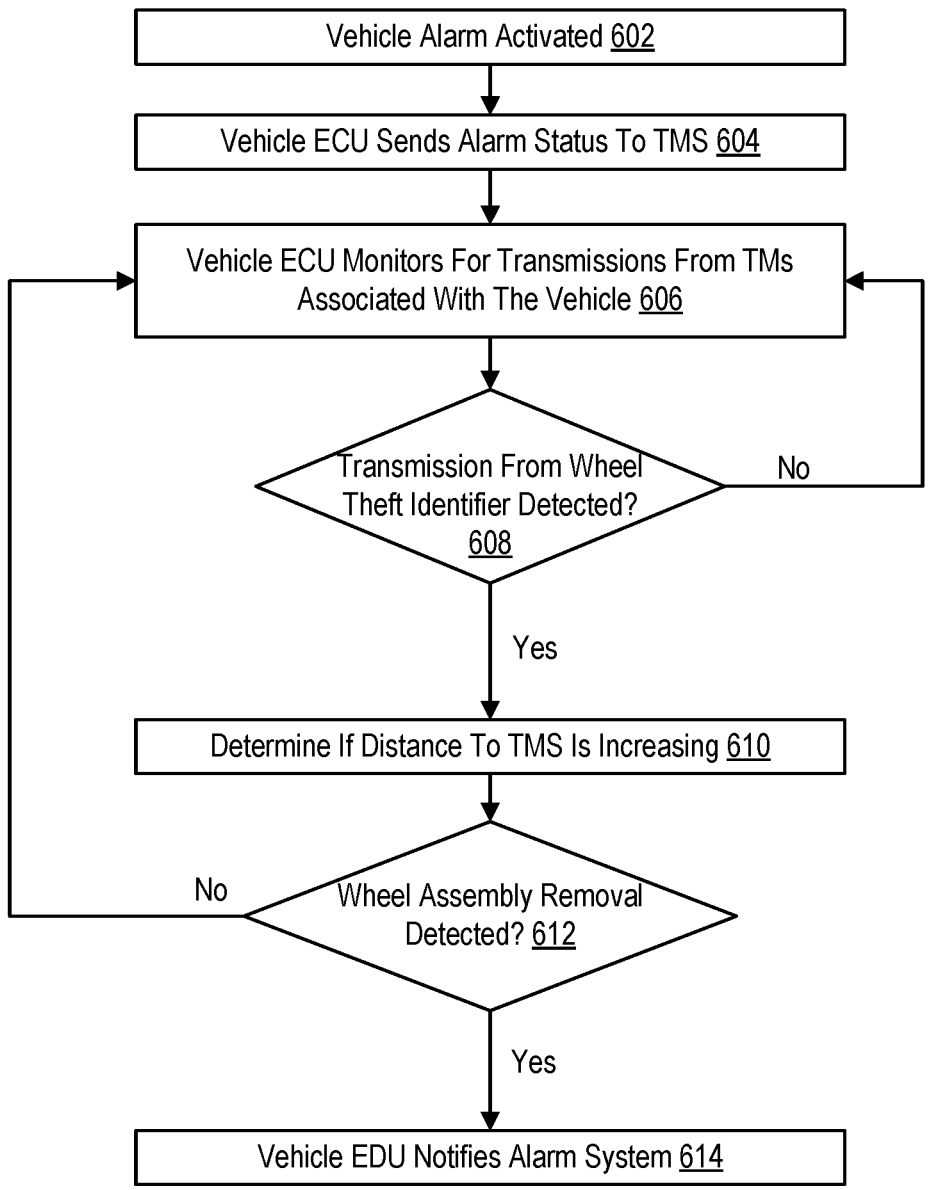
FIG. 6 sets forth a flowchart illustrating another method for wheel theft detection and notification using a TPMS according to at least one embodiment of the present disclosure.

For further explanation, FIG. 6 sets forth a flowchart of a method for wheel theft detection and notification using a TPMS. In step (602), the vehicle ECU sends the alarm status to the wheel units fitted to the vehicle. This could either be via a standard UHF transmission or if implemented in a Bluetooth system the vehicle ECU may connect to each wheel unit and modify a registry location within the wheel unit memory. In step (604) and step (606) the vehicle ECU monitors for transmissions from the wheel units known to be fitted to the vehicle and if a transmission is received indicating that the sensor has detected a change in the wheel state the ECU begins an assessment phase. Otherwise, the vehicle ECU continues monitoring for wheel unit transmissions. There is another approach which can be taken if two-way communication is available. The vehicle ECU could request data or initiate transmissions from the one or more wheel units if the vehicle alarm system has detected inputs from other modules on the vehicle (e.g., suspension level or tilt) that could be indicative of the early stages of a wheel theft attempt, but not enough to indicate a break-in and activate the alarm system. This may enable earlier detection of a wheel theft attempt and if used as an alternative to the wheel units monitoring sensor inputs could reduce the wheel unit battery consumption.

In step (610) the vehicle ECU begins to monitor the indicators used to determine if the wheel is being removed from the vehicle. There are several proposed options for determining if a wheel theft event is in progress for either single or multiple wheels. A simple method for detecting the theft of multiple wheels would be to trigger the alarm system if multiple wheel units notify the vehicle ECU of a change in wheel state (e.g., pressure loss or orientation change) within a pre-defined time period. This method could be effective for multiple wheel theft but is unsuitable for the detection of a single wheel.

In a particular embodiment, the method may utilize signal strength information such as the standard Received Signal Strength Index/Indicator (RSSI) monitored over a defined time period to estimate if the distance between the wheel unit and vehicle ECU is changing. The RSSI measurement could also be combined with or replaced by a time of flight measurement to improve the estimation accuracy, and in a system that includes two-way communication between the wheel units and vehicle ECU (such as Bluetooth) the vehicle ECU could control the transmission rate and duration of the fast transmission state of the wheel unit as required.

The calculated RSSI values can also be compared against historical values from the wheel unit to determine if the calculated RSSI values are within an expected range and potentially assist in preventing false detections. In a further improvement the vehicle ECU could utilize RSSI or similar information from other wireless modules fixed to the vehicle structure such as wireless brake wear monitoring sensors and remote keyless entry systems to provide confirmation or improve the accuracy of the distance estimation.

In step (612) and step (614) the results of the calculations in step (610) are compared against pre-determined thresholds and if these are exceeded the vehicle ECU notifies the vehicle alarm system which may take include inputs from other vehicle systems in the decision to activate the alarm system.

Figure 7:
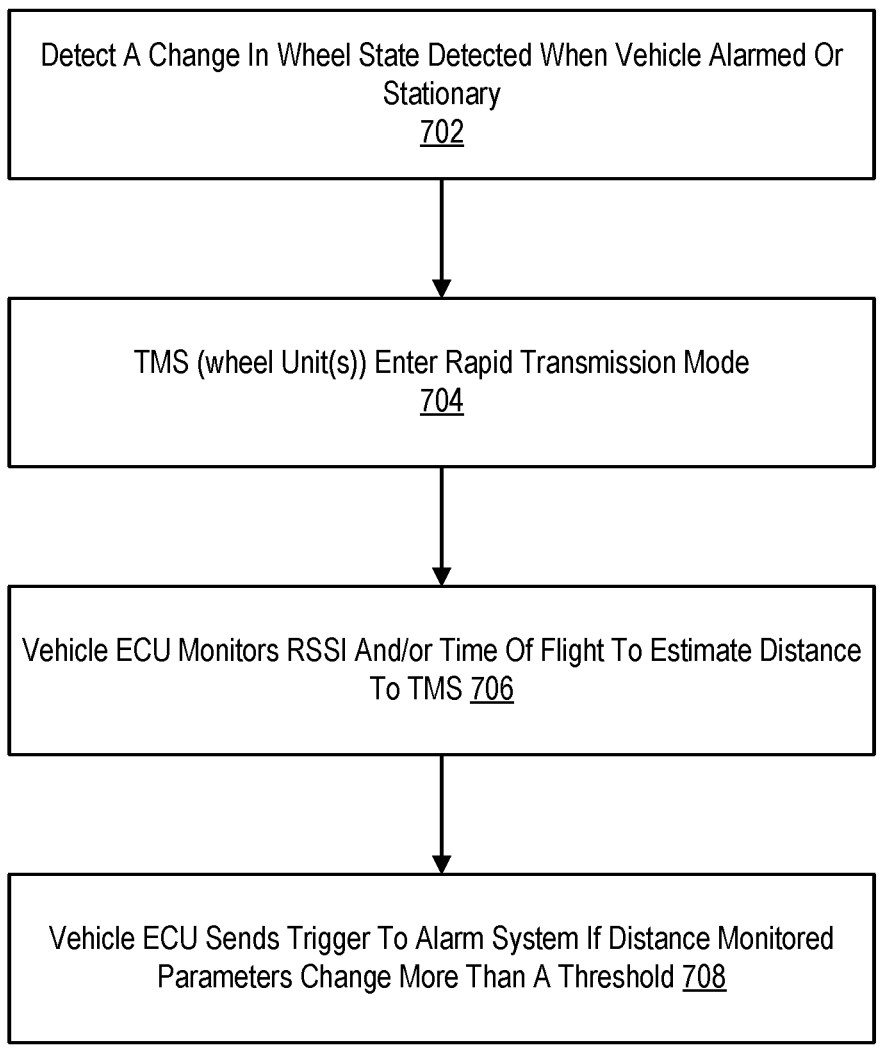
FIG. 7 sets forth a flowchart illustrating another method for wheel theft detection and notification using a TPMS according to at least one embodiment of the present disclosure.

For further explanation, FIG. 7 sets forth a flowchart of a method for wheel theft detection and notification using a TPMS. The method of FIG. 7 includes detecting (702) a change in wheel state when vehicle is alarmed or stationary. The method also includes in response to detecting a change in wheel state when the vehicle is alarmed or stationary, entering (704) rapid transmission mode in the wheel units. The method of FIG. 7 also includes the vehicle ECU monitoring (706) RSSI and/or time of flight to estimate distance to wheel units. Finally, the method of FIG. 7 includes the vehicle ECU sending (708) a trigger to the alarm system if the change in distance monitored parameters are above a threshold.

Figure 8A:
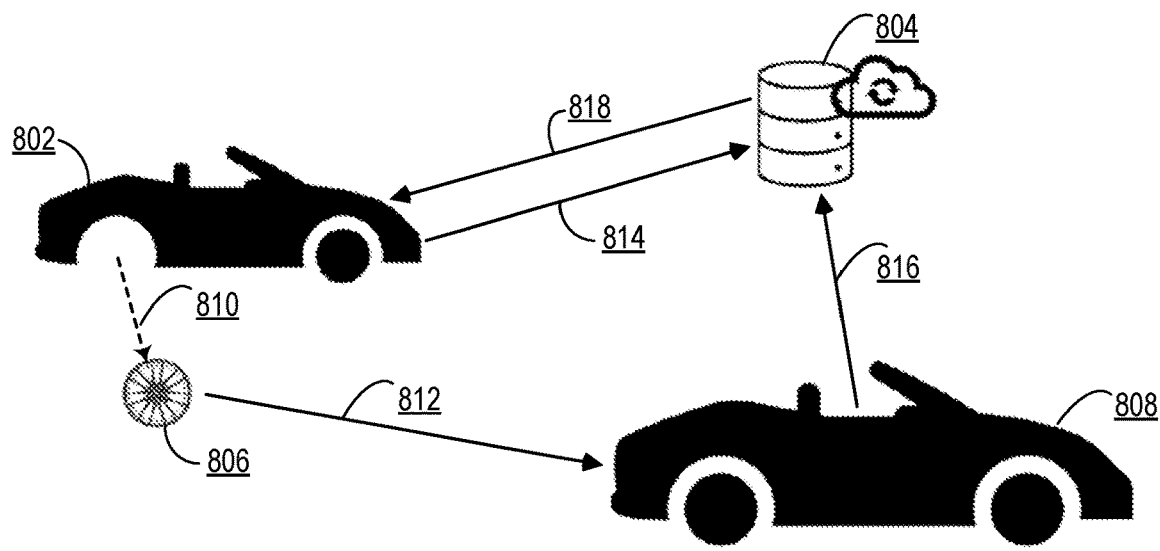
FIG. 8A sets forth a diagram illustrating another method for wheel theft detection and notification using a TPMS according to at least one embodiment of the present disclosure.

For further explanation, FIG. 8A sets forth a diagram illustrating a method for wheel theft detection and notification using a TPMS. The diagram of FIG. 8A illustrates a mechanism to track wheels which in turn will help a vehicle user in case if their vehicle's wheels are stolen or lost. The mechanism can also act as a deterrent for thieves. Also, for a second-hand tire buyer it can provide means to check if the tire has been illegally sold.

In this method, a TMS within the vehicle recognizes its owner's vehicle (802) and keeps track of the fact that it is fitted within its owner's vehicle. When the wheel (806) is illegally taken from the vehicle its tracking mechanism detects that it is no longer present in the owner's vehicle. After it has been established that the wheel (806) is no longer fitted within the owner's vehicle (806), a TMS starts broadcasting (810) a message on BLE that it has been lost or stolen.

In addition, the vehicle from which the wheel was stolen, may inform (814) a cloud server/central database (804) about wheel theft using telematics or any other means. When the stolen wheel (806) encounters any other vehicle (808), the TPMS receiver on the vehicle may detect (812) the broadcast from the stolen wheel. The TPMS receiver then informs (816) the cloud server/central database about the stolen wheel info received from the stolen wheel's broadcast. The cloud server/central database may then check the information against a stolen wheel list and inform (818) the legal owner/authorities about its location.

Figure 8B:
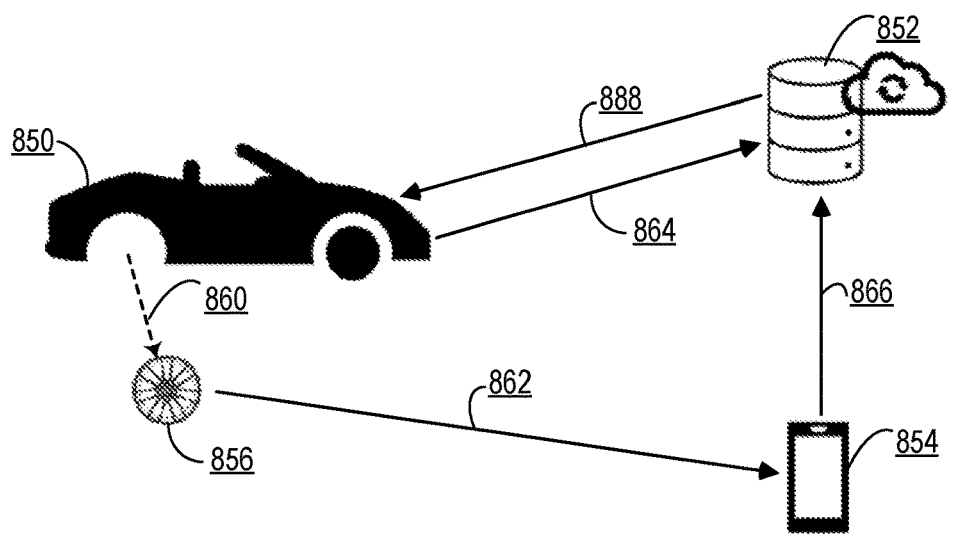
FIG. 8B sets forth a diagram illustrating another method for wheel theft detection and notification using a TPMS according to at least one embodiment of the present disclosure.

In the example of FIG. 8B, an application on a mobile device (854) may act as a TPMS receiver and could detect (862) a broadcast from a stolen wheel (856) in the vicinity and inform (866) the cloud server/central database (852). When a user is going to buy a second-hand wheel, using the application on the mobile device, a user can detect if the wheel is stolen or not.

To summarize, this method could detect the stolen or lost wheel when it comes in the range of a TPMS receiver or the mobile app is in vicinity. This method can give some level of protection against wheel theft. Along with that it also gives a second-hand wheel buyer a way to detect if a wheel is being legally sold or not. This method may also give a wheel unit dealer a way to track their wheels when they are in shipment and could give a level of protection against theft.

When wheels are removed and successfully tagged by either the vehicle or the TPM sensor in the wheel during removal, the TPM sensor will immediately start advertising its secret ID to let other devices, vehicles, TPM sensor in other wheels know its existence in that location. So that the system of collective devices can estimate the actual location and provide it to the actual owner.

Figure 9:
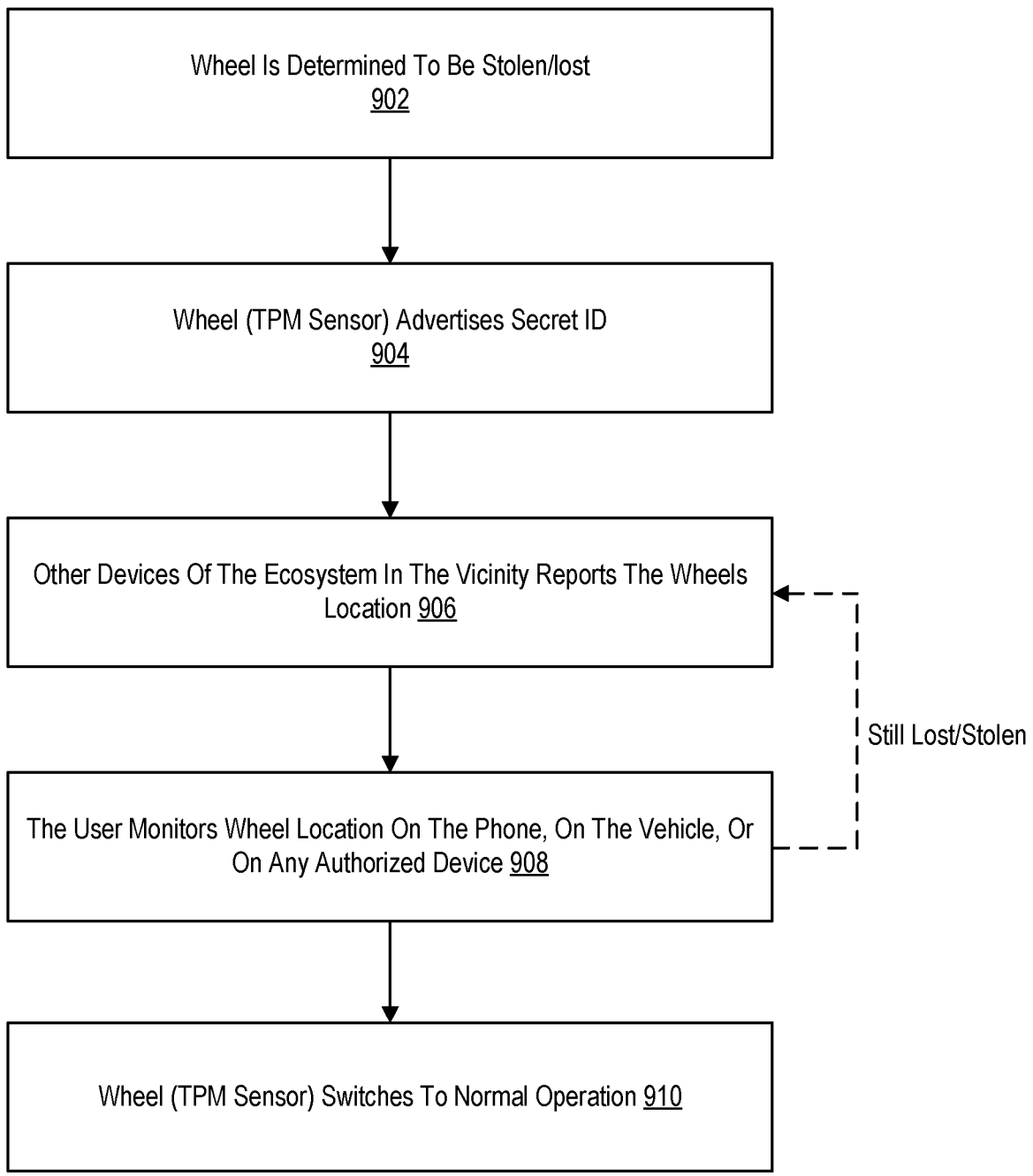
FIG. 9 sets forth a flowchart illustrating another method for wheel theft detection and notification using a TPMS according to at least one embodiment of the present disclosure.

For further explanation, FIG. 9 sets forth an example method for wheel theft detection and notification that includes determining (902) that the wheel is stolen/lost. The method also includes advertising (904), by the TPM sensor, a secret ID. In addition, the method also includes in response to receiving an advertisement of the secret ID, another device (e.g., a mobile device, the vehicle, or any other authorized device) in the vicinity of the stolen wheel, reporting (906), the wheel's location. In this example, the method includes monitoring (908), by the other device (e.g., a mobile device, the vehicle, or any other authorized device), the location of the wheel. Finally, the method of FIG. 9 includes switching (910) the TPM sensor of the wheel to normal operation in response to "finding" the wheel.

However, automatic local tagging of wheels may not work all the time. Therefore, the system may let the TPM sensor know remotely that the TPM sensor is stolen or lost. To do this, either the vehicle informs the TPM sensor automatically after event, the user via the vehicle, or the user via an application on a mobile device, that given wheels are stolen/lost. In that case, eco-system of devices (vehicles, phones, wheels—TPM Sensors, other Bluetooth capable IOT devices) will look for advertisement of remotely tagged stolen/lost wheels. When it is found, these devices will locally tag that a wheel which was remotely tagged previously to store updated status safely on the sensor.

Figure 10:
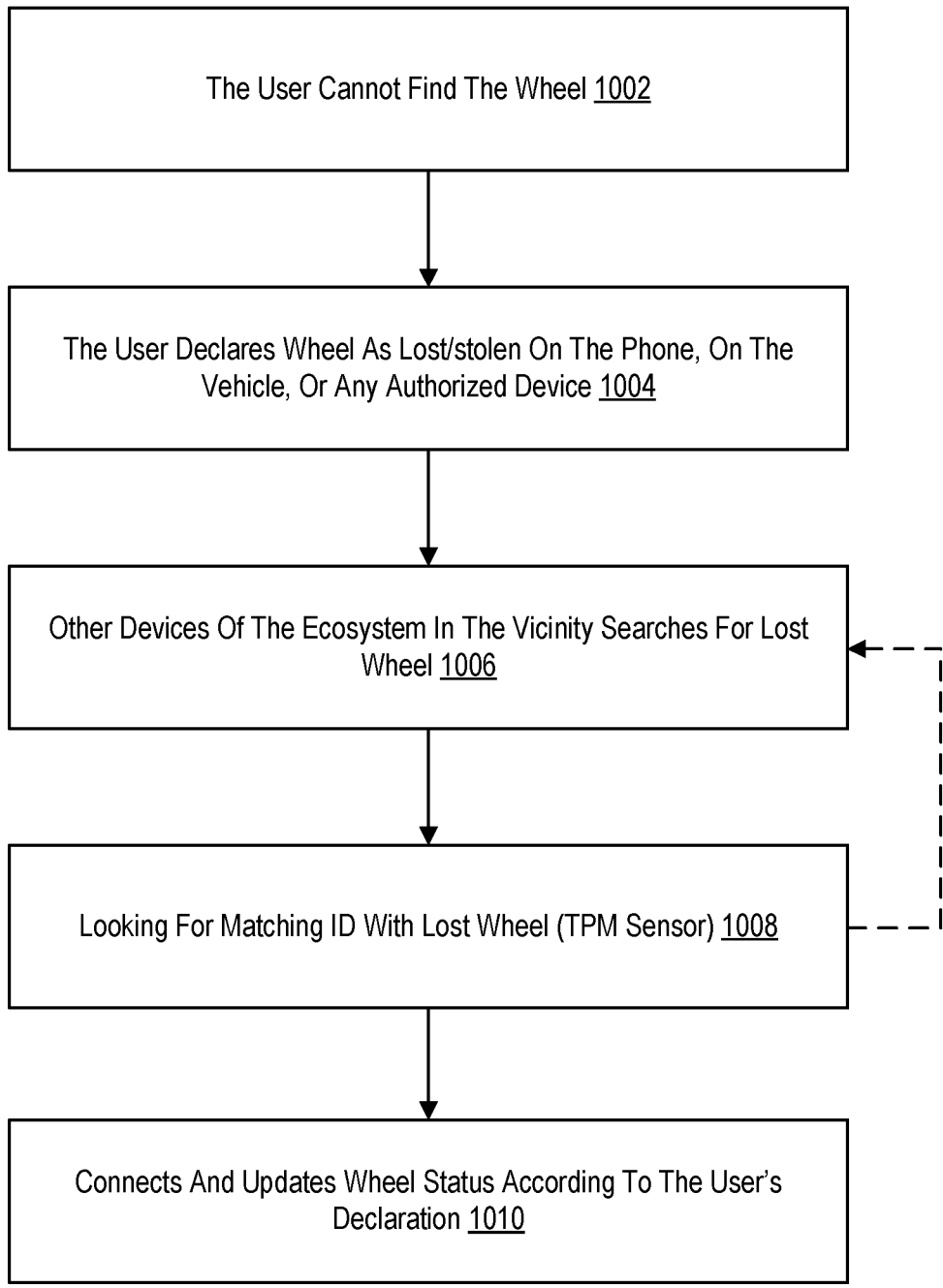
FIG. 10 sets forth a flowchart illustrating another method for wheel theft detection and notification using a TPMS according to at least one embodiment of the present disclosure.

For further explanation, FIG. 10 sets forth an example method of wheel theft detection and notification that includes a user determining (1002) that they cannot find the wheel and the user using an authorized device (e.g., a mobile device, the vehicle, or any other authorized device), to declare (1004) a wheel as lost or stolen. In addition, the method of FIG. 10 also includes searching (1006) by other devices for the lost wheel. In this example, the method includes looking (1008) for a matching ID of the lost TPM sensor/wheel. In response to finding the lost TPM sensor/wheel, the method includes the device connecting and updating (1010) the wheel status according to the user's declaration.

The wheel can declare itself lost after motion detection (during removal from original vehicle, during transportation, or when installed into an alien vehicle) and determined to have no communication with the linked/original vehicle for certain period. In that case, the wheel shall start advertisement of the secret ID immediately without requiring an update from other devices in the ecosystem. From now on, the wheel will advertise its secret ID to let other devices know that it is stolen/lost. A secret ID is used to avoid being tracked and identified by malicious attackers via a known fixed ID.

In a particular embodiment, the user will be able to track the wheel(s) location from their phone and from the vehicle if it is connected to the cloud ecosystem. In this example, the user will only be allowed to track the wheels they own which was previously designated by the user's vehicle. According to this example, both the wheel (TPM sensor) and vehicle will keep ownership information unless it is removed by the actual owner of the vehicle via vehicle, or other cloud connected devices which was linked to the vehicle beforehand etc.

BLE transceiver functionality may reside in a TPM ECU, TCU, BCM, or any other ECU. The vehicle may connect to the internet and cloud ecosystem through a TCU (Local Wi-Fi, 4G/5G Connection) or by any other ECU in the vehicle. The user's phone may connect to the internet and cloud ecosystem through local Wi-Fi, 4G/5G communication using a dedicated application with associated credentials to access vehicle data. There are numerous ways to keep record of ownership data and update wheel status information in the cloud. It is not limited to methods described above.

The user must disarm the wheels before removal if it is authorized by the user via HMI in the vehicle or via the user's authorized phone. Otherwise, the wheels will behave as described above.

In a particular embodiment, wheel theft detection may utilize an autolocation function of the TPM sensor. In general, the tires/wheels on a vehicle are not rotated/swapped in around 99% of use cases. Accordingly, a true autolocation routine is only required in around 1% of all drive offs. In a particular embodiment, a TPM sensor detects if wheels have been moved when the vehicle is stationary and, that being the case, informs the vehicle-based ECU. When the vehicle is stationary, each TPM sensor monitors its orientation. If the TPM sensor detects a change of orientation whilst the vehicle is stationary, then it alerts the vehicle-based ECU. If, at vehicle key on, the ECU has not been informed of any change in orientation from any of its wheel-based sensors then it can assume that the wheel locations have not changed since the previous journey and an autolocation routine is not required to be initiated—thereby performing an instant decision on the wheel/sensor vehicle location in the 99% of cases where wheels have not been rotated on the vehicle.

Additionally, this mechanism can be used as a method for wheel theft detection and alert. When the vehicle is parked, locked and the security alarm is activated—the detection of a change in orientation of a wheel can be regarded as a wheel being tampered with or in the process of being removed/stolen. Additional RF based intelligence is described below.

In a particular embodiment, when the vehicle is stationary, each TPM sensor monitors its orientation (in respect to gravity). The sensors determine if they are in stationary mode if they do not sense a change in centrifugal offset that is associated with vehicle driving (i.e., an offset with a value over several g). Alternatively, using BLE or similar bidirectional communications, the vehicle-based ECU can inform each sensor when the ignition has been turned off (or doors closed) and therefore initiate stationary monitoring. In stationary mode, each sensor periodically monitors one or both of its X and Z plane accelerometers. Typical TPM sensors sample an accelerometer once every 10 seconds to detect if the vehicle is in motion—in order to increase the pressure sample and data transmission rate when driving has been detected. If a TPM sensor detects a change of orientation (represented as a change in acceleration due to gravitational angular offset) whilst the vehicle is stationary, then it alerts the vehicle-based ECU. Alternatively, and as above, if the TPM system is equipped with BLE, then the ECU can poll/interrogate each sensor at key on to determine if its orientation has changed during the stationary period. If, during the stationary period or after interrogation at key on (in the case of BLE), the ECU has not been informed of any change in orientation from any of its wheel-based sensors then it can assume that the wheel locations have not changed since the previous journey and an autolocation routine or mechanism is not required to be initiated. Additionally, on drive off, each sensor can inform (transmit) the duration of its stationary (fixed orientation period). If each sensor's value aligns with that of the vehicle, then a system autolocation is not required, thereby enabling instantaneous sensor vehicular location at drive off.

In another embodiment, each TPM sensor can be informed by the vehicle-based ECU (via BLE) when the vehicle is locked, and the alarm system is activated. Upon detection of a change in orientation whilst stationary, each sensor can alert the vehicle system, via BLE, that a change in orientation has been detected. As an additional method of feature robustness, the system will then proceed to examine the received signal strength (RSSI) of the BLE channel between the vehicle and the sensor. If it is confirmed that the RSSI or Angle of Arrival (AoA), Time of Flight (ToF) or Distance Measurement (HADM/Channel sounding) between the ECU and the sensor is changing then it can be assumed that the wheel is being removed with the vehicle security system still enabled and a theft is taking place. The ECU can then poll other sensors, do other vehicle security checks or instantly activate the vehicle alarm.

When a wheel detects that it is being moved/rotated during a period when the vehicle's security is activated, it can alert the vehicle in order for the vehicle's security system to take action. In 99% of cases, sensor location in a TPM system is not required to be carried out. This selection detects if wheels have been moved during a stationary period and if not then resorts back to the previous journey's wheel/sensor locations—thereby providing instantaneous TPM sensor location at key on/drive off.

Figure 11:
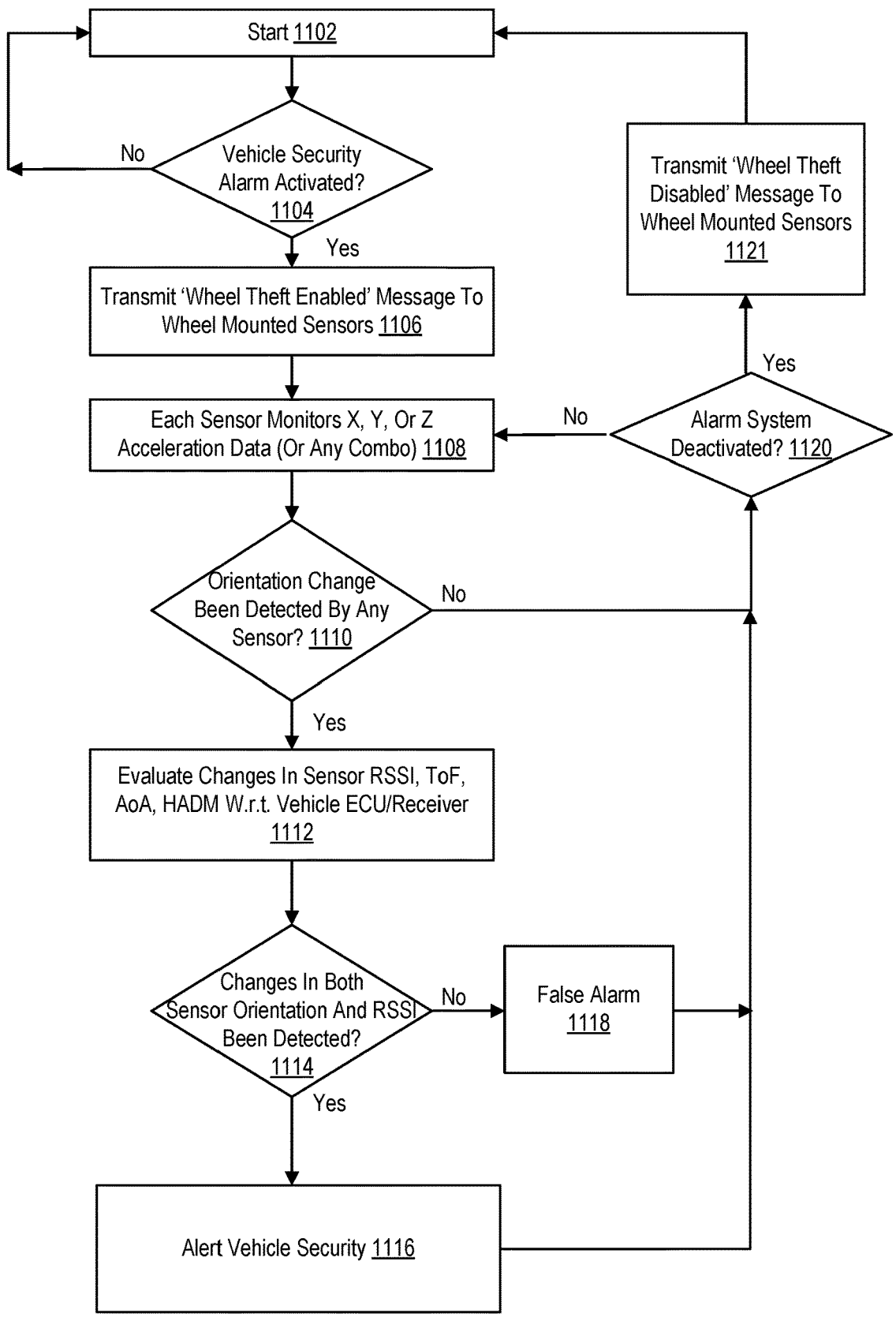
FIG. 11 sets forth a flowchart illustrating another method for wheel theft detection and notification using a TPMS according to at least one embodiment of the present disclosure.

For further explanation, FIG. 11 illustrates a flow chart for wheel theft detection and notification. In the example of FIG. 11, the method starts (1102) and determines (1104) whether the vehicle security alarm has been activated. If the alarm is activated, the method continues by transmitting (1106) the wheel theft enabled message to wheel mounted sensors. Each sensor monitors (1108) the X, Y, or Z acceleration data. The method also includes determining (1110) whether an orientation change has been detected by any sensor. If an orientation change has been detected, the ECU evaluates (1112) changes in sensor RSSI, ToF, AoA, HAHM with respect to vehicle ECU/receiver. The ECU determines (1114) whether changes in both sensor orientation and RSSI have been detected. If the ECU determines that changes to both sensor orientation and RSSI have been detected, the ECU alerts (1116) the vehicle security system. If the ECU determines that changes to both sensor orientation and RSSI have not been detected, the ECU determines (1118) there is a false alarm. The ECU also determines (1120) whether the vehicle security alarm has been deactivated. If the alarm has been deactivated, the ECU transmits (1121) the wheel theft disabled message to wheel mounted sensors.

Figure 12:
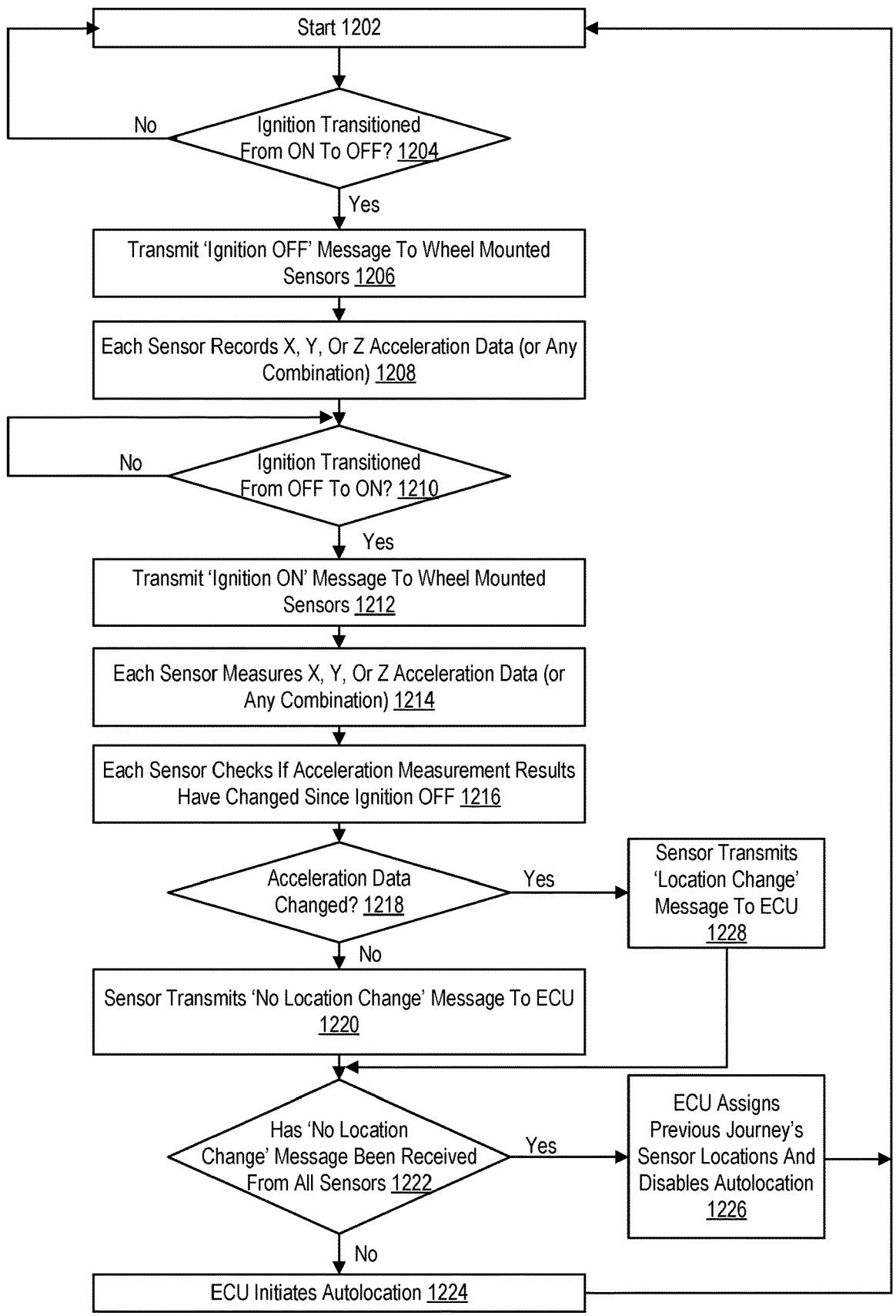
FIG. 12 sets forth a flowchart illustrating a method for optimizing an autolocation mechanism using a TPMS according to at least one embodiment of the present disclosure.

For further explanation, FIG. 12 illustrates a flow chart for optimizing an autolocation mechanism using a TPMS. In the example of FIG. 12, the method starts (1202) and determines (1204) whether the ignition has transitioned from ON to OFF. If the ignition has transitioned to OFF, the ECU transmits (1206) an ignition OFF message to wheel mounted sensors. Each sensor records (1208) X, Y, or Z acceleration data (or any combination). The ECU determines (1210) whether the ignition has transitioned from OFF to ON. If the ignition has transitioned to ON, the ECU transmits (1212) an ignition ON message to the wheel mounted sensors. Each sensor measures (1214) X, Y, or Z acceleration data (or any combination). Each sensor checks (1216) if acceleration measurement results have changed since ignition OFF. The sensor determines (1218) whether acceleration data has changed. If the acceleration data has changed, the sensor transmits (1228) location change message to ECU. If the acceleration data has not changed, the sensor transmits (1220) a "no location change" message to ECU. The ECU determines (1222) whether the "no location change" message has been received from all sensors. If the message has been received from all sensors, the ECU assigns (1226) the previous journey's sensor locations and disables autolocation mechanism. If the message has not been received from all sensors, the ECU initiates (1224) autolocation mechanism.

Current wheel theft technology uses vehicle base tilt sensors that can be overridden by thieves by keeping the vehicle level when removing wheels. According to at least one embodiment of the present invention, the system detects a change in sensor orientation and BLE received signal strength to detect a stolen wheel. At no extra cost, a software bolt on to existing TPMS autolocation routines (sensor and ECU) will vastly enhance the performance of the system's ability to inform wheel sensor location at key on (never previously achieved) in 99% of all use cases—where wheel/sensor locations have not changed.

Figure 13:
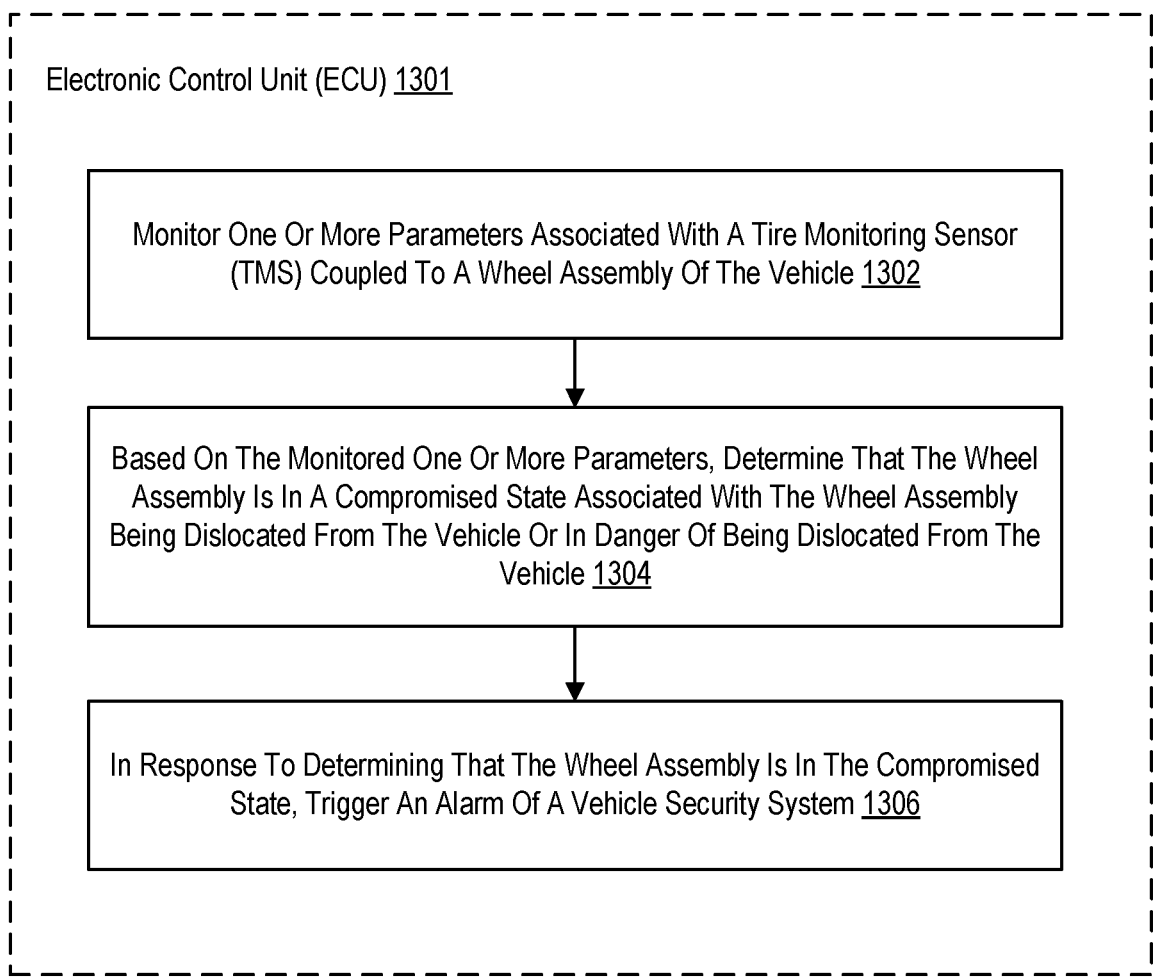
FIG. 13 sets forth a flow chart illustrating another method for wheel theft detection and notification using a TPMS according to at least one embodiment of the present disclosure.

For further explanation, FIG. 13 sets forth a flow chart illustrating another method of wheel theft detection and notification using a TPMS according to at least one embodiment of the present disclosure. The method of FIG. 13 includes monitoring (1302), by an electronic control unit (ECU) (1301) of a vehicle, one or more parameters associated with a tire monitoring sensor (TMS) coupled to a wheel assembly of the vehicle. Examples of parameters include but are not limited to pressure values measured by the TMS; acceleration data from the TMS; and received signal strength indication (RSSI) measurements of signals from the TMS. Monitoring (1302), by an electronic control unit (ECU) (1301) of a vehicle, one or more parameters associated with a tire monitoring sensor (TMS) coupled to a wheel assembly of the vehicle may be carried out by receiving data from the TMS and analyzing data and signals from the TMS.

The method of FIG. 13 also includes based on the monitored one or more parameters, determining (1304), by the ECU (1301), that the wheel assembly is in a compromised state associated with the wheel assembly being dislocated from the vehicle or in danger of being dislocated from the vehicle. Determining (1304), based on the monitored one or more parameters, that the wheel assembly is in a compromised state associated with the wheel assembly being dislocated from the vehicle or in danger of being dislocated from the vehicle may be carried out by comparing the values of the monitored one or more parameters to one or more reference values; determining that the values of the monitored one or more parameters substantially match one or more reference values that correspond with a wheel assembly being separated from the vehicle or with a wheel assembly in the process of being removed from the vehicle.

In addition, the method of FIG. 13 also includes in response to determining that the wheel assembly is in the compromised state, triggering (1306), by the ECU (1301), an alarm of a vehicle security system. Triggering (1306), in response to determining that the wheel assembly is in the compromised state, an alarm of a vehicle security system may be carried out by sending a message or signal to the vehicle security system to activate the alarm.

For further explanation, FIG. 14 sets forth a flow chart illustrating another method of wheel theft detection and notification using a TPMS according to at least one embodiment of the present disclosure. The method of FIG. 14 includes the elements of FIG. 13. However, in the method of FIG. 14, determining (1304), based on the monitored one or more parameters, that the wheel assembly is in a compromised state associated with the wheel assembly being dislocated from the vehicle or in danger of being dislocated from the vehicle includes determining (1402) that a distance from the ECU to the TMS is increasing. Determining (1402) that a distance from the ECU to the TMS is increasing may be carried out by monitoring a signal strength or time of flight of the signal transmission from the TMS; determining if the signal strength is getting weaker or the time of flight of the signal transmission is increasing; and using a determination that the signal strength is getting weaker or a determination that the time of flight of the signal transmission is increasing to infer that the distance from the ECU to the TMS is increasing.

Figure 15:
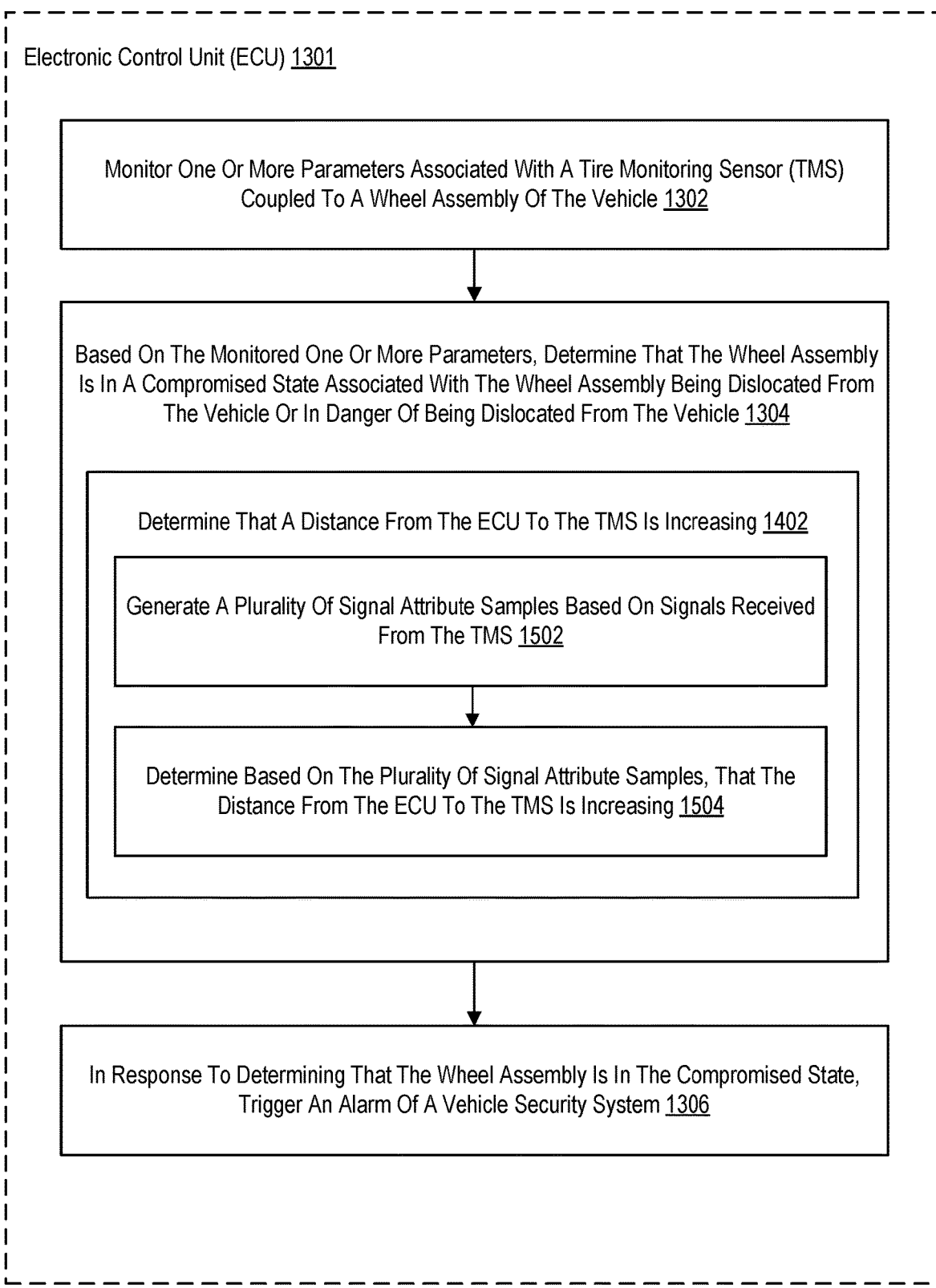
FIG. 15 sets forth a flow chart illustrating another method for wheel theft detection and notification using a TPMS according to at least one embodiment of the present disclosure.

For further explanation, FIG. 15 sets forth a flow chart illustrating another method of wheel theft detection and notification using a TPMS according to at least one embodiment of the present disclosure. The method of FIG. 15 includes the elements of FIG. 14. However, in the method of FIG. 15, determining (1402) that a distance from the ECU to the TMS is increasing includes generating (1502), by the ECU (1301), a plurality of signal attribute samples based on signals received from the TMS. Examples of signal attribute samples may include but are not limited to a plurality of received signal strength indicator (RSSI) sample and a plurality of time-of-flight samples. Generating (1502), by the ECU (1301), a plurality of signal attribute samples based on signals received from the TMS may be carried out by measuring and recording a RSSI or time of flight for a set of transmissions received from a TMS.

In addition, according to the example method of FIG. 15, determining (1402) that a distance from the ECU to the TMS is increasing also includes determining (1504), based on the plurality of signal attribute samples, that the distance from the ECU to the TMS is increasing. Determining (1504), based on the plurality of signal attribute samples, that the distance from the ECU to the TMS is increasing may be carried out by comparing the values of the signal attribute samples to one or more thresholds; determining whether the values of the signal attribute samples is above or below one or more thresholds; and using the determination of whether the signal attribute sample is above or below one or more thresholds to determine if the distance from the ECU to the TMS is increasing. For example, the ECU may use a determination that the signal strength is below a first threshold to conclude that the wheel assembly associated with the TMS is being removed from the vehicle or alternatively, has been removed from the vehicle. As another example, if the time of flight of the signal transmission is above a second threshold, the ECU may determine that the distance from the ECU to the TMS is increasing.

Figure 16:
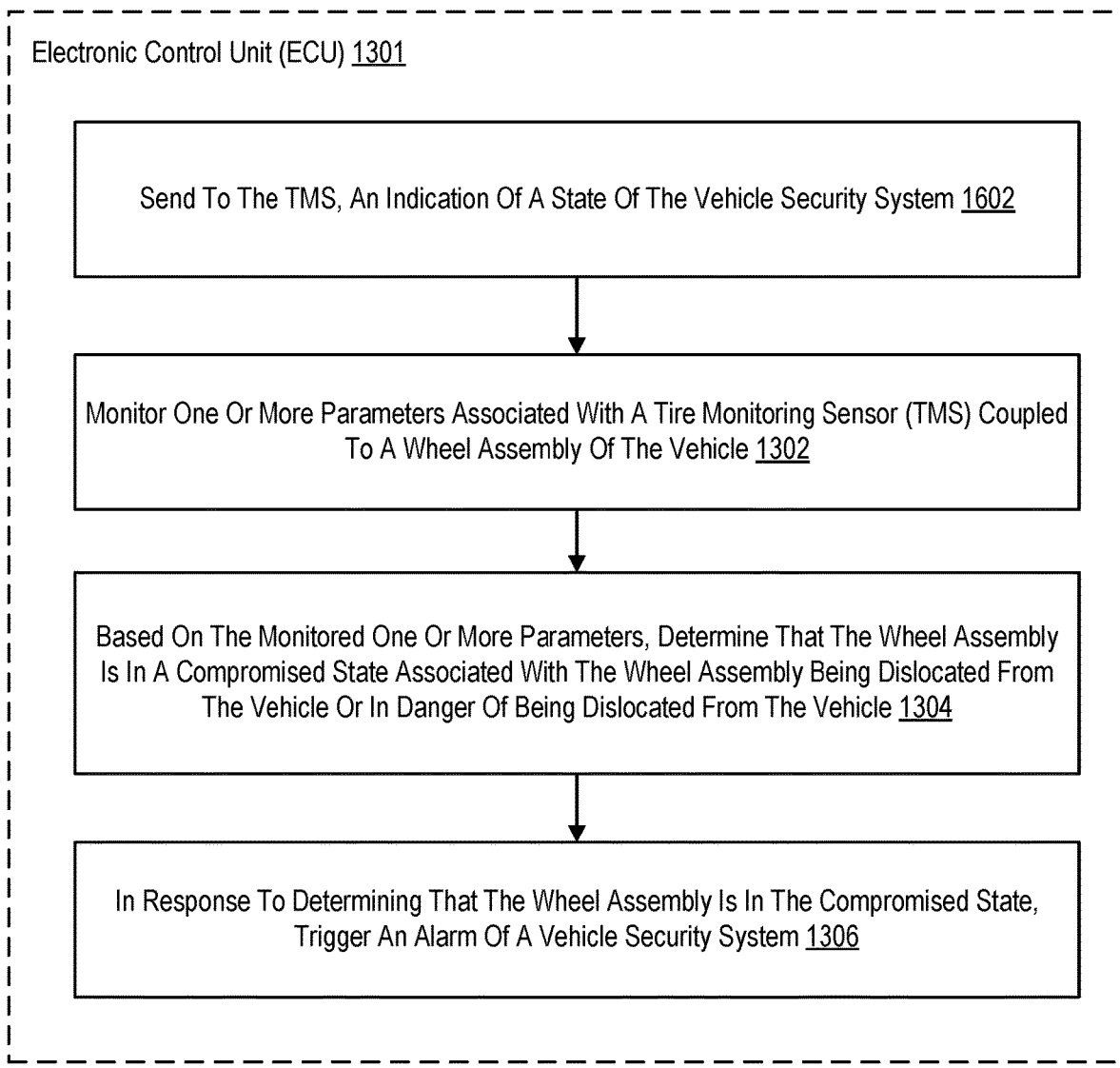
FIG. 16 sets forth a flow chart illustrating another method for wheel theft detection and notification using a TPMS according to at least one embodiment of the present disclosure.

For further explanation, FIG. 16 sets forth a flow chart illustrating another method of wheel theft detection and notification using a TPMS according to at least one embodiment of the present disclosure. The method of FIG. 16 includes the elements of FIG. 13. In addition to the elements of FIG. 13, the method of FIG. 16 also includes sending (1602) to the TMS, by the ECU (1301), an indication of a state of the vehicle security system. Sending (1602) to the TMS, by the ECU (1301), an indication of a state of the vehicle security system may be carried out by transmitting a message that indicates whether the vehicle security system is active or inactive. As explained above, the TMS may take action, such as changing operational mode, in response to receiving from the ECU, an indication of the state of the vehicle security system. For example, in response to receiving a message that the vehicle security system is active, the TMS may switch to a fast transmission mode in which the TMS increases a frequency of transmissions to the ECU. In this example, increased transmission from the TMS may allow the ECU to more accurately monitor parameters associated with the TMS and therefore determine whether the wheel assembly has been removed from the vehicle or is in the process of being removed from the vehicle.

Figure 17:
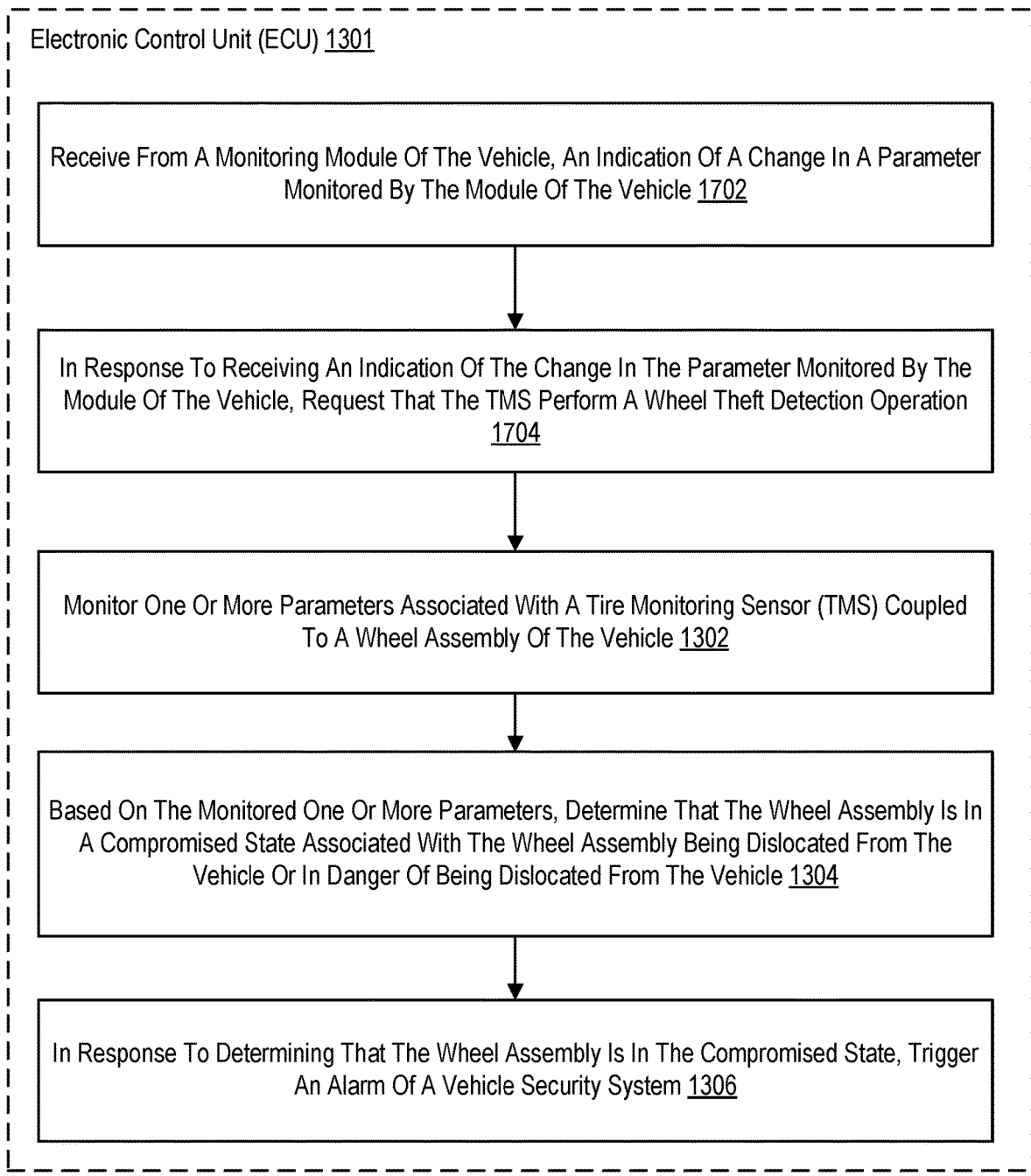
FIG. 17 sets forth a flow chart illustrating another method for wheel theft detection and notification using a TPMS according to at least one embodiment of the present disclosure.

For further explanation, FIG. 17 sets forth a flow chart illustrating another method of wheel theft detection and notification using a TPMS according to at least one embodiment of the present disclosure. The method of FIG. 17 includes the elements of FIG. 13. In addition to the elements of FIG. 13, the method of FIG. 17 also includes receiving (1702) from a monitoring module of the vehicle, by the ECU (1301), an indication of a change in a parameter monitored by the module of the vehicle. Receiving (1702) from a monitoring module of the vehicle, by the ECU (1301), an indication of a change in a parameter monitored by the module of the vehicle may be carried out by the ECU receiving a message that one or more parameters monitored by another module (e.g., a sensor, a control system, or another ECU) has changed.

In addition, the method of FIG. 17 also includes in response to receiving an indication of the change in the parameter monitored by the module of the vehicle, requesting (1704), by the ECU (1301), that the TMS perform a wheel theft detection operation. Requesting (1704), in response to receiving an indication of the change in the parameter monitored by the module of the vehicle, that the TMS perform a wheel theft detection operation may be carried out by transmitting a message or request for the TMS to perform a wheel theft detection operation.

For example, a suspension level sensor or ECU that monitors the suspension level sensor may transmit a message indicating the suspension level parameter, which indicates the suspension level of the vehicle, has changed. In this example, a change in suspension level may be indicative of the early stages of a wheel theft attempt, but not enough to indicate a break-in, so the ECU requests that the TMS increase its monitoring by entering a wheel theft detection operation. The ECU may then use the data from the TMS to determine whether the wheel assembly is in the compromised state.

Figure 18:
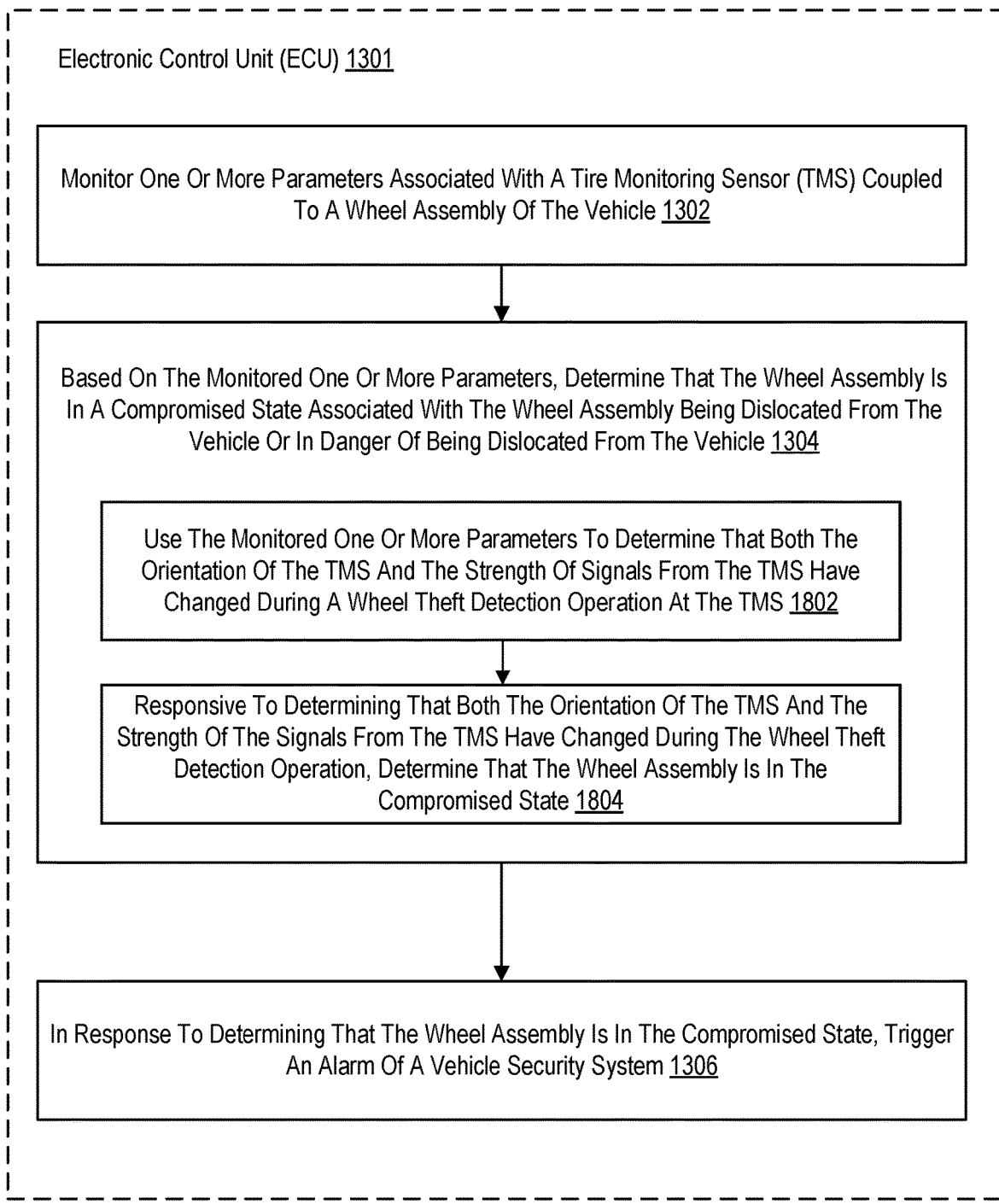
FIG. 18 sets forth a flow chart illustrating another method for wheel theft detection and notification using a TPMS according to at least one embodiment of the present disclosure.

For further explanation, FIG. 18 sets forth a flow chart illustrating another method of wheel theft detection and notification using a TPMS according to at least one embodiment of the present disclosure. The method of FIG. 18 includes the elements of FIG. 13. However, in the method of FIG. 18, determining (1304), based on the monitored one or more parameters, that the wheel assembly is in a compromised state associated with the wheel assembly being dislocated from the vehicle or in danger of being dislocated from the vehicle includes using (1802) the monitored one or more parameters to determine, by the ECU (1301), that both the orientation of the TMS and the strength of signals from the TMS have changed during a wheel theft detection operation at the TMS. Using (1802) the monitored one or more parameters to determine, by the ECU (1301), that both the orientation of the TMS and the strength of signals from the TMS have changed during a wheel theft detection operation at the TMS may be carried out by determining an amount of change in acceleration data during a time period; determining if the amount of change in acceleration data exceeds a threshold; responsive to determining that the amount of change in acceleration data exceeds a threshold, determine that the orientation of the TMS has changed; determining an amount of change in RSSI of signals from the TMS during a time period; determining if the amount of change in RSSI exceeds a threshold; and determine if the RSSI is below a threshold.

In addition, determining (1304), based on the monitored one or more parameters, that the wheel assembly is in a compromised state associated with the wheel assembly being dislocated from the vehicle or in danger of being dislocated from the vehicle also includes responsive to determining that both the orientation of the TMS and the strength of the signals from the TMS have changed during the wheel theft detection operation, determining (1804), by the ECU (1301), that the wheel assembly is in the compromised state. Determining (1804), responsive to determining that both the orientation of the TMS and the strength of the signals from the TMS have changed during the wheel theft detection operation, that the wheel assembly is in the compromised state may be carried out by changing within the ECU, a parameter that indicates a current state of the wheel assembly or TMS. For example, the ECU may maintain a record of the current state of each wheel assembly of a vehicle. In this example, the ECU may store a value that indicates if the TMS is in a compromised state.

Figure 19:
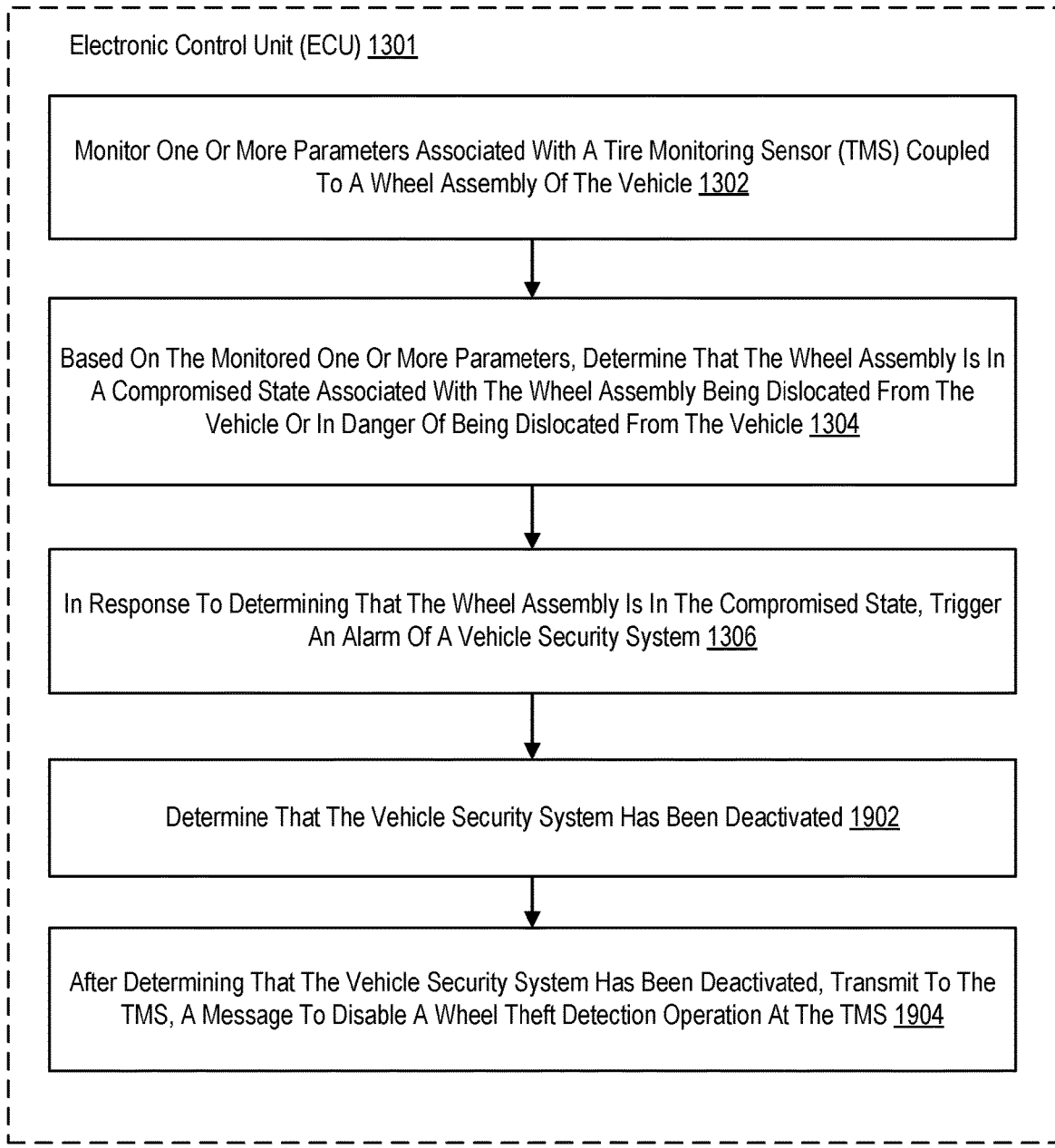
FIG. 19 sets forth a flow chart illustrating another method for wheel theft detection and notification using a TPMS according to at least one embodiment of the present disclosure.

For further explanation, FIG. 19 sets forth a flow chart illustrating another method of wheel theft detection and notification using a TPMS according to at least one embodiment of the present disclosure. The method of FIG. 19 includes the elements of FIG. 13. In addition to the elements of FIG. 13, the method of FIG. 19 also includes determining (1902), by the ECU (1301), that the vehicle security system has been deactivated. Determining (1902), by the ECU (1301), that the vehicle security system has been deactivated may be carried out by receiving a message or signal from the vehicle security system indicating a change in the state of activation of the vehicle security system or indicating that the vehicle security system is inactive.

In addition, the method of FIG. 19 also includes after determining that the vehicle security system has been deactivated, transmitting (1904) to the TMS, by the ECU (1301), a message to disable a wheel theft detection operation at the TMS. Transmitting (1904) to the TMS, after determining that the vehicle security system has been deactivated, a message to disable a wheel theft detection operation at the TMS may be carried out by transmitting a message to the TMS that the vehicle security is inactive; transmitting a message that instructs the TMS to change operational modes from wheel theft detection operation to normal operation; and transmitting a message to the TMS to stop performing the wheel theft detection operation.

Figure 20:
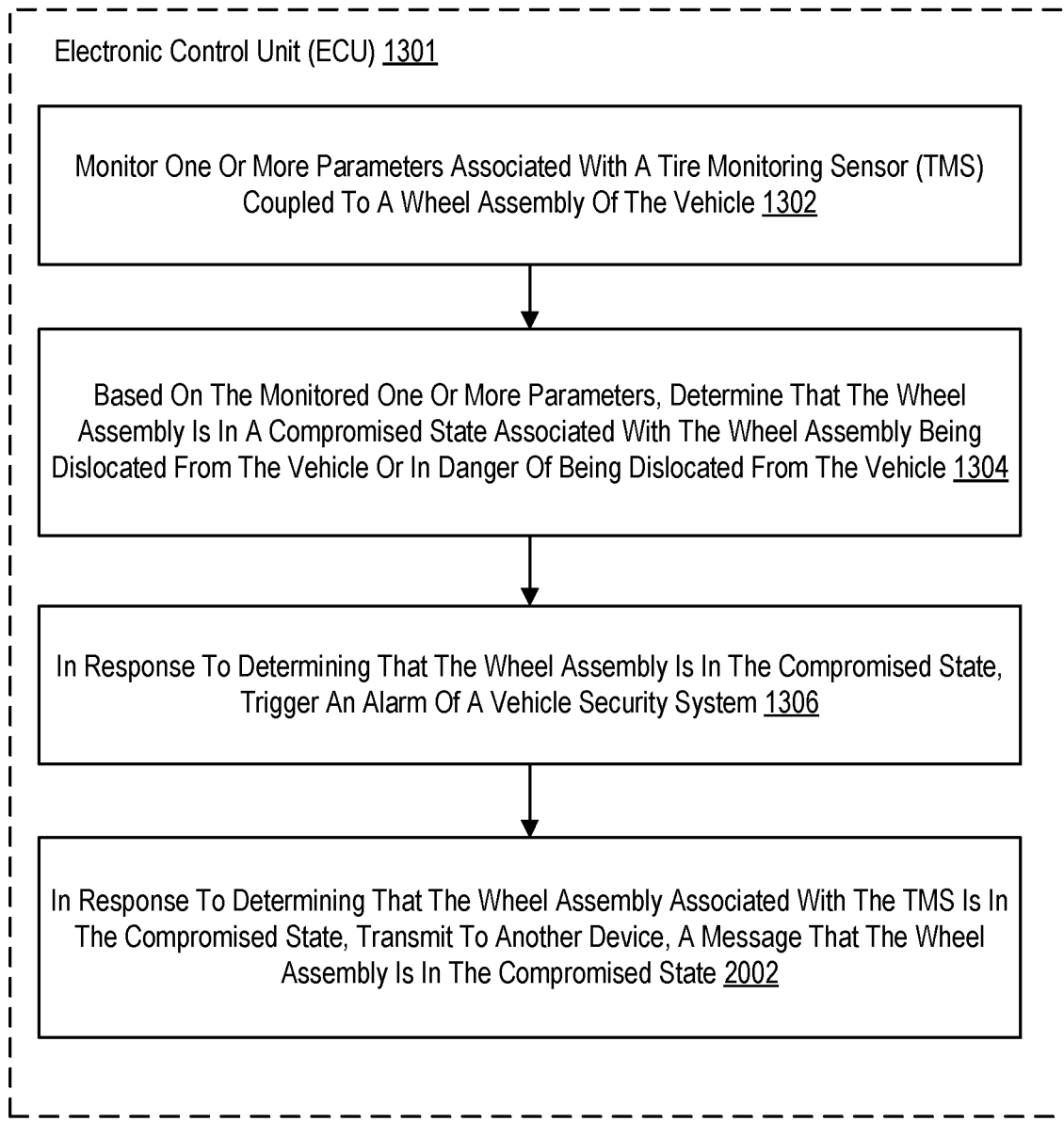
FIG. 20 sets forth a flow chart illustrating another method for wheel theft detection and notification using a TPMS according to at least one embodiment of the present disclosure.

For further explanation, FIG. 20 sets forth a flow chart illustrating another method of wheel theft detection and notification using a TPMS according to at least one embodiment of the present disclosure. The method of FIG. 20 includes the elements of FIG. 13. In addition to the elements of FIG. 13, the method of FIG. 20 also includes in response to determining that the wheel assembly associated with the TMS is in the compromised state, transmitting (2002) to another device, by the ECU (1301), a message that the wheel assembly is in the compromised state. Examples of other devices may include but are not limited to other ECUs, TMSs, and monitoring devices. Transmitting (2002) to another device, in response to determining that the wheel assembly associated with the TMS is in the compromised state, a message that the wheel assembly is in the compromised state may be carried out by transmitting a message with an identifier that identifies the wheel assembly or the TMS associated with the wheel assembly.

For example, after determining that a wheel assembly is in the compromised state, the ECU may "tag" the wheel assembly as being in the compromised state and may send out a message alerting other devices that the wheel assembly is in the compromised state. When the device receives another message from an unknown wheel assembly, the device may use the information within the message to determine whether the unknown wheel assembly is lost/stolen or otherwise in the compromised state. Responsive to discovering the unknown wheel assembly is the wheel assembly identified by the ECU as being in the compromised state, the device may perform a variety of actions including but not limited to remote tagging the unknown wheel assembly as being in the compromised state; determining and reporting a location of the wheel assembly; and providing updates on the location of the unknown wheel assembly.

Figure 21:
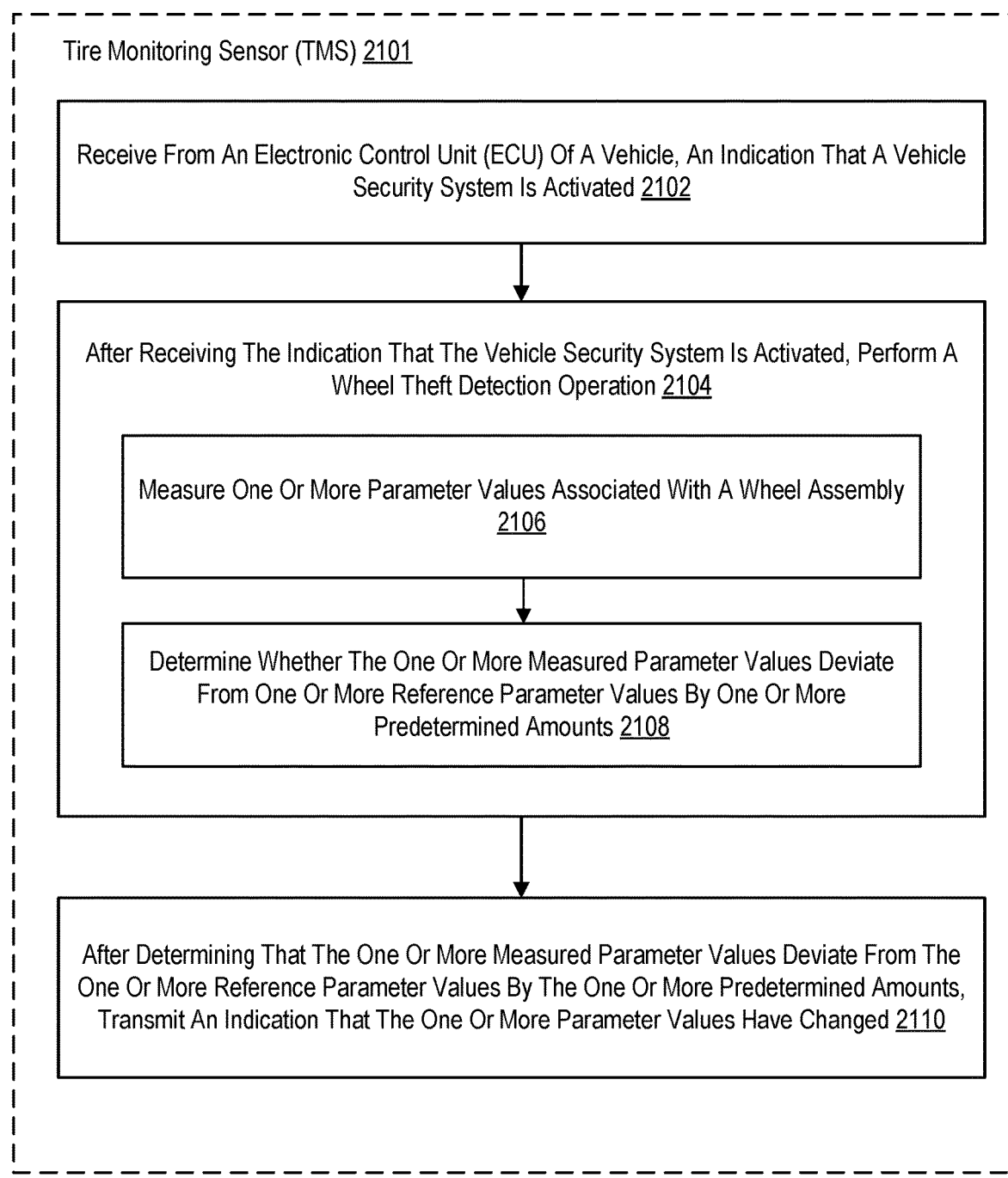
FIG. 21 sets forth a flow chart illustrating another method for wheel theft detection and notification using a TPMS according to at least one embodiment of the present disclosure.

For further explanation, FIG. 21 sets forth a flow chart illustrating another method of wheel theft detection and notification using a TPMS according to at least one embodiment of the present disclosure. The method of FIG. 21 includes receiving (2102) from an electronic control unit (ECU) of a vehicle, by a tire monitoring sensor (TMS) (2101) of the vehicle, an indication that a vehicle security system is activated. Receiving (2102) from an electronic control unit (ECU) of a vehicle, by a tire monitoring sensor (TMS) (2101) of the vehicle, an indication that a vehicle security system is activated may be carried out by receiving a message or signal indicating that the vehicle security system has been activated, has been changed to activated, or is currently active.

The method of FIG. 21 also includes after receiving the indication that the vehicle security system is activated, performing (2104) a wheel theft detection operation that includes measuring (2106), by the TMS (2101), one or more parameter values associated with a wheel assembly. Measuring (2106), by the TMS (2101), one or more parameter values associated with a wheel assembly may be carried out by measuring tire pressure or acceleration data.

According to the method of FIG. 21, performing (2104) a wheel theft detection operation that includes determining (2108), by the TMS (2101), whether the one or more measured parameter values deviate from one or more reference parameter values by one or more predetermined amounts. Determining (2108), by the TMS (2101), whether the one or more measured parameter values deviate from one or more reference parameter values by one or more predetermined amounts may be carried out by determining a difference in value between the measured tire pressure and a previously measured or recorded tire pressure; determining whether the difference in value in tire pressures exceeds a first threshold; comparing the measured acceleration data to previously measured or recorded acceleration data; and determining whether the difference in value in acceleration data exceeds a second threshold.

In addition, the method of FIG. 21 also includes after determining that the one or more measured parameter values deviate from the one or more reference parameter values by the one or more predetermined amounts, transmitting (2110), by the TMS (2101), an indication that the one or more parameter values have changed. Transmitting (2110), after determining that the one or more measured parameter values deviate from the one or more reference parameter values by the one or more predetermined amounts, an indication that the one or more parameter values have changed may be carried out by transmitting a message indicating that the wheel assembly is in the compromised state; transmitting a message indicating that the one or more measure parameters exceed a threshold; and transmitting a message indicating an amount of deviation between the one or more measured parameter values and the reference parameter values.

For further explanation, FIG. 22 sets forth a flow chart illustrating another method of wheel theft detection and notification using a TPMS according to at least one embodiment of the present disclosure. The method of FIG. 22 includes the elements of FIG. 21. In addition to the elements of FIG. 21, the method of FIG. 22 also includes in response to determining that the one or more measured parameter values deviate from the one or more reference parameter values by the one or more predetermined amounts, switching (2202), by the TMS (2101), to a rapid transmission state in which the TMS increases a frequency of transmission to the ECU. Switching (2202), in response to determining that the one or more measured parameter values deviate from the one or more reference parameter values by the one or more predetermined amounts, to a rapid transmission state in which the TMS increases a frequency of transmission to the ECU may be carried out by changing one or more values stored in the TMS to indicate the change to the rapid transmission state.

Figure 23:
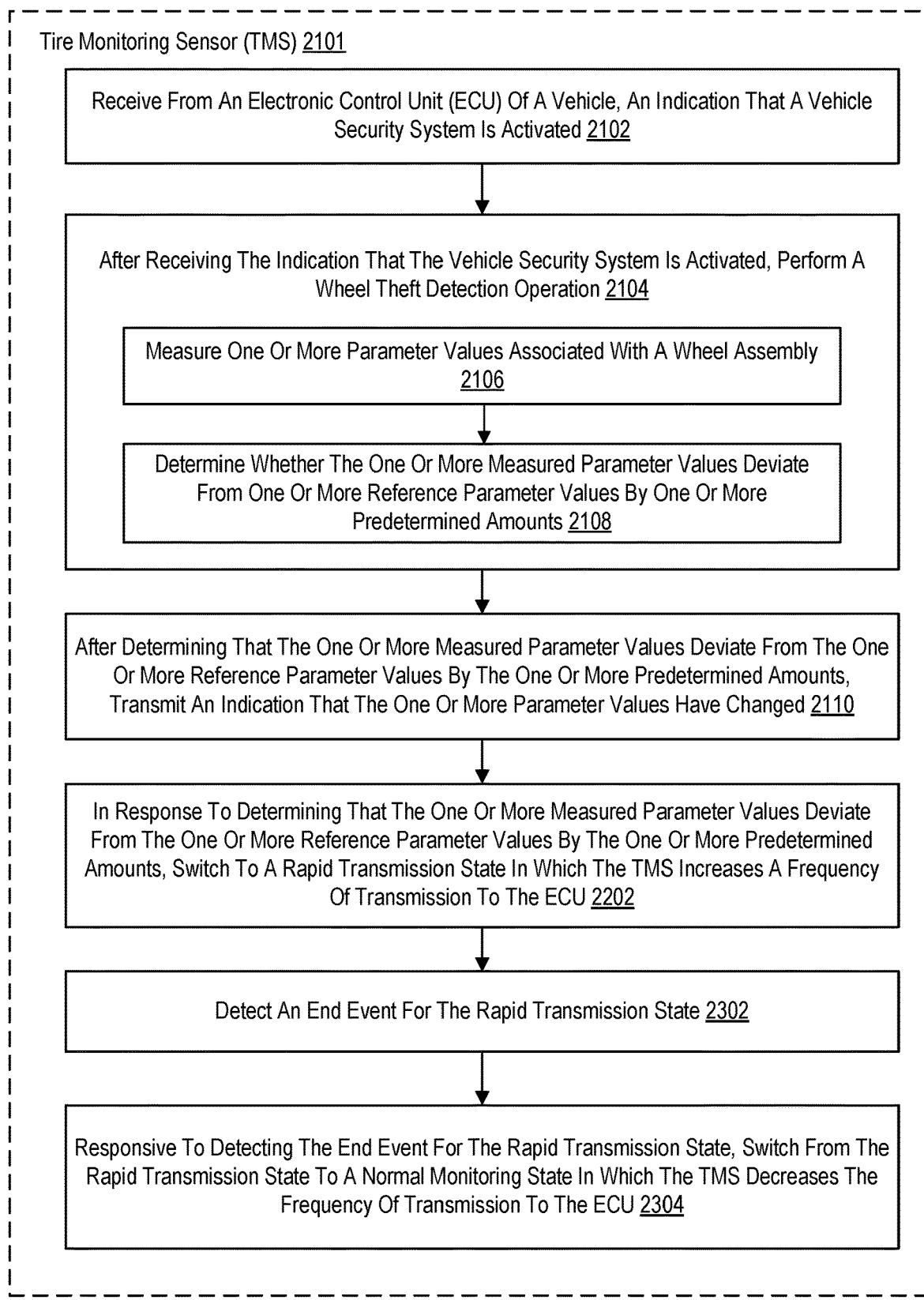
FIG. 23 sets forth a flow chart illustrating another method for wheel theft detection and notification using a TPMS according to at least one embodiment of the present disclosure.

For further explanation, FIG. 23 sets forth a flow chart illustrating another method of wheel theft detection and notification using a TPMS according to at least one embodiment of the present disclosure. The method of FIG. 23 includes the elements of FIG. 22. In addition to the elements of FIG. 22, the method of FIG. 23 also includes detecting (2302), by the TMS (2101), an end event for the rapid transmission state. Examples of end events include but are not limited to an amount of time from the start of a wheel theft operation exceeding a threshold; a message from the ECU to stop wheel theft monitoring operation; and a number of transmissions to the ECU from the start of the wheel theft monitoring operation exceeding a threshold. Detecting (2302), by the TMS (2101), an end event for the rapid transmission state may be carried out by tracking an amount of time from the start of the wheel theft operation; determining whether the amount of time exceeds a threshold; tracking a number of transmissions from the TMS; determining whether the number of transmissions exceeds a threshold; and receiving a message from the ECU to stop the wheel theft operation.

In addition, the method of FIG. 23 also includes responsive to detecting the end event for the rapid transmission state, switching (2302), by the TMS (2101), from the rapid transmission state to a normal monitoring state in which the TMS decreases the frequency of transmission to the ECU. Switching (2302), responsive to detecting the end event for the rapid transmission state, from the rapid transmission state to a normal monitoring state in which the TMS decreases the frequency of transmission to the ECU may be carried out by storing a data value indicating the change to the normal monitoring state; storing a data value indicating the stopping of the rapid transmission state; and changing a value that indicates a transmission frequency.

Figure 24:
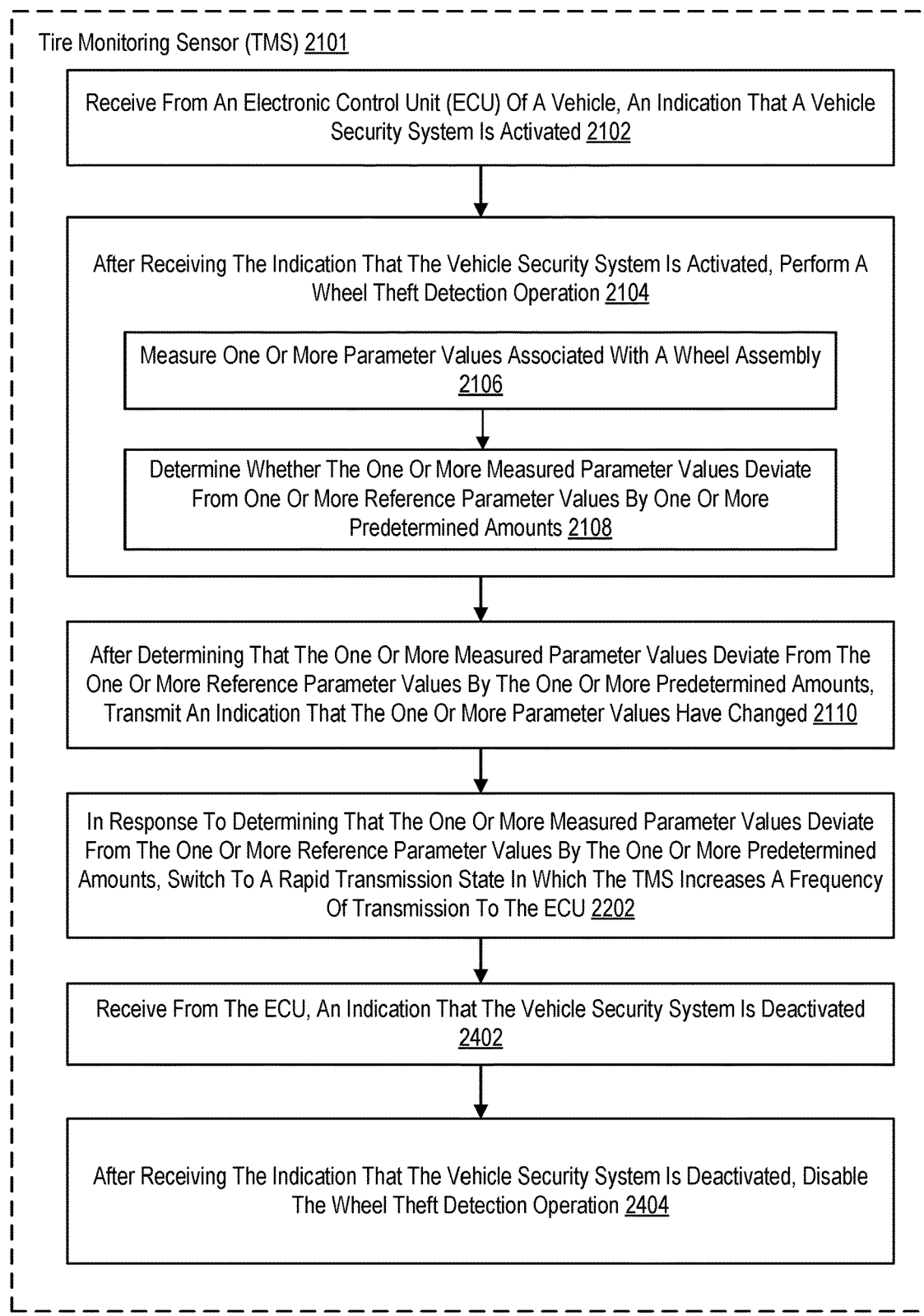
FIG. 24 sets forth a flow chart illustrating another method for wheel theft detection and notification using a TPMS according to at least one embodiment of the present disclosure.

For further explanation, FIG. 24 sets forth a flow chart illustrating another method of wheel theft detection and notification using a TPMS according to at least one embodiment of the present disclosure. The method of FIG. 24 includes the elements of FIG. 21. In addition to the elements of FIG. 21, the method of FIG. 24 also includes receiving (2402) from the ECU, by the TMS (2101), an indication that the vehicle security system is deactivated. Receiving (2402) from the ECU, by the TMS (2101), an indication that the vehicle security system is deactivated may be carried out by receiving a message indicating that the vehicle security system is currently deactivated or was switched to being deactivated.

The method of FIG. 24 also includes after receiving the indication that the vehicle security system is deactivated, disabling (2404), by the TMS (2101), the wheel theft detection operation. Disabling (2404) the wheel theft detection operation after receiving the indication that the vehicle security system is deactivated may be carried out by changing a frequency of measuring one or more parameters; and changing a frequency of transmission of the one or more parameters.

Figure 25:
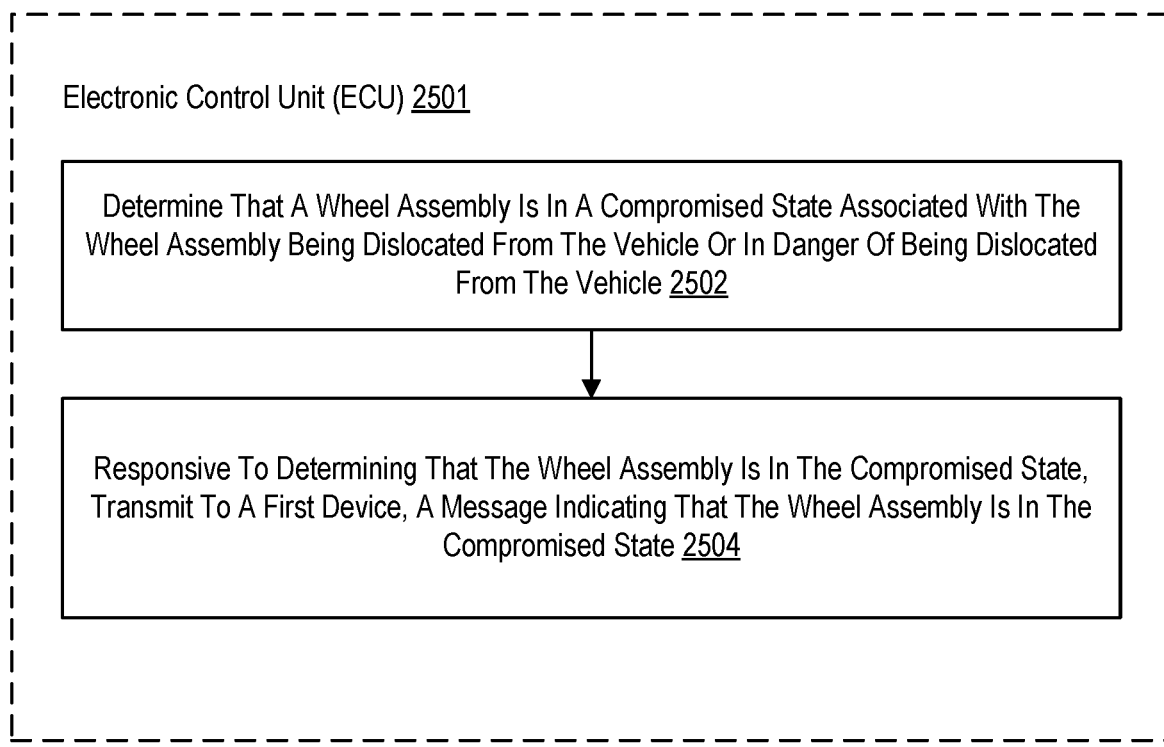
FIG. 25 sets forth a flow chart illustrating another method for wheel theft detection and notification using a TPMS according to at least one embodiment of the present disclosure.

For further explanation, FIG. 25 sets forth a flow chart illustrating another method of wheel theft detection and notification using a TPMS according to at least one embodiment of the present disclosure. The method of FIG. 25 includes determining (2502), by an electronic control unit (ECU) (2501) of a vehicle, that a wheel assembly is in a compromised state associated with the wheel assembly being dislocated from the vehicle or in danger of being dislocated from the vehicle. Determining (2502), by an electronic control unit (ECU) (2501) of a vehicle, that a wheel assembly is in a compromised state associated with the wheel assembly being dislocated from the vehicle or in danger of being dislocated from the vehicle may be carried out by comparing values of one or more monitored TMS parameters to one or more reference values; determining that the values of the one or more monitored parameters substantially match one or more reference values that correspond with a wheel assembly being separated from the vehicle or with a wheel assembly in the process of being removed from the vehicle.

The method of FIG. 25 also includes responsive to determining that the wheel assembly is in the compromised state, transmitting (2504) to a first device, by the ECU (2501), a message indicating that the wheel assembly is in the compromised state. Responsive to determining that the wheel assembly is in the compromised state, transmitting (2504) to a first device, by the ECU (2501), a message indicating that the wheel assembly is in the compromised state may be carried out by sending a message that includes an identification of a TMS or wheel assembly and an indication that the identified TMS/wheel assembly is in the compromised state.

Figure 26:
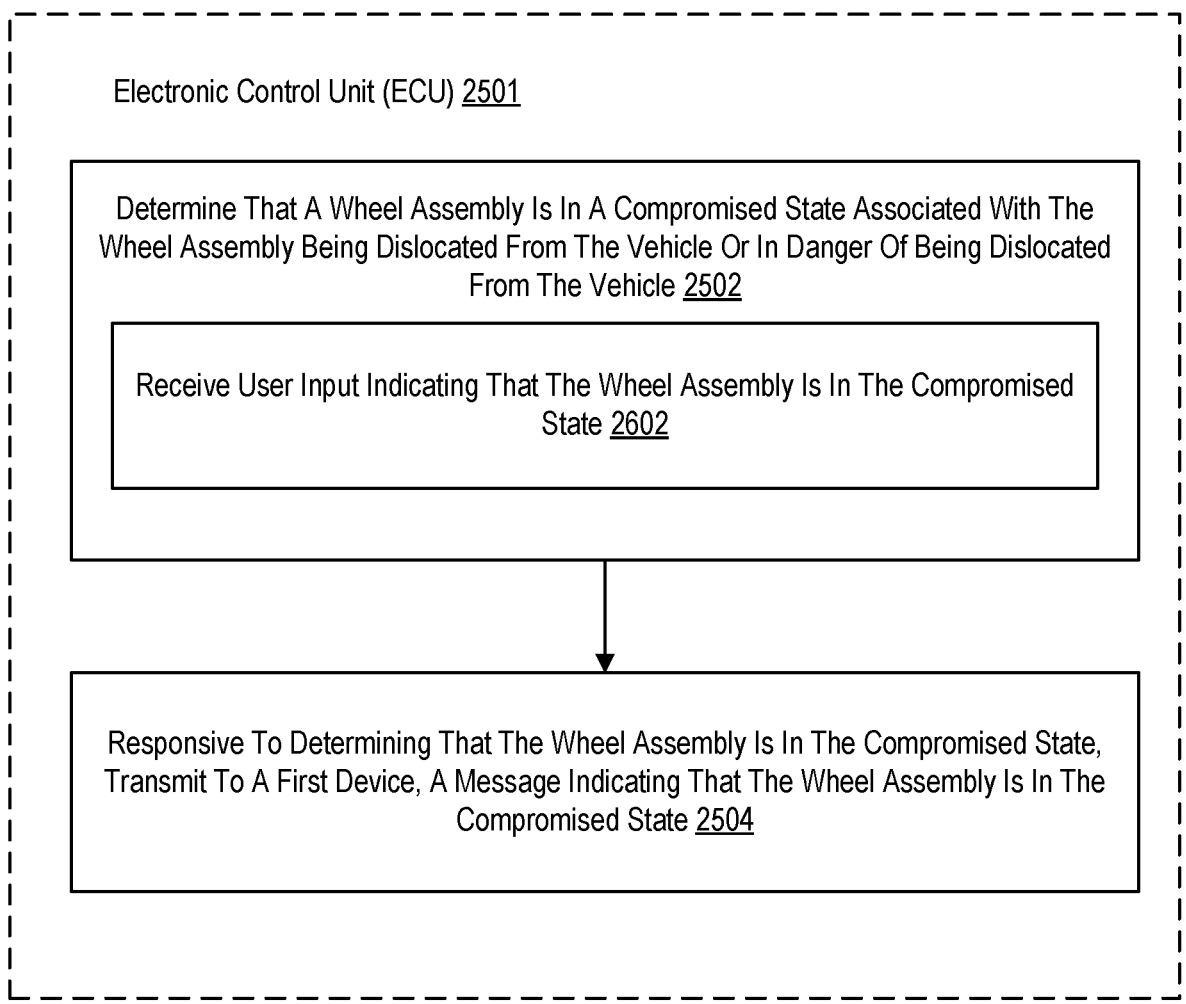
FIG. 26 sets forth a flow chart illustrating another method for wheel theft detection and notification using a TPMS according to at least one embodiment of the present disclosure.

For further explanation, FIG. 26 sets forth a flow chart illustrating another method of wheel theft detection and notification using a TPMS according to at least one embodiment of the present disclosure. The method of FIG. 26 includes the elements of FIG. 25. However, in the method of FIG. 26, determining (2502), by an electronic control unit (ECU) (2501) of a vehicle, that a wheel assembly is in a compromised state associated with the wheel assembly being dislocated from the vehicle or in danger of being dislocated from the vehicle includes receiving (2602), by the ECU (2501), user input indicating that the wheel assembly is in the compromised state. Receiving (2602), by the ECU (2501), user input indicating that the wheel assembly is in the compromised state may be carried out by receiving from a monitoring device, a message that indicates a particular wheel assembly is in the compromised state; and receiving from a user input device or another component of the vehicle, user input that indicates a particular wheel assembly is in the compromised state.

Figure 27:
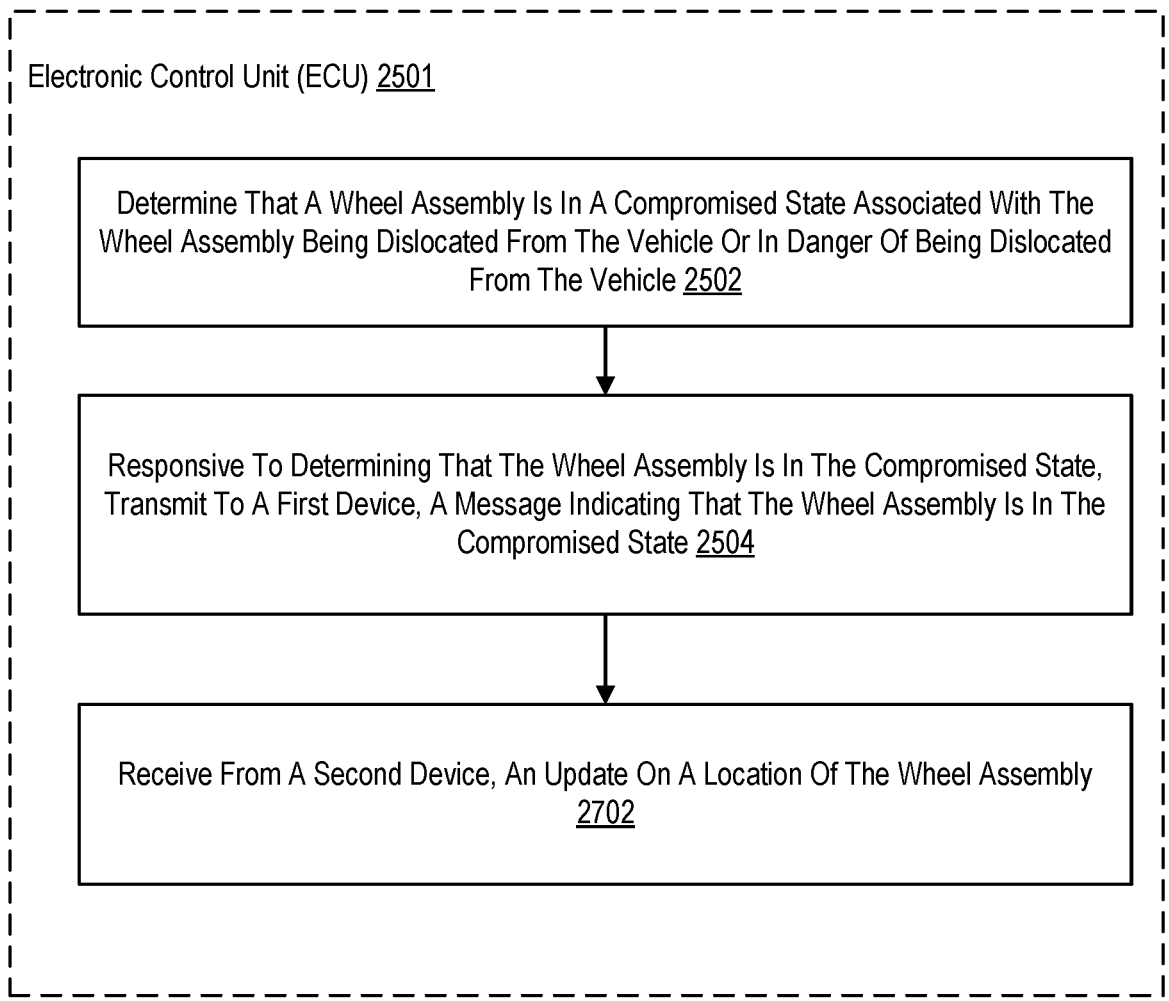
FIG. 27 sets forth a flow chart illustrating another method for wheel theft detection and notification using a TPMS according to at least one embodiment of the present disclosure.

For further explanation, FIG. 27 sets forth a flow chart illustrating another method of wheel theft detection and notification using a TPMS according to at least one embodiment of the present disclosure. The method of FIG. 27 includes the method of FIG. 25. In addition to the elements of FIG. 25, the method of FIG. 27 also includes receiving (2702) from a second device, by the ECU (2501), an update on a location of the wheel assembly. Receiving (2702) from a second device, by the ECU (2501), an update on a location of the wheel assembly may be carried out by receiving a message that identifies the wheel assembly and a location of the wheel assembly.

Figure 28:
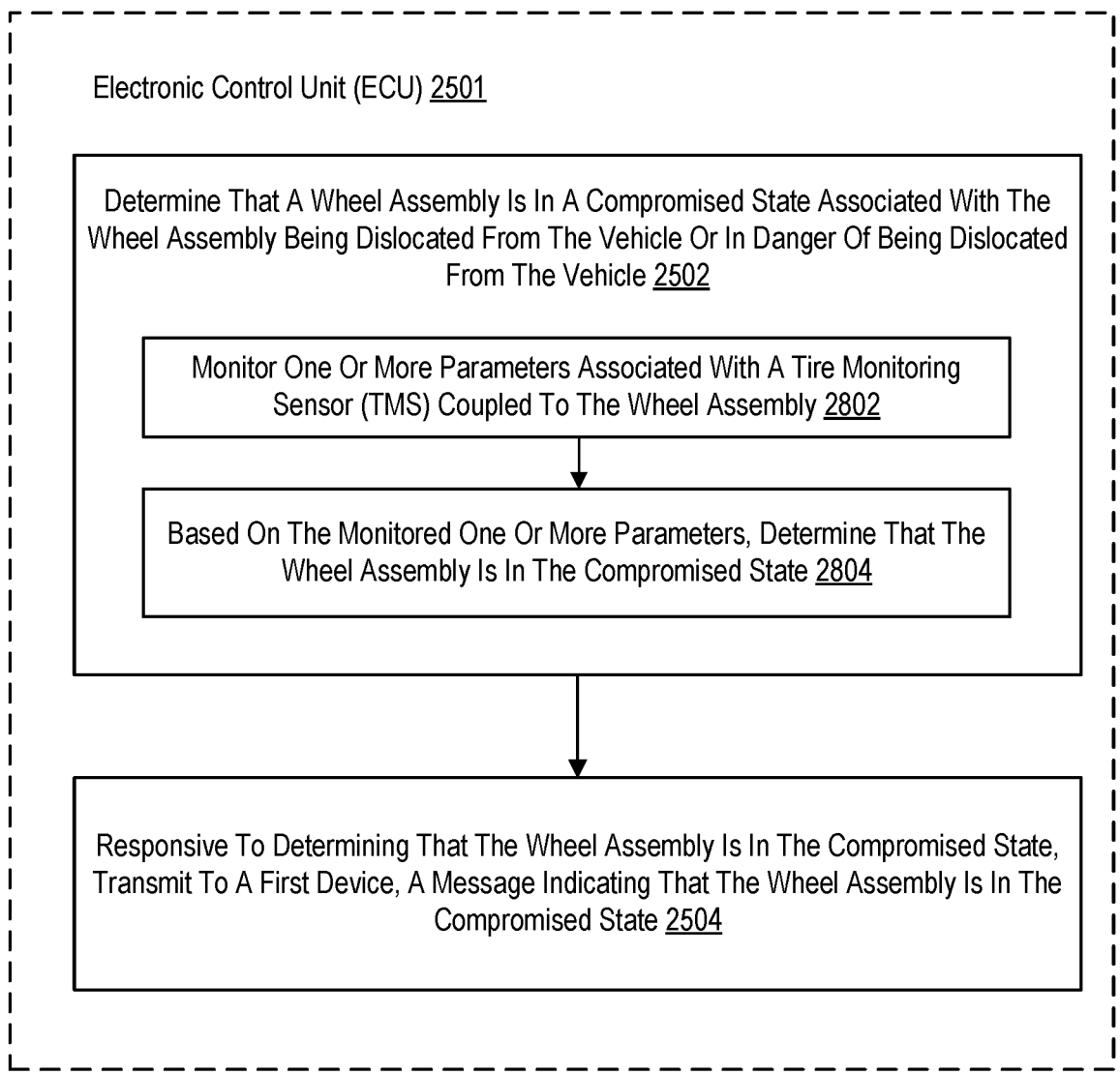
FIG. 28 sets forth a flow chart illustrating another method for wheel theft detection and notification using a TPMS according to at least one embodiment of the present disclosure.

For further explanation, FIG. 28 sets forth a flow chart illustrating another method of wheel theft detection and notification using a TPMS according to at least one embodiment of the present disclosure. The method of FIG. 28 includes the elements of FIG. 25. However, in the method of FIG. 28, determining (2502), by an electronic control unit (ECU) (2501) of a vehicle, that a wheel assembly is in a compromised state associated with the wheel assembly being dislocated from the vehicle or in danger of being dislocated from the vehicle includes monitoring (2802), by the ECU (2501), one or more parameters associated with a tire monitoring sensor (TMS) coupled to the wheel assembly. Examples of parameters include but are not limited to pressure values measured by the TMS; acceleration data from the TMS; and received signal strength indication (RSSI) measurements of signals from the TMS. Monitoring (2802), by the ECU (2501), one or more parameters associated with a tire monitoring sensor (TMS) coupled to the wheel assembly may be carried out by receiving data from the TMS and analyzing data and signals from the TMS.

In addition, in the method of FIG. 28, determining (2502), by an electronic control unit (ECU) (2501) of a vehicle, that a wheel assembly is in a compromised state associated with the wheel assembly being dislocated from the vehicle or in danger of being dislocated from the vehicle includes based on the monitored one or more parameters, determining (2804), by the ECU (2501), that the wheel assembly is in the compromised state. Determining (2804), based on the monitored one or more parameters, that the wheel assembly is in the compromised state may be carried out by comparing the values of the monitored one or more parameters to one or more reference values; determining that the values of the monitored one or more parameters substantially match one or more reference values that correspond with a wheel assembly being separated from the vehicle or with a wheel assembly in the process of being removed from the vehicle.

Figure 29:
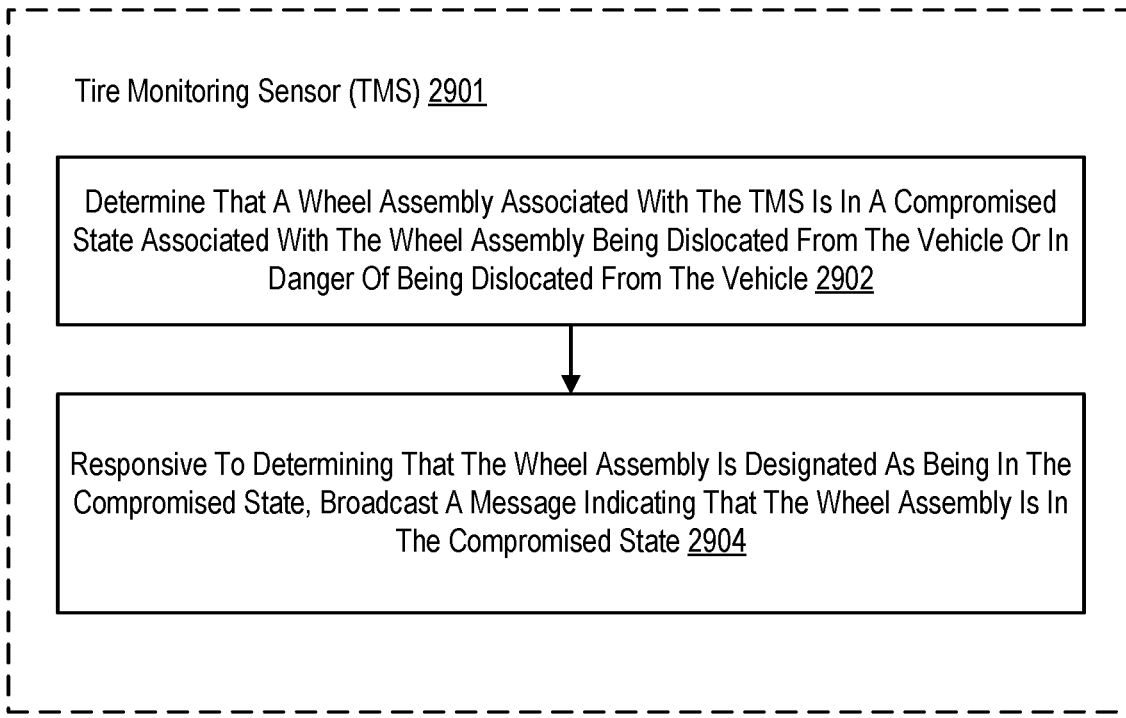
FIG. 29 sets forth a flow chart illustrating another method for wheel theft detection and notification using a TPMS according to at least one embodiment of the present disclosure.

For further explanation, FIG. 29 sets forth a flow chart illustrating another method of wheel theft detection and notification using a TPMS according to at least one embodiment of the present disclosure. The method of FIG. 29 includes determining (2902), by a tire monitoring sensor (TMS) (2901), that a wheel assembly associated with the TMS is in a compromised state associated with the wheel assembly being dislocated from the vehicle or in danger of being dislocated from the vehicle. Determining (2902), by a tire monitoring sensor (TMS) (2901), that a wheel assembly associated with the TMS is in a compromised state associated with the wheel assembly being dislocated from the vehicle or in danger of being dislocated from the vehicle may be carried out by receiving a message from a device, such as an ECU, indicating that the wheel assembly associated with the TMS is in a compromised state; and utilizing one or more parameters of the TMS to determine that the wheel assembly associated with the TMS is in the compromised state.

The method of FIG. 29 also includes responsive to determining that the wheel assembly is designated as being in the compromised state, broadcasting (2904), by the TMS (2101), a message indicating that the wheel assembly is in the compromised state. Broadcasting (2904), by the TMS (2101), a message indicating that the wheel assembly is in the compromised state responsive to determining that the wheel assembly is designated as being in the compromised state may be carried out by transmitting a message that includes an identifier of the TMS or the wheel assembly associated with the TMS and an indication that the wheel assembly is in a compromised state.

Figure 30:
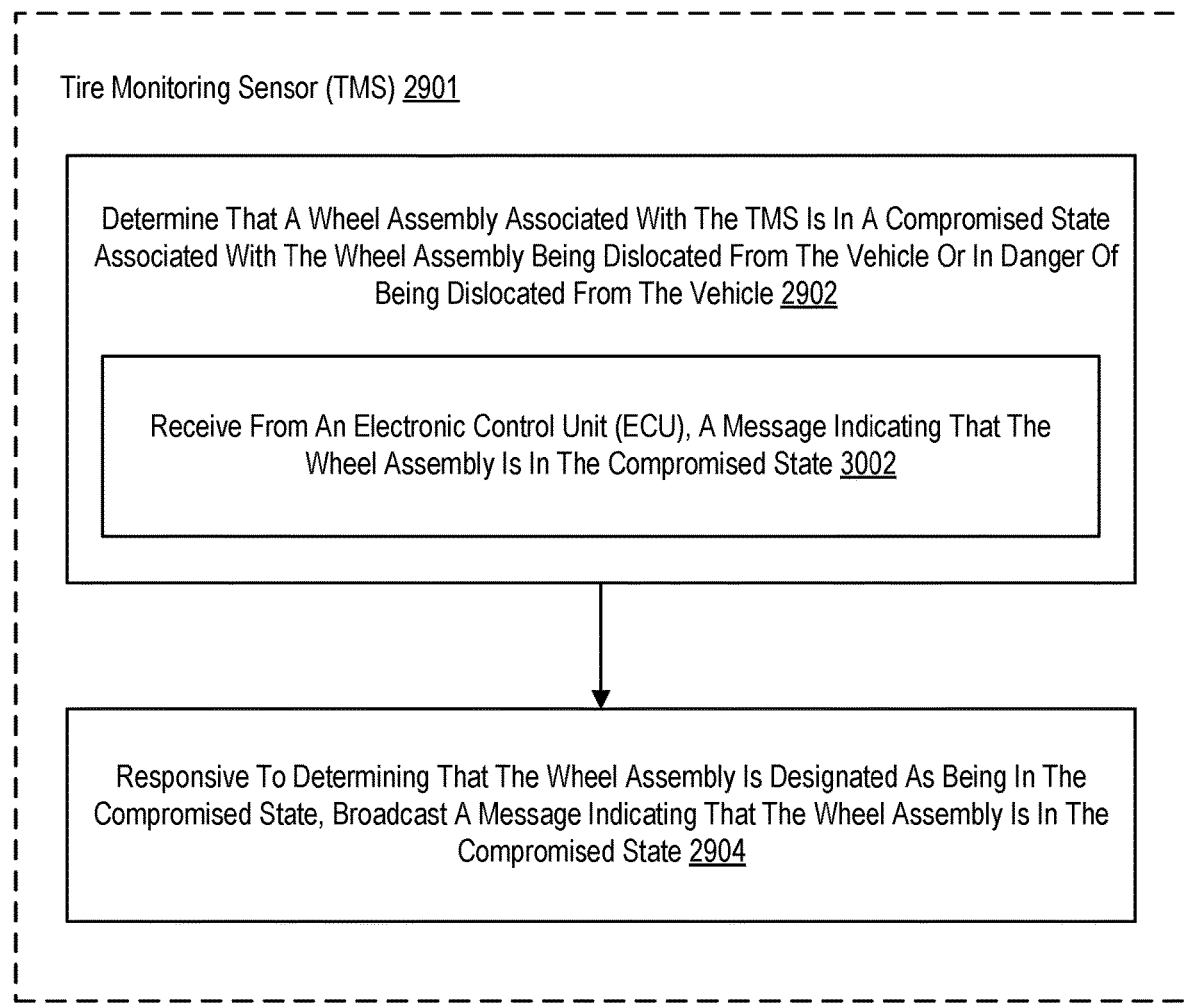
FIG. 30 sets forth a flow chart illustrating another method for wheel theft detection and notification using a TPMS according to at least one embodiment of the present disclosure.

For further explanation, FIG. 30 sets forth a flow chart illustrating another method of wheel theft detection and notification using a TPMS according to at least one embodiment of the present disclosure. The method of FIG. 30 includes the elements of FIG. 29. However, in the method of FIG. 30, determining (2902), by a tire monitoring sensor (TMS) (2901), that a wheel assembly associated with the TMS is in a compromised state includes receiving (3002) from an electronic control unit (ECU), a message indicating that the wheel assembly is in the compromised state. Receiving (3002) from an electronic control unit (ECU), a message indicating that the wheel assembly is in the compromised state may be carried out by receiving a message that includes an identifier of the wheel assembly or the TMS associated with the TMS.

For further explanation, FIG. 31 sets forth a flow chart illustrating another method of wheel theft detection and notification using a TPMS according to at least one embodiment of the present disclosure. The method of FIG. 31 includes the elements of FIG. 29. However, in the method of FIG. 31, determining (2902), by a tire monitoring sensor (TMS) (2901), that a wheel assembly associated with the TMS is in a compromised state includes during a wheel theft detection operation, detecting (3102), by the TMS (2901), a dislocation event that includes at least one of a change in orientation of the TMS, a loss of contact of the TMS with a linked electronic control unit (ECU) for a predetermined amount of time, and an installation of the TMS into an alien vehicle. Detecting (3102), by the TMS (2901), a dislocation event that includes at least one of a change in orientation of the TMS, a loss of contact of the TMS with a linked electronic control unit (ECU) for a predetermined amount of time, and an installation of the TMS into an alien vehicle may be carried out by measuring acceleration data; comparing the measured acceleration data to reference acceleration data; determining that the measured acceleration data deviates from the reference acceleration data by an amount that exceeds a threshold; in response to determining that the measured acceleration data deviates from the reference acceleration data by the amount, determining that the orientation of the TMS has changed. In addition, detecting (3102), by the TMS (2901), a dislocation event may also be carried out by determining that the TMS has lost contact with an ECU for an amount of time that exceeds a threshold; and detecting the installation of the TMS or wheel assembly into an alien vehicle that was previously unknown to the TMS.

In addition, in the method of FIG. 31, determining (2902), by a tire monitoring sensor (TMS) (2901), that a wheel assembly associated with the TMS is in a compromised state includes responsive to detecting the dislocation event, determining (3104) that the wheel assembly is in the compromised state. Determining (3104) that the wheel assembly is in the compromised state may be carried out by storing as the current state, an indication that the wheel assembly is in the compromised state.

Furthermore, in the method of FIG. 31, determining (2902), by a tire monitoring sensor (TMS) (2901), that a wheel assembly associated with the TMS is in a compromised state includes responsive to detecting the dislocation event, updating (3106) within the TMS, a designation of a current state of the wheel assembly to the compromised state. Updating (3106) within the TMS, a designation of a current state of the wheel assembly to the compromised state may be carried out by storing a value within the TMS that marks the current state of the wheel assembly as in the compromised state.

For further explanation, FIG. 32 sets forth a flow chart illustrating another method of wheel theft detection and notification using a TPMS according to at least one embodiment of the present disclosure. The method of FIG. 32 includes the elements of the method of FIG. 31. In addition to the elements of FIG. 31, the method of FIG. 32 also includes responsive to determining that the wheel assembly is in the compromised state, transmitting (3202) to the linked ECU, by the TMS (2901), an indication that the wheel assembly is the compromised state. Transmitting (3202) to the linked ECU, by the TMS (2901), an indication that the wheel assembly is the compromised state responsive to determining that the wheel assembly is in the compromised state may be carried out by transmitting a message that includes an identification of the TMS or wheel assembly and indicates that the associated wheel assembly is in a compromised state.

For further explanation, FIG. 33 sets forth a flow chart illustrating another method of wheel theft detection and notification using a TPMS according to at least one embodiment of the present disclosure. The method of FIG. 33 includes the elements of FIG. 29. However, in the method of FIG. 33, determining (2902), by a tire monitoring sensor (TMS) (2901), that a wheel assembly associated with the TMS is in a compromised state includes receiving (3302) from a device, by the TMS (2901), a remote tagging message indicating that the wheel assembly is in the compromised state. Receiving (3302) from a device, by the TMS (2901), a remote tagging message indicating that the wheel assembly is in the compromised state may be carried out by a message that includes an identification of the wheel assembly and an indication that the wheel assembly is in the compromised state.

For example, a device, such as a monitoring device, other TMS, or ECU, may "remote tag" a wheel assembly or TMS by transmitting a message that indicates the wheel assembly is in the compromised state. In response to receiving the message, the TMS may change the designation of the current state of the wheel assembly to the compromised state.

Figure 34:
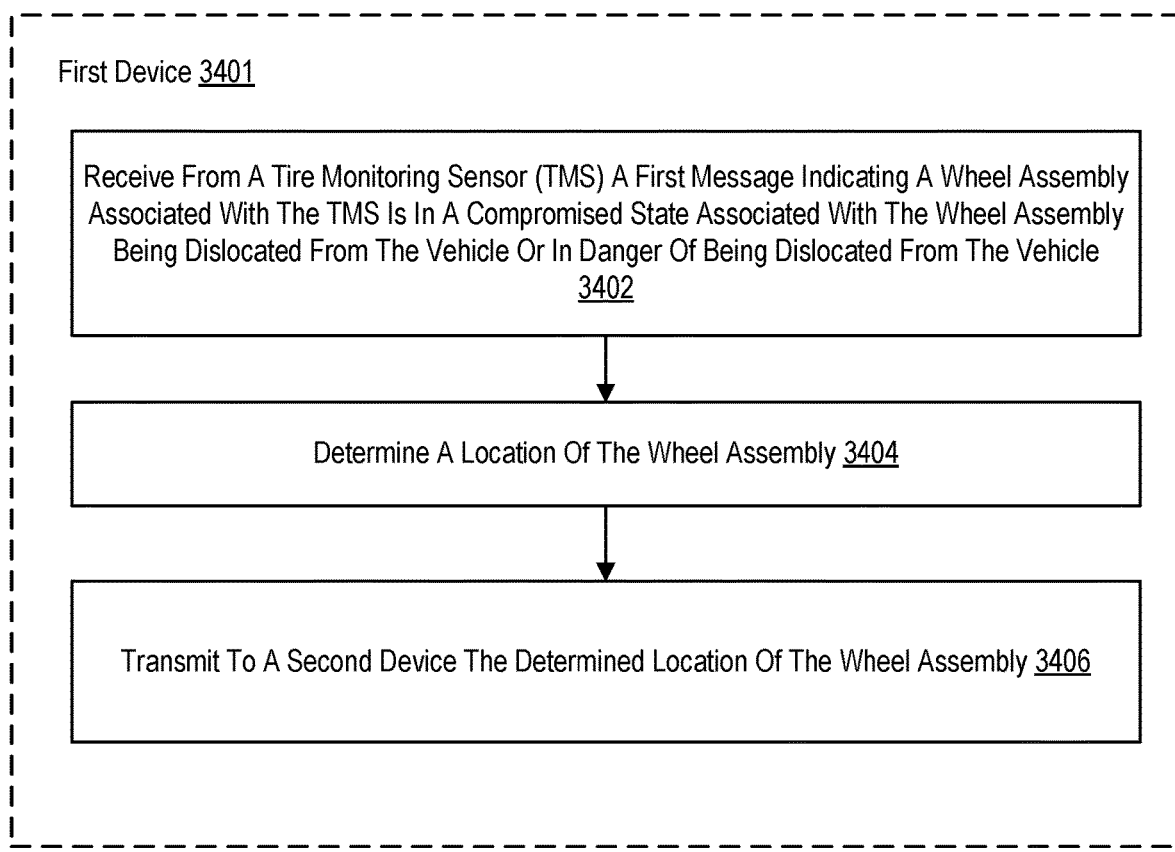
FIG. 34 sets forth a flow chart illustrating another method for wheel theft detection and notification using a TPMS according to at least one embodiment of the present disclosure.

For further explanation, FIG. 34 sets forth a flow chart illustrating another method of wheel theft detection and notification using a TPMS according to at least one embodiment of the present disclosure. The method of FIG. 34 includes receiving (3402) from a tire monitoring sensor (TMS), by a first device (3401), a first message indicating a wheel assembly associated with the TMS is in a compromised state associated with the wheel assembly being dislocated from the vehicle or in danger of being dislocated from the vehicle. Receiving (3402) from a tire monitoring sensor (TMS), by a first device (3401), a first message indicating a wheel assembly associated with the TMS is in a compromised state associated with the wheel assembly being dislocated from the vehicle or in danger of being dislocated from the vehicle may be carried out by receiving a message that includes an identification of the wheel assembly or the TMS and an indication that the wheel assembly or the TMS is in the compromised state.

The method of FIG. 34 also includes determining (3404), by the first device (3401), a location of the wheel assembly. Determining (3404), by the first device (3401), a location of the wheel assembly may be carried out by determining a location of the first device; retrieving a current GPS location of the first device; and using the location of the first device as the location of the wheel assembly.

In addition, the method of FIG. 34, transmitting (3406) to a second device, by the first device (3401), the determined location of the wheel assembly. Transmitting (3406) to a second device, by the first device (3401), the determined location of the wheel assembly may be carried out by transmitting a message that includes an identification of the wheel assembly or TMS and one or more values or coordinates that indicates the determined location of the wheel assembly.

Figure 35:
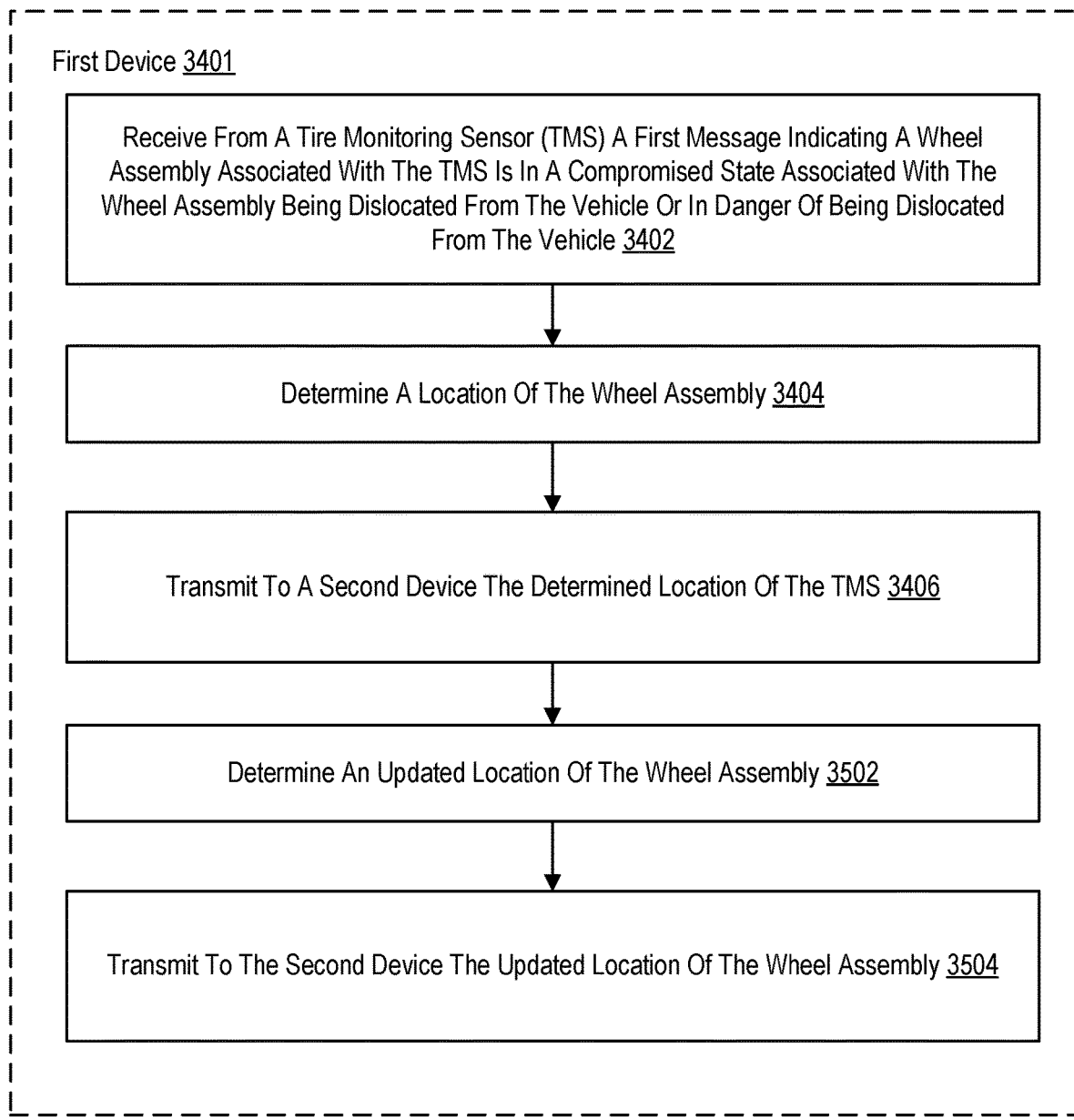
FIG. 35 sets forth a flow chart illustrating another method for wheel theft detection and notification using a TPMS according to at least one embodiment of the present disclosure.

For further explanation, FIG. 35 sets forth a flow chart illustrating another method of wheel theft detection and notification using a TPMS according to at least one embodiment of the present disclosure. The method of FIG. 35 includes determining (3502), by the first device (3401), an updated location of the wheel assembly. Determining (3502), by the first device (3401), an updated location of the wheel assembly may be carried out by periodically determining a location of the first device; periodically retrieving a current GPS location of the first device; and using the updated location of the first device as the updated location of the wheel assembly.

In addition, the method of FIG. 35 also includes transmitting (3504) to the second device, by the first device (3401), the updated location of the wheel assembly. Transmitting (3504) to the second device, by the first device (3401), the updated location of the wheel assembly may be carried out by determining that the location of the first device has changed; responsive to determining that the location of the first device has changed, using the updated location of the first device as the first device; and sending a message that includes an identification of the wheel assembly or TMS and values or coordinates that indicate the updated location of the wheel assembly.

Figure 36:
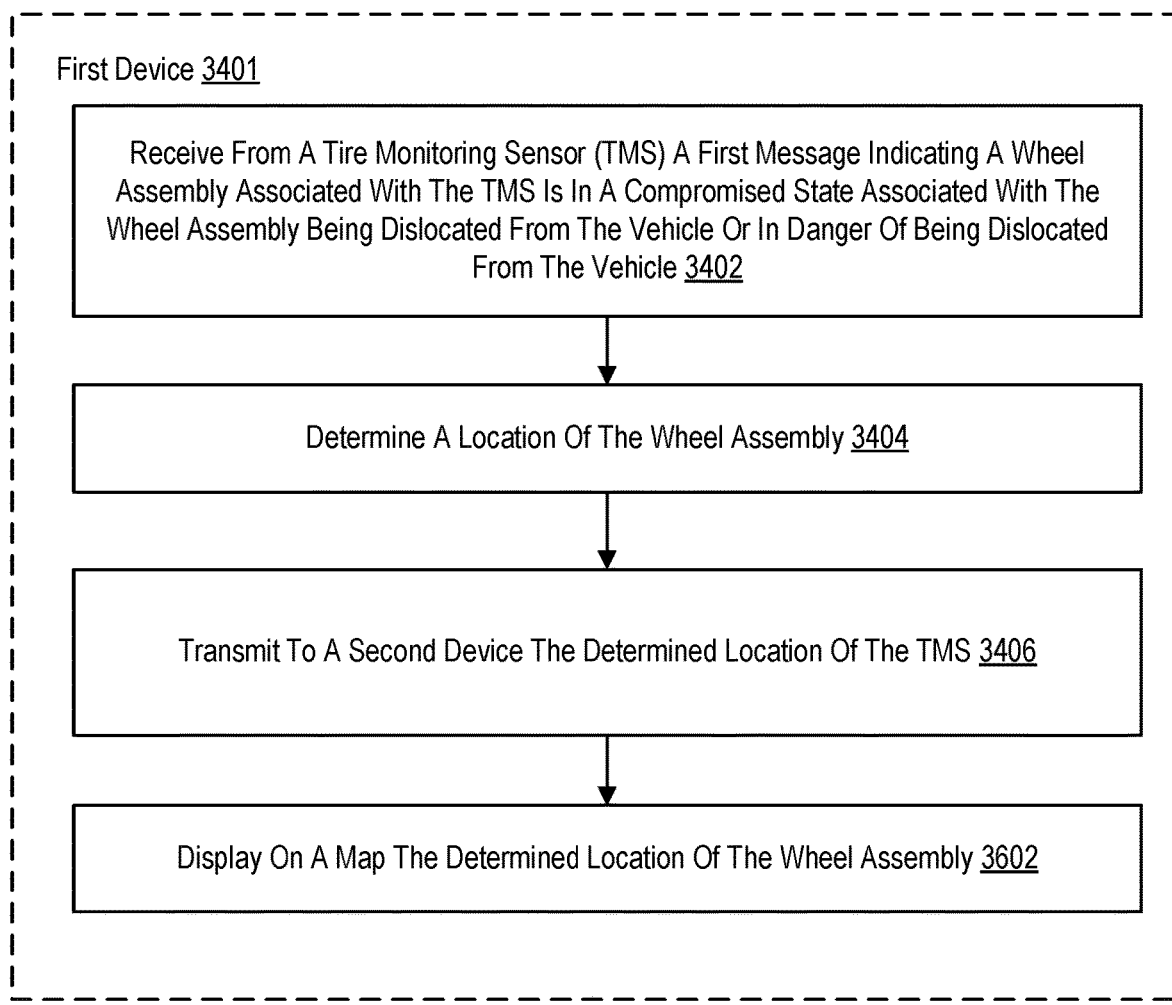
FIG. 36 sets forth a flow chart illustrating another method for wheel theft detection and notification using a TPMS according to at least one embodiment of the present disclosure.

For further explanation, FIG. 36 sets forth a flow chart illustrating another method of wheel theft detection and notification using a TPMS according to at least one embodiment of the present disclosure. The method of FIG. 36 includes the elements of FIG. 34. In addition, the method of FIG. 36 includes displaying (3602) on a map, by the first device (3401), the determined location of the wheel assembly. Displaying (3602) on a map, by the first device (3401), the determined location of the wheel assembly may be carried out by marking on a digital map the location of the wheel assembly.

For further explanation, FIG. 37 sets forth a flow chart illustrating another method of wheel theft detection and notification using a TPMS according to at least one embodiment of the present disclosure. The method of FIG. 37 also includes receiving (3702) from a first device, by a second device (3701), an indication that a wheel assembly is in a compromised state associated with the wheel assembly being dislocated from the vehicle or in danger of being dislocated from the vehicle, the indication including an identification associated with the wheel assembly. Receiving (3702) from a first device, by a second device (3701), an indication that a wheel assembly is in a compromised state associated with the wheel assembly being dislocated from the vehicle or in danger of being dislocated from the vehicle, the indication including an identification associated with the wheel assembly may be carried out by receiving a message from the first device.

In addition, the method of FIG. 37 includes receiving (3704) from a tire monitoring sensor (TMS), by the second device (3701), a message that includes the identification associated with the wheel assembly. Receiving (3704) from a tire monitoring sensor (TMS), by the second device (3701), a message that includes the identification associated with the wheel assembly may be carried out by receiving via a transceiver data from the TMS.

Furthermore, the method of FIG. 37 includes transmitting (3706) to the TMS, by the second device (3701), a message to update a current status of the wheel assembly to the compromised state. Transmitting (3706) to the TMS, by the second device (3701), a message to update a current status of the wheel assembly to the compromised state may be carried out by transmitting a message that includes an identification of the TMS and an indication that the current status of the wheel assembly is in the compromised state; and transmitting a message that instructs the TMS to change the current state to the compromised state.

Figure 38:
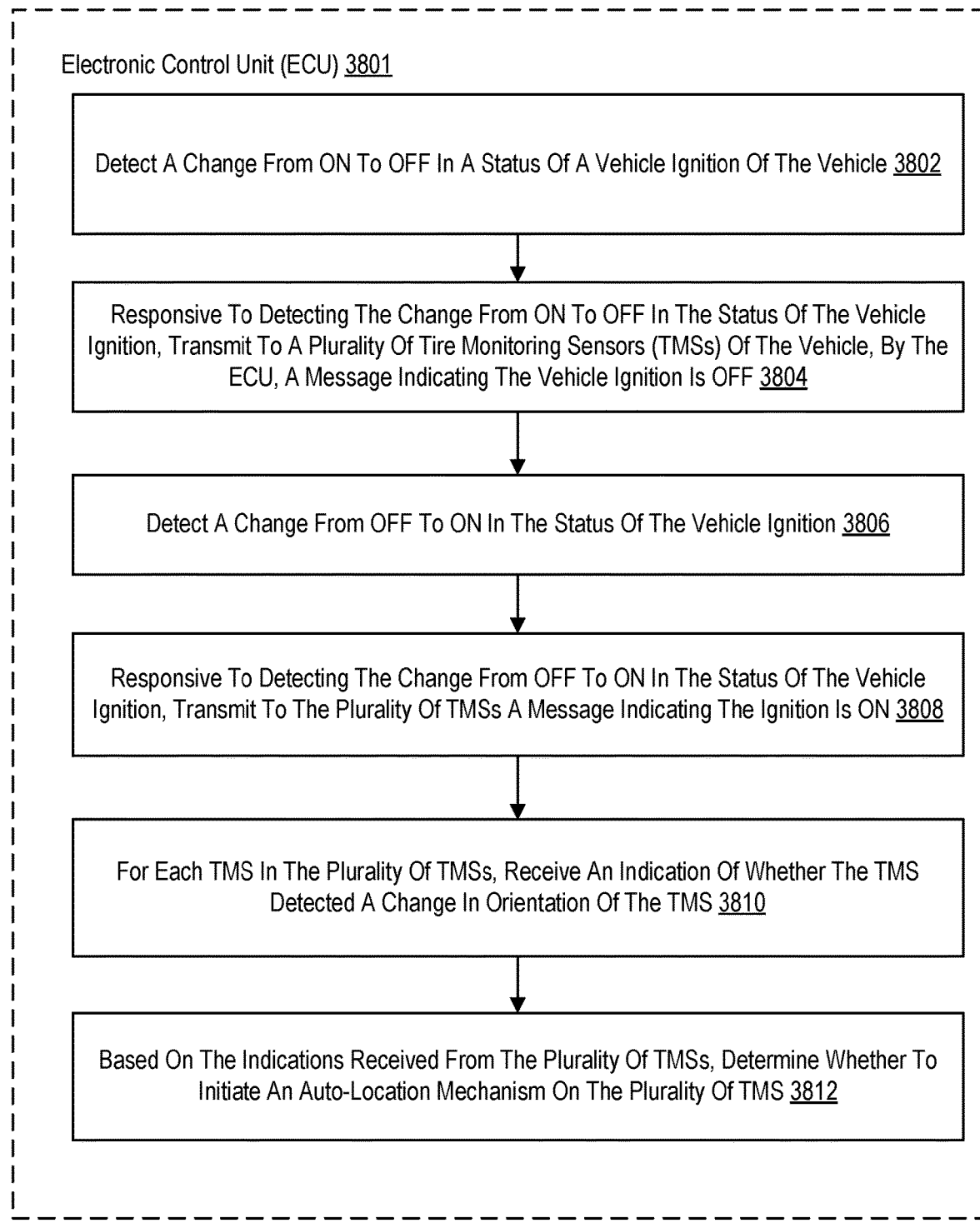
FIG. 38 sets forth a flow chart illustrating another method for wheel theft detection and notification using a TPMS according to at least one embodiment of the present disclosure.

For further explanation, FIG. 38 sets forth a flow chart illustrating another method of wheel theft detection and notification using a TPMS according to at least one embodiment of the present disclosure. The method of FIG. 38 includes detecting (3802), by an electronic control unit (ECU) (3801) of a vehicle, a change from ON to OFF in a status of a vehicle ignition of the vehicle. Detecting (3802), by an electronic control unit (ECU) (3801) of a vehicle, a change from ON to OFF in a status of a vehicle ignition of the vehicle may be carried out by receiving a message or signal from the vehicle security system.

The method of FIG. 38 includes transmitting (3804) to a plurality of tire monitoring sensors (TMSs) of the vehicle, by the ECU (3801), a message indicating the vehicle ignition is OFF responsive to detecting the change from ON to OFF in the status of the vehicle ignition. Transmitting (3804) to a plurality of tire monitoring sensors (TMSs) of the vehicle, by the ECU (3801), a message indicating the vehicle ignition is OFF responsive to detecting the change from ON to OFF in the status of the vehicle ignition may be carried out by transmitting a message that includes data identifying the current state of the vehicle ignition.

In addition, the method of FIG. 38 includes detecting (3806), by the ECU (3801), a change from OFF to ON in the status of the vehicle ignition. Detecting (3806), by the ECU (3801), a change from OFF to ON in the status of the vehicle ignition may be carried out by receiving a message or signal from the vehicle security system.

The method of FIG. 38 includes responsive to detecting the change from OFF to ON in the status of the vehicle ignition, transmitting (3808) to the plurality of TMSs, by the ECU (3801), a message indicating the ignition is ON. Transmitting (3808) to the plurality of TMSs, by the ECU (3801), a message indicating the ignition is ON responsive to detecting the change from OFF to ON in the status of the vehicle ignition may be carried out by transmitting a message that includes data identifying the current state of the vehicle ignition.

In response to receiving a message indicating the vehicle ignition is OFF, a TMS monitors its own orientation by recording X, Y, or Z acceleration data (or any combination). When the TMSs receive the ignition ON message, each sensor checks if acceleration measurement results have changed since receiving the ignition OFF message. If the acceleration data has changed, the sensor transmits a location change message to the ECU. If the acceleration data has not changed, the sensor transmits a "no location change" message to ECU. The ECU determines whether the "no location change" message has been received from all sensors. If the "no location change" message has been received from all sensors or alternatively if the ECU did not receive the "location change" message from any sensor, the ECU assigns the previous journey's sensor locations and disables the autolocation mechanism. If the "no location change" message has not been received from all sensors or alternatively if the "location change" message was received from at least one sensor, the ECU initiates the autolocation mechanism.

Furthermore, the method of FIG. 38 also includes for each TMS in the plurality of TMSs, receiving (3810), by the ECU (3801), an indication of whether the TMS detected a change in orientation of the TMS. For each TMS in the plurality of TMSs, receiving (3810), by the ECU (3801), an indication of whether the TMS detected a change in orientation of the TMS may be carried out by receiving a message that includes an identification of the TMS or wheel assembly and an indication that the change in orientation was detected.

In addition, the method of FIG. 38 also includes based on the indications received from the plurality of TMSs, determining (3812), by the ECU (3801), whether to initiate an autolocation mechanism on the plurality of TMS. Determining (3812), based on the indications received from the plurality of TMSs, whether to initiate an autolocation mechanism on the plurality of TMS may be carried out by determining whether for each TMS associated with the vehicle, a message was received that indicates the TMS detected a change in orientation; determining whether for at least a set number of TMSs associated with the vehicle, a message was received that indicates the TMS detected a change in orientation.

Figure 39:
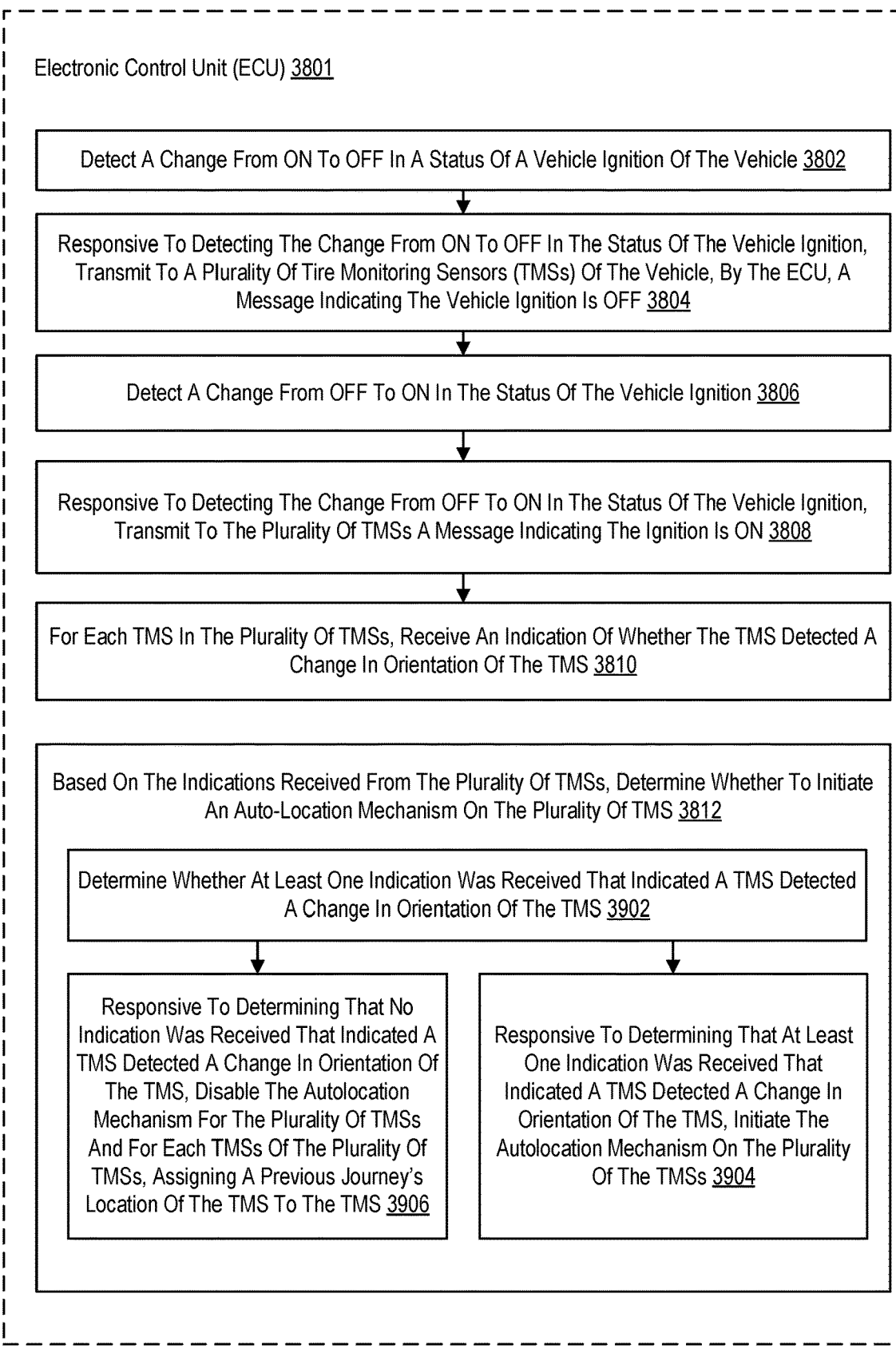
FIG. 39 sets forth a flow chart illustrating another method for wheel theft detection and notification using a TPMS according to at least one embodiment of the present disclosure.

For further explanation, FIG. 39 sets forth a flow chart illustrating another method of wheel theft detection and notification using a TPMS according to at least one embodiment of the present disclosure. The method of FIG. 39 includes the elements of FIG. 38. However, in the method of FIG. 39, determining (3812), based on the indications received from the plurality of TMSs, whether to initiate an autolocation mechanism on the plurality of TMS includes determining (3902) whether at least one indication was received that indicated a TMS detected a change in orientation of the TMS. Determining (3902) whether at least one indication was received that indicated a TMS detected a change in orientation of the TMS may be carried out by recording and tracking the indications from the sensors.

In addition, the method of FIG. 39 includes responsive to determining that at least one indication was received that indicates a TMS detected a change in orientation of the TMS, initiating (3904) the autolocation mechanism on the plurality of the TMSs. Responsive to determining that at least one indication was received that indicates a TMS detected a change in orientation of the TMS, initiating (3904) the autolocation mechanism on the plurality of the TMSs may be carried out by determining whether a "location change" message was received from one or more TMS indicating that the location of the TMS had changed between the ignition being turned OFF and ON; and determining whether a "no location change" message was received from each TMS indicating that location of the TMS had not changed between the ignition being turned OFF and ON.

Furthermore, responsive to determining that no indication was received that indicates a TMS detected a change in orientation of the TMS, disabling (3906) the autolocation mechanism for the plurality of TMSs and for each TMSs of the plurality of TMSs, assigning a previous journey's location of the TMS to the TMS. Responsive to determining that no indication was received that indicates a TMS detected a change in orientation of the TMS, disabling (3906) the autolocation mechanism for the plurality of TMSs and for each TMSs of the plurality of TMSs, assigning a previous journey's location of the TMS to the TMS may be carried out by using a previous journey's location of each TMS as the current location of each TMS.

Advantages and features of the present disclosure can be further described by the following statements:

1. A method of wheel theft detection and notification using a tire pressure monitoring system (TPMS), the method comprising: monitoring, by an electronic control unit (ECU) of a vehicle, one or more parameters associated with a tire monitoring sensor (TMS) coupled to a wheel assembly of the vehicle; based on the monitored one or more parameters, determining, by the ECU, that the wheel assembly is in a compromised state associated with the wheel assembly being dislocated from the vehicle or in danger of being dislocated from the vehicle; and in response to determining that the wheel assembly is in the compromised state, triggering, by the ECU, an alarm of a vehicle security system.
2. The method of statement 1 wherein the one or more parameters include at least one of a tire pressure of the wheel assembly, an orientation of the TMS, and a strength of signals received from the TMS.
3. The method of statement 1 or 2 wherein based on the monitored one or more parameters, determining, by the ECU, that the wheel assembly is in the compromised state includes: determining that a distance from the ECU to the TMS is increasing.
4. The method of any of statements 1-3, wherein determining that the distance from the ECU to the TMS is increasing comprises: generating, by the ECU, a plurality of signal attribute samples based on signals received from the TMS; and determining, based on the plurality of signal attribute samples, that the distance from the ECU to the TMS is increasing.
5. The method of any of statements 1-4, wherein the plurality of signal attribute samples comprises at least one of a plurality of Received Signal Strength Indicator (RSSI) samples and a plurality of time-of-flight samples.
6. The method of any of statements 1-5 further comprising sending to the TMS, by the ECU, an indication of a state of the vehicle security system.
7. The method of any of statements 1-6 further comprising: receiving from a monitoring module of the vehicle, by the ECU, an indication of a change in a parameter monitored by the module of the vehicle; and in response to receiving an indication of the change in the parameter monitored by the module of the vehicle, requesting, by the ECU, that the TMS perform a wheel theft detection operation.
8. The method of any of statements 1-7, wherein the one or more parameters include an orientation of the TMS and the strength of signals from the TMS; wherein based on the monitored one or more parameters, determining, by the ECU, that a wheel assembly is in the compromised state includes: using the monitored one or more parameters to determine, by the ECU, that both the orientation of the TMS and the strength of signals from the TMS have changed during a wheel theft detection operation at the TMS; and responsive to determining that both the orientation of the TMS and the strength of the signals from the TMS have changed during the wheel theft detection operation, determining, by the ECU, that the wheel assembly is in the compromised state.
9. The method of any of statements 1-8 further comprising: determining, by the ECU, that the vehicle security system has been deactivated; and after determining that the vehicle security system has been deactivated, transmitting to the TMS, by the ECU, a message to disable a wheel theft detection operation at the TMS.
10. The method of any of statements 1-9 comprising: in response to determining that the wheel assembly associated with the TMS is in the compromised state, transmitting to another device, by the ECU, a message that the wheel assembly is in the compromised state.
11. A method of wheel theft detection and notification using a tire pressure monitoring system (TPMS) by itself or in combination of any of the statements 1-10, the method comprising: determining, by an electronic control unit (ECU) of a vehicle, that a wheel assembly is in a compromised state associated with the wheel assembly being dislocated from the vehicle or in danger of being dislocated from the vehicle; and responsive to determining that the wheel assembly is in the compromised state, transmitting to a first device, by the ECU, a message indicating that the wheel assembly is in the compromised state.
12. The method of any of the statements 1-11 wherein determining, by the ECU, that the wheel assembly is in the compromised state includes: receiving, by the ECU, user input indicating that the wheel assembly is in the compromised state.
13. The method of any of statements 1-12 further comprising: receiving from a second device, by the ECU, an update on a location of the wheel assembly.
14. The method of any of statements 1-13 wherein determining, by the ECU, that the wheel assembly is in the compromised state includes: monitoring, by the ECU, one or more parameters associated with a tire monitoring sensor (TMS) coupled to the wheel assembly; and based on the monitored one or more parameters, determining, by the ECU, that the wheel assembly is in the compromised state.
15. A method of optimizing an autolocation mechanism in a tire pressure monitoring system (TPMS) by itself or in combination of any of the statements 1-14, the method comprising: detecting, by an electronic control unit (ECU) of a vehicle, a change from ON to OFF in a status of a vehicle ignition of the vehicle; responsive to detecting the change from ON to OFF in the status of the vehicle ignition, transmitting to a plurality of tire monitoring sensors (TMSs) of the vehicle, by the ECU, a message indicating the vehicle ignition is OFF; detecting, by the ECU, a change from OFF to ON in the status of the vehicle ignition; responsive to detecting the change from OFF to ON in the status of the vehicle ignition, transmitting to the plurality of TMSs, by the ECU, a message indicating the ignition is ON; for each TMS in the plurality of TMSs, receiving, by the ECU, an indication of whether the TMS detected a change in orientation of the TMS; and based on the indications received from the plurality of TMSs, determining, by the ECU, whether to initiate an autolocation mechanism on the plurality of TMS.
16. The method of any of the statements 1-15 wherein based on the indications received from the TMSs, determining whether to initiate the autolocation mechanism on the plurality of TMSs includes: determining whether at least one indication was received that indicates a TMS detected a change in orientation of the TMS; responsive to determining that at least one indication was received that indicated a TMS detected a change in orientation of the TMS, initiating the autolocation mechanism on the plurality of the TMSs; and responsive to determining that no indication was received that indicated a TMS detected a change in orientation of the TMS, disabling the autolocation mechanism for the plurality of TMSs and for each TMSs of the plurality of TMSs, assigning a previous journey's location of the TMS to the TMS.
17. A method of wheel theft detection and notification using a tire pressure monitoring system (TPMS), the method comprising: receiving from an electronic control unit (ECU) of a vehicle, by a tire monitoring sensor (TMS) of the vehicle, an indication that a vehicle security system is activated; after receiving the indication that the vehicle security system is activated, performing a wheel theft detection operation that includes: measuring, by the TMS, one or more parameter values associated with a wheel assembly; and determining, by the TMS, whether the one or more measured parameter values deviate from one or more reference parameter values by one or more predetermined amounts; and after determining that the one or more measured parameter values deviate from the one or more reference parameter values by the one or more predetermined amounts, transmitting, by the TMS, an indication that the one or more parameter values have changed.
18. The method of statement 17 further comprising: in response to determining that the one or more measured parameter values deviate from the one or more reference parameter values by the one or more predetermined amounts, switching, by the TMS, to a rapid transmission state in which the TMS increases a frequency of transmission to the ECU.
19. The method of statement 17 or 18 further comprising: detecting, by the TMS, an end event for the rapid transmission state; and responsive to detecting the end event for the rapid transmission state, switching, by the TMS, from the rapid transmission state to a normal monitoring state in which the TMS decreases the frequency of transmission to the ECU.
20. The method of any of statements 17-19 further comprising: receiving from the ECU, by the TMS, an indication that the vehicle security system is deactivated; and after receiving the indication that the vehicle security system is deactivated, disabling, by the TMS, the wheel theft detection operation.
21. The method of any of statements 17-20 wherein the one or more parameters indicate at least one of a tire pressure of the wheel assembly and an orientation of the TMS.
22. A method of wheel theft detection and notification using a tire pressure monitoring system (TPMS) by itself or in combination of any of the statements 17-21, the method comprising: determining, by a tire monitoring sensor (TMS), that a wheel assembly associated with the TMS is in a compromised state associated with the wheel assembly being dislocated from the vehicle or in danger of being dislocated from the vehicle; and responsive to determining that the wheel assembly is designated as being in the compromised state, broadcasting, by the TMS, a message indicating that the wheel assembly is in the compromised state.
23. The method of any of statements 17-22 wherein determining, by the TMS, that the wheel assembly associated with the TMS is in the compromised state includes: receiving from an electronic control unit (ECU), a message indicating that the wheel assembly is in the compromised state.
24. The method of any of the statements 17-23 wherein determining, by the TMS, that a wheel assembly associated with the TMS is in a compromised state includes: during a wheel theft detection operation, detecting, by the TMS, a dislocation event that includes at least one of a change in orientation of the TMS, a loss of contact of the TMS with a linked electronic control unit (ECU) for a predetermined amount of time, and an installation of the TMS into an alien vehicle; and responsive to detecting the dislocation event: determining that the wheel assembly is in the compromised state; and updating within the TMS, a designation of a current state of the wheel assembly to the compromised state.
25. The method of any of the statements 17-24 further comprising: responsive to determining that the wheel assembly is in the compromised state, transmitting to the linked ECU, by the TMS, an indication that the wheel assembly is the compromised state.
26. The method of any of the statements 17-25 wherein determining, by the TMS, that the wheel assembly is in the compromised state includes: receiving from a device, by the TMS, a remote tagging message indicating that the wheel assembly is in the compromised state.
27. A method of wheel theft detection and notification using a tire pressure monitoring system (TPMS), the method comprising: receiving from a tire monitoring sensor (TMS), by a first device, a first message indicating a wheel assembly associated with the TMS is in a compromised state associated with the wheel assembly being dislocated from the vehicle or in danger of being dislocated from the vehicle; determining, by the first device, a location of the wheel assembly; and transmitting to a second device, by the first device, the determined location of the TMS.
28. The method of statement 27 further comprising: determining, by the first device, an updated location of the wheel assembly; and transmitting to the second device, by the first device, the updated location of the wheel assembly.
29. The method of any of statements 27 or 28 further comprising: displaying on a map, by the first device, the determined location of the wheel assembly.
30. A method of wheel theft detection and notification using a tire pressure monitoring system (TPMS) by itself or in combination of any of the statements 27-29, the method comprising: receiving from a first device, by a second device, an indication that a wheel assembly is in a compromised state associated with the wheel assembly being dislocated from the vehicle or in danger of being dislocated from the vehicle, the indication including an identification associated with the wheel assembly; receiving from a tire monitoring sensor (TMS), by the second device, a message that includes the identification associated with the wheel assembly; and transmitting to the TMS, by the second device, a message to update a current status of the wheel assembly to the compromised state.

31. The method of any of statements 27-30 wherein the first device includes at least one of a cloud computing device, a monitoring device, another TMS, and an electronic control unit (ECU) of a vehicle.

Exemplary embodiments of the present invention are described largely in the context of a fully functional tire mounted sensor, electronic control unit, monitoring device, and/or computing device for wheel theft detection and notification using a tire pressure monitoring system (TPMS). Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to perform aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or perform combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of wheel theft detection and notification using a tire pressure monitoring system (TPMS), the method comprising:
   receiving from an electronic control unit (ECU) of a vehicle, by a tire monitoring sensor (TMS) of the vehicle, an indication that a vehicle security system is activated;
   after receiving the indication that the vehicle security system is activated, performing a wheel theft detection operation that includes:
      measuring, by the TMS, one or more parameter values associated with a wheel assembly; and
      determining, by the TMS, whether the one or more measured parameter values deviate from one or more reference parameter values by one or more predetermined amounts;
      in response to determining that the one or more measured parameter values deviate from the one or more reference parameter values by the one or more predetermined amounts, switching, by the TMS, to a rapid transmission state in which the TMS increases a frequency of transmission to the ECU; and
   after determining that the one or more measured parameter values deviate from the one or more reference parameter values by the one or more predetermined amounts, transmitting, by the TMS, an indication that the one or more parameter values have changed;
   detecting, by the TMS, an end event for the rapid transmission state; and
   responsive to detecting the end event for the rapid transmission state, switching, by the TMS, from the rapid transmission state to a normal monitoring state in which the TMS decreases the frequency of transmission to the ECU.

2. The method of claim 1 further comprising:
   receiving from the ECU, by the TMS, an indication that the vehicle security system is deactivated; and
   after receiving the indication that the vehicle security system is deactivated, disabling, by the TMS, the wheel theft detection operation.

3. The method of claim 1 wherein the one or more parameters indicate at least one of a tire pressure of the wheel assembly and an orientation of the TMS.

4. A method of wheel theft detection and notification using a tire pressure monitoring system (TPMS), the method comprising:
   determining, by a tire monitoring sensor (TMS), that a wheel assembly associated with the TMS is in a compromised state associated with the wheel assembly being dislocated from a vehicle or in danger of being dislocated from the vehicle; and
   responsive to determining that the wheel assembly is designated as being in the compromised state, broadcasting, by the TMS, a message indicating that the wheel assembly is in the compromised state;
   wherein determining, by the TMS, that the wheel assembly is in the compromised state includes:
      receiving from a device, by the TMS, a remote tagging message indicating that the wheel assembly is in the compromised state.

5. The method of claim 4 wherein determining, by the TMS, that the wheel assembly associated with the TMS is in the compromised state includes:
   receiving from an electronic control unit (ECU), a message indicating that the wheel assembly is in the compromised state.

6. The method of claim 4 wherein determining, by the TMS, that a wheel assembly associated with the TMS is in a compromised state includes:
   during a wheel theft detection operation, detecting, by the TMS, a dislocation event that includes at least one of a change in orientation of the TMS, a loss of contact of the TMS with a linked electronic control unit (ECU) for a predetermined amount of time, and an installation of the TMS into an alien vehicle; and
   responsive to detecting the dislocation event:
      determining that the wheel assembly is in the compromised state; and
      updating within the TMS, a designation of a current state of the wheel assembly to the compromised state.

7. The method of claim 6 further comprising:
   responsive to determining that the wheel assembly is in the compromised state, transmitting to the linked ECU, by the TMS, an indication that the wheel assembly is the compromised state.

8. A method of wheel theft detection and notification using a tire pressure monitoring system (TPMS), the method comprising:
   receiving from a tire monitoring sensor (TMS), by a first device, a first message indicating a wheel assembly associated with the TMS is in a compromised state associated with the wheel assembly being dislocated from a vehicle or in danger of being dislocated from the vehicle, wherein the first message corresponds to an internally stored state of the TMS indicating that the wheel assembly is in the compromised state;
   determining, by the first device, a location of the wheel assembly; and
   transmitting to a second device, by the first device, the determined location of the wheel assembly.

9. The method of claim 8 further comprising:
   determining, by the first device, an updated location of the wheel assembly; and
   transmitting to the second device, by the first device, the updated location of the wheel assembly.

10. The method of claim 8 further comprising:
    displaying on a map, by the first device, the determined location of the wheel assembly.

11. A method of wheel theft detection and notification using a tire pressure monitoring system (TPMS), the method comprising:

receiving from a first device, by a second device, an indication that a wheel assembly is in a compromised state associated with the wheel assembly being dislocated from a vehicle or in danger of being dislocated from the vehicle, the indication including an identification associated with the wheel assembly;

receiving from a tire monitoring sensor (TMS), by the second device, a message that includes the identification associated with the wheel assembly; and transmitting to the TMS, by the second device, a message to update a current status of the wheel assembly to the compromised state.

12. The method of claim 11 wherein the first device includes at least one of a cloud computing device, a monitoring device, another TMS, and an electronic control unit (ECU) of a vehicle.

13. A method of optimizing an autolocation mechanism in a tire pressure monitoring system (TPMS), the method comprising:

detecting, by an electronic control unit (ECU) of a vehicle, a change from ON to OFF in a status of a vehicle ignition of the vehicle;

responsive to detecting the change from ON to OFF in the status of the vehicle ignition, transmitting to a plurality of tire monitoring sensors (TMSs) of the vehicle, by the ECU, a message indicating the vehicle ignition is OFF;

detecting, by the ECU, a change from OFF to ON in the status of the vehicle ignition;

responsive to detecting the change from OFF to ON in the status of the vehicle ignition, transmitting to the plurality of TMSs, by the ECU, a message indicating the ignition is ON;

for each TMS in the plurality of TMSs, receiving, by the ECU, an indication of whether the TMS detected a change in orientation of the TMS; and based on the indications received from the plurality of TMSs, determining, by the ECU, whether to initiate an autolocation mechanism on the plurality of TMS.

14. The method of claim 13 wherein based on the indications received from the TMSs, determining whether to initiate the autolocation mechanism on the plurality of TMSs includes:

determining whether at least one indication was received that indicated a TMS detected a change in orientation of the TMS;

responsive to determining that at least one indication was received that indicated a TMS detected a change in orientation of the TMS, initiating the autolocation mechanism on the plurality of the TMSs; and responsive to determining that no indication was received that indicated a TMS detected a change in orientation of the TMS, disabling the autolocation mechanism for the plurality of TMSs and for each TMSs of the plurality of TMSs, assigning a previous journey's location of the TMS to the TMS.

\* \* \* \* \*